United States Patent
Li et al.

(10) Patent No.: US 10,863,422 B2
(45) Date of Patent: Dec. 8, 2020

(54) MECHANISMS FOR AD HOC SERVICE DISCOVERY

(71) Applicant: Convida Wireless, LLC, Wilmington, DE (US)

(72) Inventors: Qing Li, Princeton Junction, NJ (US); Guang Lu, Thornhill (CA); Catalina M. Mladin, Hatboro, PA (US); Dale N. Seed, Allentown, PA (US); Lijun Dong, San Diego, CA (US); Xu Li, Plainsboro, NJ (US); Vinod Kumar Choyi, Conshohocken, PA (US); Chonggang Wang, Princeton, NJ (US); Hongkun Li, Malvern, PA (US); William Robert Flynn, IV, Schwenksville, PA (US)

(73) Assignee: Convida Wireless, LLC, Wilmington, DE (US)

( * ) Notice: Subject to any disclaimer, the term of this patent is extended or adjusted under 35 U.S.C. 154(b) by 101 days.

(21) Appl. No.: 15/749,641

(22) PCT Filed: Aug. 3, 2016

(86) PCT No.: PCT/US2016/045285
§ 371 (c)(1),
(2) Date: Feb. 1, 2018

(87) PCT Pub. No.: WO2017/023998
PCT Pub. Date: Feb. 9, 2017

(65) Prior Publication Data
US 2019/0387458 A1 Dec. 19, 2019

Related U.S. Application Data

(60) Provisional application No. 62/200,430, filed on Aug. 3, 2015.

(51) Int. Cl.
*H04W 72/04* (2009.01)
*H04W 4/00* (2018.01)
(Continued)

(52) U.S. Cl.
CPC ............. *H04W 48/14* (2013.01); *H04L 67/16* (2013.01); *H04W 4/50* (2018.02); *H04W 4/70* (2018.02); *H04W 8/005* (2013.01); *H04W 48/16* (2013.01)

(58) Field of Classification Search
None
See application file for complete search history.

(56) References Cited

U.S. PATENT DOCUMENTS

| 9,681,261 B2* | 6/2017 | Lee | H04W 4/02 |
| 2003/0108016 A1* | 6/2003 | Bonta | H04W 16/32 |
| | | | 370/338 |

(Continued)

FOREIGN PATENT DOCUMENTS

| EP | 2007065 A1 | 12/2008 |
| WO | 20151034337 A1 | 3/2015 |

OTHER PUBLICATIONS

OneM2M Technical Specification TS-0007 V0.3.0 "Service Component Architecture" Jun. 2014, 105 pages.

(Continued)

*Primary Examiner* — Gary Lafontant
(74) *Attorney, Agent, or Firm* — BakerHostetler

(57) ABSTRACT

Mechanisms for discovering ad hoc Service Layer Entities (aSLEs) either deployed in ad hoc or switched from normal operation mode to ad hoc mode can support an IoT service in a distributive self-organized system.

20 Claims, 36 Drawing Sheets

(51) Int. Cl.
  *H04W 48/14* (2009.01)
  *H04W 4/70* (2018.01)
  *H04W 4/50* (2018.01)
  *H04L 29/08* (2006.01)
  *H04W 8/00* (2009.01)
  *H04W 48/16* (2009.01)

(56) References Cited

U.S. PATENT DOCUMENTS

| | | | |
|---|---|---|---|
| 2005/0220139 A1 | 10/2005 | Aholainen | |
| 2009/0213760 A1* | 8/2009 | Shin | H04W 74/002 370/254 |
| 2012/0226789 A1* | 9/2012 | Ganesan | G06F 9/5061 709/223 |
| 2015/0312960 A1* | 10/2015 | Kim | H04W 72/04 370/329 |
| 2015/0358777 A1* | 12/2015 | Gupta | H04W 4/023 370/254 |
| 2016/0088023 A1* | 3/2016 | Handa | G06F 16/957 726/1 |
| 2016/0212732 A1* | 7/2016 | Choi | H04W 4/70 |
| 2016/0259932 A1* | 9/2016 | Lakshmanan | G06F 21/44 |

OTHER PUBLICATIONS

OneM2M Technical Specification TS-0002 V0.6.2, "oneM2M Requirements Technical Specification" Oct. 2013, 29 pages.

OneM2M Technical Specification TS-0001 V-2014-08, "oneM2M Functional Architecture Baseline Draft" Aug. 2014, 297 pages.

Mockapetris et al., "Domain Names—Implementation and Specification" Network Working Group RFC: 1035, Nov. 1987, 55 pages.

Gulbrandsen et al., "A DNS RR for Specifying the Location of Services (DNS SRV)" Network Working Group RFC: 2782, Feb. 2000, 12 pages.

ETSI TS 102690 V2.0.14 "Machine-to-Machine communications (M2M); Functional Architecture" Mar. 2013, 332 pages.

Cheshire et al., "Multicast DNS" Internet Engineering Task Force (IETF) RFC: 6762, Feb. 2013, 70 pages.

Cheshire et al., "DNS-Based Service Discovery" Internet Engineering Task Force (IETF) RFC: 6763, Feb. 2013, 50 pages.

\* cited by examiner

FIG. 19A  Name-Value Pair for Optional Fields

FIG. 19B  Index-Value Pair for Optional Fields c) Bitmap for Optional Fields

FIG. 19C (a) Isolated aSLE (b) Cluster of aSLEs

MECHANISMS FOR AD HOC SERVICE DISCOVERY

CROSS-REFERENCE TO RELATED APPLICATIONS

This Application is a National Stage Application filed under 35 U.S.C. § 371 of International Application No. PCT/US2016/045285, filed Aug. 3, 2016, which claims the benefit of U.S. Provisional Patent Application Ser. No. 62/200,430, filed Aug. 3, 2015, the disclosure of which is hereby incorporated by reference as if set forth in its entirety.

BACKGROUND

The Internet of Things (IoT) is the interconnection of uniquely identifiable objects within the existing Internet. IoT is envisioned to offer advanced connectivity of devices, systems, and services with many different protocols, domains, and applications.

Things or objects in the IoT include a large variety of devices such as heart monitoring implants, biochip transponders, automobile built-in sensors, temperature sensors, security monitors, and field operation devices. It's estimated that more than 30 billion devices will be wirelessly connected to the IoT (or Internet of Everything) by 2020, and that IoT or Cloud of Things, such as embedded and wearable devices, will have widespread and beneficial effects by 2025.

Directly connected to the Internet, most of the devices comprising IoT services will need to operate by utilizing standardized technologies. Standardization bodies, such as the Internet Engineering Task Force (IETF) and European Telecommunications Standards Institute (ETSI), are working on developing protocols, systems, architectures and service frameworks to enable the IoT. A newly formed standard body oneM2M has been focusing on M2M/IoT service layer standardization for supporting end-to-end (E2E) M2M/IoT Services.

From a protocol stack perspective, Service Layers are typically situated above the Application Protocol Layer and provide value added services to Applications they support. Hence Service Layers are often categorized as 'middleware' services. FIG. 1 shows an exemplary service layer 102 between the Application Protocols 104 and Applications 106.

An M2M/IoT Service Layer 102 is a service layer specifically targeted towards providing value-added services for M2M/IoT devices and applications. Recently, several industry standard bodies (e.g., ETSI and oneM2M) have been developing M2M/IoT Service Layers to address the challenges associated with the integration of M2M/IoT devices and applications into deployments with the Internet/Web, cellular, enterprise, and home network.

An M2M/IoT Service Layer 102 can provide applications and devices access to a collection of M2M/IoT oriented capabilities supported by the service layer. A few examples include security, charging, data management, device management, discovery, provisioning, and connectivity management. These capabilities are made available to applications via APIs which make use of message formats, resource structures and resource representations supported by the M2M/IoT Service Layer 102.

ETSI M2M architecture is shown in FIG. 2. The ETSI M2M Service Capabilities provide functions that are shared by different applications. The Service Capabilities Layer (SCL) can use Core Network functionalities through a set of exposed interfaces. Additionally, the SCL can interface to one or several Core Networks.

FIG. 2 shows Device Application (DA) 202, Gateway Application (GA) 204 and Network Application (NA) 206.

Network Service Capabilities Layer (NSCL) 208 concerns M2M Service Capabilities in the Network and Applications Domain. Gateway Service Capabilities Layer (GSCL) 210 concerns M2M Service Capabilities in the M2M Gateway. Device Service Capabilities Layer (DSCL) 212 concerns M2M Service Capabilities in the M2M Device.

The oneM2M common services layer supports a set of Common Service Functions (CSFs) (i.e. service capabilities), as shown in FIG. 3. An instantiation of a set of one or more particular types of CSFs is referred to as a Common Service Entity (CSE) 302 which can be hosted on different types of network nodes (e.g. infrastructure node, middle node, application service node).

oneM2M is developing the Service Layer in two architectural approaches, Resource Oriented Architecture (ROA) shown in FIG. 4 and Service Oriented Architecture (SOA) shown in FIG. 5.

A resource is a uniquely addressable element in the architecture having a representation that can be manipulated via RESTful methods such as Create, Retrieve, Update, and Delete. These resources are made addressable using Universal Resource Identifiers (URIs). A resource may contain child resource(s) and attribute(s). A child resource is a resource that has a containment relationship with a parent resource. The parent resource representation contains references to its child resources(s).

The SOA architecture shown in FIG. 5 is being developed to consider legacy deployment that is not RESTful based. It re-uses largely the same Service Layer functional architectural ROA, e.g. CSE 404. The Service Layer contains various M2M services, and multiple services can be grouped into service components. In addition to existing reference points, it introduced the inter-service reference point Msc 502. Communication between M2M Service Components which pass over the Msc reference point utilizes a web services approach, e.g., Web Services Message Exchange Patterns (MEP).

The following reference points are supported by the Common Services Entity (CSE) as shown in FIG. 4.

Mca Reference Point: Communication flows between an Application Entity (AE) 402 and a Common Services Entity (CSE) 404 in the Field Domain or a CSE 406 in the Infrastructure Domain, cross the Mca reference point. These flows enable the AE to use the services supported by the CSE 404 or CSE 406, and for the CSE 404 or CSE 406 to communicate with the AE 402.

Mcc Reference Point: Communication flows between two Common Services Entities (CSEs) such as CSE 404 and CSE 406, cross the Mcc reference point. These flows enable a CSE 404 to use the services supported by another CSE 406.

Mcn Reference Point: Communication flows between a Common Services Entity (CSE) 404 and the Network Services Entity (NSE) 408 cross the Mcn reference point. These flows enable a CSE 404 to use the supported services (other than transport and connectivity services) provided by the NSE 408.

Mcc' Reference Point: Communication flows between two Common Services Entities (CSEs) in infrastructure nodes that are oneM2M compliant and that resides in different M2M SP domains cross the Mcc' reference point. These flows enable a CSE 406 of an infrastructure node residing in the Infrastructure Domain of an M2M Service Provider to communicate with a CSE of another infrastructure node residing in the Infrastructure Domain 410 of another M2M Service Provider to use its supported services, and vice versa. Mcc' extends the reachability of services offered over the Mcc reference point, or a subset thereof. The trigger for these communication flows may be initiated elsewhere in the oneM2M network.

FIG. 6 illustrates the relationships among oneM2M entities supported by the oneM2M architecture (ROA) as shown in FIG. 4. The illustration does not constrain the multiplicity of the entities nor require that all relationships shown are present.

In order to establish certain association and connection between or among communication entities, they may need to discover each other first if they are unknown to each other. There are many discovery schemes across the communication protocol stack layers as shown in FIG. 1.

In general, service discovery is for finding a service offered by a service server or a device. Service Discovery is very broad and may be conducted at different layers or between different layers of a network communication protocol stack. For example, discovering a weather forecast web server is a service discovery at the Service or Application Layer, i.e. to find the weather forecast application on a weather forecast service provider's server. Most web based service discoveries are like this. Another example, discovering a printer locally for printing is a device discovery that may also be conducted at lower layer such as Medium Access Control (MAC) or IP Layer depending on the local network, i.e. to find a device which has printing service. Many Zero-configuration network discovery protocols, such as Universal Plug and Play (UPnP), and proximity device discovery, such AllJoyn, are like this.

Service Layer Entity (SLE) discovery is a process where an Application Layer Entity (ALE) or SLE can query a set of service capabilities provided by an SLE, i.e. service discovery at the Service Layer.

Service Discovery is generally conducted by a client to determine the ID, IP address, host and/or port for a desired service which is either statically provisioned at installation or manually configured via management or control tools and listed in a database or container accessible by the client, or registered at a server and maintained in the registry database or directory which is also accessible by the client.

The DNS server may be used for both service and device discovery as shown in FIG. 7. But here, only DNS Service Discovery DNS-SD 702 is discussed. DNS-SD 702 built on top of the Domain Name System (DNS). The DNS-SD 702 allows clients to discover a list of named services by type in a specified domain using standard DNS queries. The service instance can be described using a DNS service (SRV) (RFC 2782) and DNS text (TXT) (RFC 1035) record.

DNS resource records (RR) are named and structured on a DNS server to facilitate service discovery. Given a type of service that a client is looking for, and a domain in which the client is looking for that service, the DNS-SD allows clients to discover a list of named instances of that desired service, using standard DNS queries for a particular service instance described using a DNS SRV record and DNS TXT record. The SRV record has a name of the form "<Instance>.<Service>.<Domain>" and gives the target host and port where the service instance can be reached. The DNS TXT record of the same name gives additional information about this instance, in a structured form using key/value pairs. A client discovers the list of available instances of a given service type using a query for a DNS pointer (PTR) record with a name of the form "<Service>.<Domain>", which returns a set of zero or more names, i.e. the names of aforementioned DNS SRV/TXT record pairs.

Service Capabilities Layer (SCL), i.e. Service Layer Entity, is generally assumed to be known to the other SCL or Device Application (DA), Gateway Application (GA) and Network Application (NA) via registration. Therefore, it only specifies SCL discovery across multiple M2M domains.

Across domain SCL discovery is triggered by a request arriving at the M2M NSCL originating domain, and the originating domain shall initially perform service discovery through its own resource structure to locate the resources matching the required input.

Simultaneously, or following the completion of service discovery within its own domain, the M2M NSCL originating domain may also send a service discovery request to all other M2M NSCL domains with which it has an agreement.

There are two procedures for the across domain SCL discovery.

1) Look-up Based Procedure without NSCL to NSCL Registration

In this procedure, an NSCL is not required to register with another NSCL. A service discovery request is proxied from the NSCL associated with the originating domain to the target NSCL associated with the target domain based on existing DNS procedures using a private DNS.

2) NSCL to NSCL Registration

In this procedure, an NSCL is required to successfully register with the target NSCL before it proxies a service discovery request to the target NSCL.

oneM2M defines Registration as the process of delivering Application Entity (AE) or Common Services Entity (CSE) information to a CSE, i.e. Service Layer Entity, in order to use the M2M services provided by the Service Layer (i.e. the CSE). Therefore a CSE (i.e. a Registrar CSE) is generally assumed to be known to the other AE or CSE (i.e. Registree AE or CSE) either via pre-configurations (e.g. Intra-SP domain) or public DNS provisioning (e.g. inter-SP domain).

An unknown CSE is discoverable as a special resource only if it's registered at a CSE and its information is maintained in the CSE's resource database. As such, the general resource discovery procedure is also applied to a CSE discovery as a Resource Discovery specified below.

Intra-SP Resource Discovery. Upon receiving a discovery request from an Originator, the Discovery (DIS) Common Service Function (CSF) 310, as shown in FIG. 3, searches information about applications and services as contained in attributes and resources depending on the resource address (e.g. URI) and filter criteria provided by the Originator and the access control policy allowed by M2M Service Subscription. An Originator could be an AE or another CSE. The scope of the search could be within one CSE, or in more than one CSE within the SP domain.

The discovery results are returned back to the Originator. A successful response, i.e. a successful discovery, M2M Services provided by the Service Layer includes the discovered information or address(es) (e.g. URI(s)) pertaining to the discovered resources.

Based on the policies or Originator request, the CSE which received the discovery request can forward the request (i.e. proxy) to other registered ASN-CSEs, MN-CSEs or IN-CSEs within the SP domain.

Inter-SP Resource Discovery. The Originator in the originating SP domain can be any M2M Node such as ADN, an MN, or an ASN, and shall send a request to the Registrar CSE to retrieve a resource located in another M2M SP domain.

The receiving CSE in the originating SP domain can check if the addressed resource is locally available. If the addressed resource is not locally available, then the request can be forwarded to the next hop. If the receiving CSE is on an IN of the originating SP domain, it can check if the addressed resource is locally available within its domain.

If the addressed resource is not located within its own domain, then the IN of the originating SP domain can perform a DNS lookup by using the target hostname provided in the discovery request. A successful DNS lookup can return the IP address of the M2M IN residing in the target M2M SP domain back to the origin IN in the originating SP domain.

As described above, an AE or CSE can specify the target CSE's address (e.g. URI) for both intra-SP and Inter-SP discovery.

As shown in FIG. 7, an automatic Service Layer Entity (i.e. SCL in ETSI's term) discovery scheme is previously proposed which has the following features comparing with ETSI's SCL discovery.

M2M Service Discovery Function (MSDF) discovers SCLs when the network address of the host of the SCL is not known. For example, an M2M Device/Gateway needs a particular type of SCL but does not know the network address of the M2M Server hosting that type of SCL. In such cases, the M2M Device/Gateway can enlist the help of the MSDF via MSDF's hierarchically distributed database which can be accessed by M2M Devices, Gateways, Applications and M2M Servers to discover the network address of the M2M Server offering that type of SCL.

ETSI M2M Well-Known Resource SCL Discovery is a lighter weight procedure compared to the MSDF based approach since it does not require any interaction with an MSDF. This lightweight SCL discovery procedure is particularly well-suited for resource constrained D' devices residing behind an M2M Gateway but can potentially be used in other scenarios also. The prerequisite for using this lightweight SCL discovery procedure is the network address of the host that is to be targeted during the SCL discovery procedure must be known in advance, i.e. a well-known resource used to retrieve a list of URIs for SCLs matching the SCL discovery query criteria that can be included in the SCL discovery request.

DNS Based ETSI M2M SCL Discovery is used to find M2M SCLs when the domain name of the host of the SCL is known, but not the network address. In such cases, the M2M Application/Device/Gateway/Server can enlist the help of a DNS server to discover the network address of the host having the corresponding domain name. Once the network address of the host is known, a mechanism such as the Well-Known Resource SCL Discovery Procedure can be used to find the absolute URI of a SCL residing on the host.

DHCP Based ETSI M2M SCL Discovery can be used to find M2M SCLs via requests to a DHCP server. In such cases, the M2M Device/Gateway makes requests to a DHCP server to discover the address of one or more available M2M SCLs that have been pre-programmed into the DHCP server (e.g. by a DHCP server administrator). A DHCP server can also be used to provide additional SCL information other than the address of the SCL (e.g. types of ETSI M2M service capabilities supported by the SCL, etc.).

Various Device Discoveries for device services are conducted at IP or Transport layer but may also involve Service Layer or Application Layer. Generally, Device discovery finds a computer or device on a local network for its service, such as printing, file transfer, music sharing, servers for photo, document and other file sharing, and services provided by other local devices. Most of the schemes are used for device discoveries in Zero-configuration networking (zeroconf) which automatically creates a usable computer network based on the Internet Protocol (TCP/IP) when computers or network peripherals are interconnected, or in Device-to-Device (D2D) ad hoc local networks for Peer-to-Peer (P2P) communications in proximity.

Multicast DNS (mDNS) Service Discovery (mDNS-SD) is computer local network service discovery which enables users to find services provided locally on the network, such as printer, file sharing servers, etc. mDNS-SD is very similar to DNS-SD by using DNS name resource records (e.g. SRV) except not using the DNS servers. Since there is no DNS server for name resolution service, mDNS-SD uses mDNS for conveying the discovery querying.

mDNS is implemented over a multicast protocol in the environments where no DNS servers exist, i.e. to have a working name resolution service without DNS name servers. mDNS provides a naming service system that is easy to set up and maintain, for computers on a local link. All participating network devices on the same local link perform standard DNS functions, using multicast DNS rather than unicast, and do not need a unicast DNS server. Each computer on the Local Area Network (LAN) stores its own list of DNS resource records (e.g., A, MX, SRV) and joins the mDNS multicast group. When an mDNS client wants to know the IP address of a computer given its name, it sends a DNS request to a well-known multicast address, and then the computer with the corresponding A record replies with its IP address. The mDNS multicast address is 224.0.0.251 for IPv4 (registered by the IANA for this purpose) and ff02::fb for IPv6 link-local addressing.

mDNS resolves DNS names to IP address mapping for local devices, however, it does not provide information about the type of device or its status. Also, mDNS only and exclusively resolves host names ending with the local top-level domain (TLD). This can cause problems if that domain includes hosts that do not implement mDNS but can be found via a conventional unicast DNS server.

Universal Plug and Play (UPnP) is a set of networking protocols that permits networked devices, such as personal computers, printers, Internet gateways, Wi-Fi Access Points (APs) and mobile devices to seamlessly discover each other's presence on the network and establish functional Zero-configuration network services primarily for residential small networks.

The foundation for UPnP networking is IP addressing. Each device implements a DHCP client and search for a DHCP server when the device is first connected to the network. If no DHCP server is available, the device must assign itself an address within the UPnP Device Architecture as AutoIP The UPnP discovery protocol is known as the Simple Service Discovery Protocol (SSDP). When a device is added to the network, SSDP allows that device to advertise itself to control points on the network. When a control point is added to the network, SSDP allows that control point to actively search for devices of interest on the network. After a control point has discovered a device, it retrieves the device's description from the web location (URL) provided by the device in the discovery message for the list of the device's embedded services.

The UPnP protocol, as default, does not implement any authentication; so many UPnP device implementations lack authentication mechanisms by assuming local systems and their users are completely trustworthy. When the authentication mechanisms are not implemented, routers and firewalls running the UPnP Internet Gateway Device (IGD) protocol are vulnerable to attack.

AllJoyn is a system to provide a universal software framework and core set of system services that enable the interoperability among connected products and software applications across manufacturers to create dynamic Device-to-Device proximal networks using a D-Bus message bus. The devices include Smart TV, Smart Audio, Sensors, Appliances, Broadband Gateways, and Automotive.

Since the AllJoyn framework is peer-to-peer, the concept of server and client are no longer the web paradigm. In a peer-to-peer system, every application is the same once connected and can interact with each other.

AllJoyn Applications use and interact with the AllJoyn network by first instantiating the AllJoyn Bus Attachment object and using that object to connect to the AllJoyn Router.

AllJoyn applications can advertise its services via two mechanisms: aboutAnnouncements and Well-Known Name. Depending on available transports, the AllJoyn framework will use different mechanisms to ensure that the application can be discovered by other AllJoyn applications. For IP-based transports, mDNS and a combination of multicast and broadcast UDP packets are used; for Wi-Fi and Wi-Fi_Direct, D-bus is used for broadcast.

AllJoyn applications enter a Discovery state to detect the presence of other AllJoyn applications. Discovery in the AllJoyn framework is done based on the well-known name and well-known name prefix. This prefix is used to identify the application and to indicate what the application is, and it is used for the findAdvertisedName function callback to trigger BusEvent which is the advertising of interest with well-known name on the D-bus from the communication transport (i.e. Wi-Fi, Wi-Fi Direct, etc.). Well-Known Name is a more primitive mechanism for applications to announce and discover each other. It is the mechanism that aboutAnnouncements use. It is recommended for an application to use aboutAnnouncements unless there is a specific need for this lower-level functionality.

In both cases, the process of discovery returns a list of AllJoyn applications identified by its UniqueName. This value is used to subsequently create sessions for further communications.

Joining a session is done once the foundAdvertisedName triggers upon discovering an application's well-known name. The joinSession call in BusAttachment can be made immediately, or the well-known name can be stored and presented in the UI to connect on demand when a user performs an action. Once an application is in a session, every application is a peer and the application that was joined can interact with other joiners; the joiners can interact with the other applications equally.

SUMMARY

Either the centralized service discovery schemes (e.g. DNS-SD, well-known web site or resource, central registry server, etc.) or distributive devices based service discovery schemes (e.g. mDNS-SD, UPnP, AllJoyn, etc.) cannot fully support ad hoc SLE discovery without Internet or infrastructure servers. Mechanisms for discovering an ad hoc Service Layer Entities (aSLEs) either deployed in an ad hoc mode or switched from normal operation mode to ad hoc mode can support the IoT service in a distributive self-organized system. Such mechanisms are especially valuable in disaster or emergency scenarios.

Embodiments include aSLE discovery messages, which may include; locally unique ID detection, generation and management for service layer discovery; service layer multicast or broadcast controlled or managed by transmitter or receiver; security management for service layer discovery messages; service capabilities of an aSLE to be discovered, such as common service layer functions, data storage, computation power, schedule, etc.; current status of an aSLE, such as loading, bandwidth availability, data rate capability, communication delay, location, mobility, etc.; a list of applications, protocols, devices, etc. supported by an aSLE or ALE; and others service requirements and contexts aSLE discovery procedures may include aSLE discovery for deployment in ad hoc mode, i.e. the discoveree is initially deployed for ad hoc operation mode; aSLE discovery initiated by a discoveree—"To Be Discovered"; aSLE discovery initiated by a discoverer—"To Discover"; aSLE discovery managed by a Head aSLE (HaSLE); aSLE discovery for switched ad hoc operation, i.e. the discoveree is switched from normal operation mode to ad hoc operation mode; aSLE discovery initiated by either a discoveree or a discoverer; aSLE discovery managed by a Head aSLE (HaSLE); aSLE discovery proxied; Forward proxy for aSLE discovery; and Reverse proxy for aSLE discovery This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein:

FIG. 19A-C are diagrams of a discovery request message sent by a discoveree.

DETAILED DESCRIPTION OF ILLUSTRATIVE EMBODIMENTS

Even though IoT is viewed as a global Internet connecting "things" or objects and most of the developments have been focusing on a centralized system managed via client and server registration with the service subscriptions, IoT may most likely be a heterogeneous network with network of networks giving countless things connected for vast range of services and applications. This system would be more dynamic than the current view of a centralized system. For example, many IoT services are proximity based, i.e. D2D or P2P communications, which are naturally formed as service clusters joining or leaving the IoT network dynamically. Another example is the IoT services provided in ad hoc for special tasks or events, remote isolated sites, disastrous or emergency situation, etc. Many of these services are not planned or prepared, often improvised or impromptu, therefore they are ad hoc in nature. Furthermore, they may be isolated without access to Internet or infrastructure, e.g. the remote isolated sites, or disastrous or emergency scenario.

How to form and manage IoT ad hoc services has not been fully addressed so far in standard bodies, even though oneM2M has started to discuss how to integrate AllJoyn into oneM2M for proximity based ad hoc services.

As described above, both Service Discovery and Service Layer Entity Discovery are conducted with centralized control and rely on the availability of the following infrastructure elements:

Hierarchical DNS server(s),
A well-known web server or well-known resource, and
A central registry server on Internet or infrastructure It is assumed that these elements are known to the application clients via configuration or provisioning. These mechanisms assume that the IoT system is relatively stable and that all the IoT services are planned and pre-configured with access to Internet and infrastructure elements.

Practical IoT system deployments become more complicated when any of the following features is desired:

service selection adjustments due to system load balance,
service location changes due to scaling or mobility,
service addition or retirement due to new service releases or updates,
service on/off switching due to normal system maintenance or updates or power saving,
service hosts failing or being replaced in emergency,
ad hoc services for special tasks or events, or at isolated remote sites or disastrous situations.

All of the above features require more dynamic service discovery procedures than what is available today in the centralized systems that are available today. These features are particularly important in a distributed self-organized system which is exemplified by the following two use cases.

Use Case 1—Deployed Ad Hoc Service Entity (aSLE)

Figure 8:
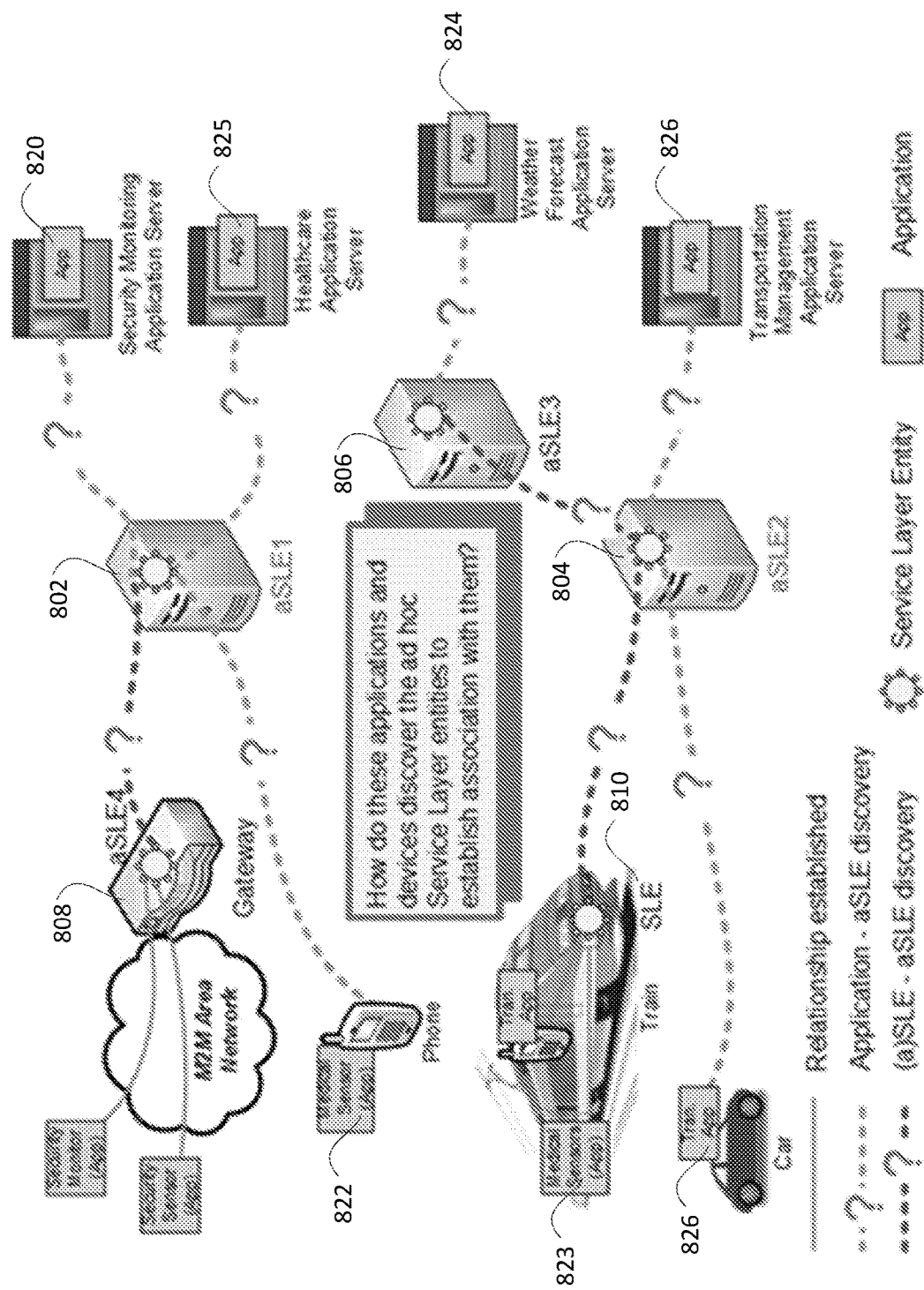
FIG. 8 is a diagram that illustrates a use case 1 for an ad hoc service layer.

In use case 1, as illustrated in FIG. 8, at a disaster site, a First Responder Agency sets up one or multiple aSLEs (e.g. aSLE1 802, aSLE2 804 and aSLE3 806), over ad hoc networks (i.e. 802.11 WLAN, 802.15 WPAN, or 3GPP HeNB deployed in ad hoc) or any available transport network(s) isolated from the infrastructure (i.e. isolated 3GPP eNB) to provide temporary common service capabilities to support critical services or applications such as security monitoring, individual medical monitoring, transportation management, weather forecast, etc., as well as to provide interface(s) to the underlying transport networks. Furthermore, some sensors or devices (e.g. sensors and gateway aSLE4 808) are deployed in ad hoc for security monitoring to support safety at the disastrous site.

In this scenario, these ad hoc deployed SLEs (e.g. aSLE1 802, aSLE2 804, and aSLE3 806) are not pre-known to other SLEs (e.g. gateway aSLE4 808 and train SLE 810) and applications (e.g. security monitoring 820, healthcare 822, 823 and 825, weather forecast 824, transportation management 826) on devices or servers, therefore it's not practical to provision or configure them with the DNS server, well-known resource or web server, or registry server in infrastructure for discovery purpose. Even more, it's most likely that there is no access to Internet and/or to the infrastructure with the DNS server(s) or registry server(s) to provide the necessary information for discovering an aSLE.

It is understood that the functionality illustrated in FIG. 8, may be implemented in the form of software (i.e., computer-executable instructions) stored in a memory of, and executing on a processor of, a node of an M2M network (e.g., a server, gateway, device, or other computer system), such as one of those illustrated in FIG. 32C or 32D described below.

Use Case 2—Switched Ad Hoc Service Entity

Figure 9:
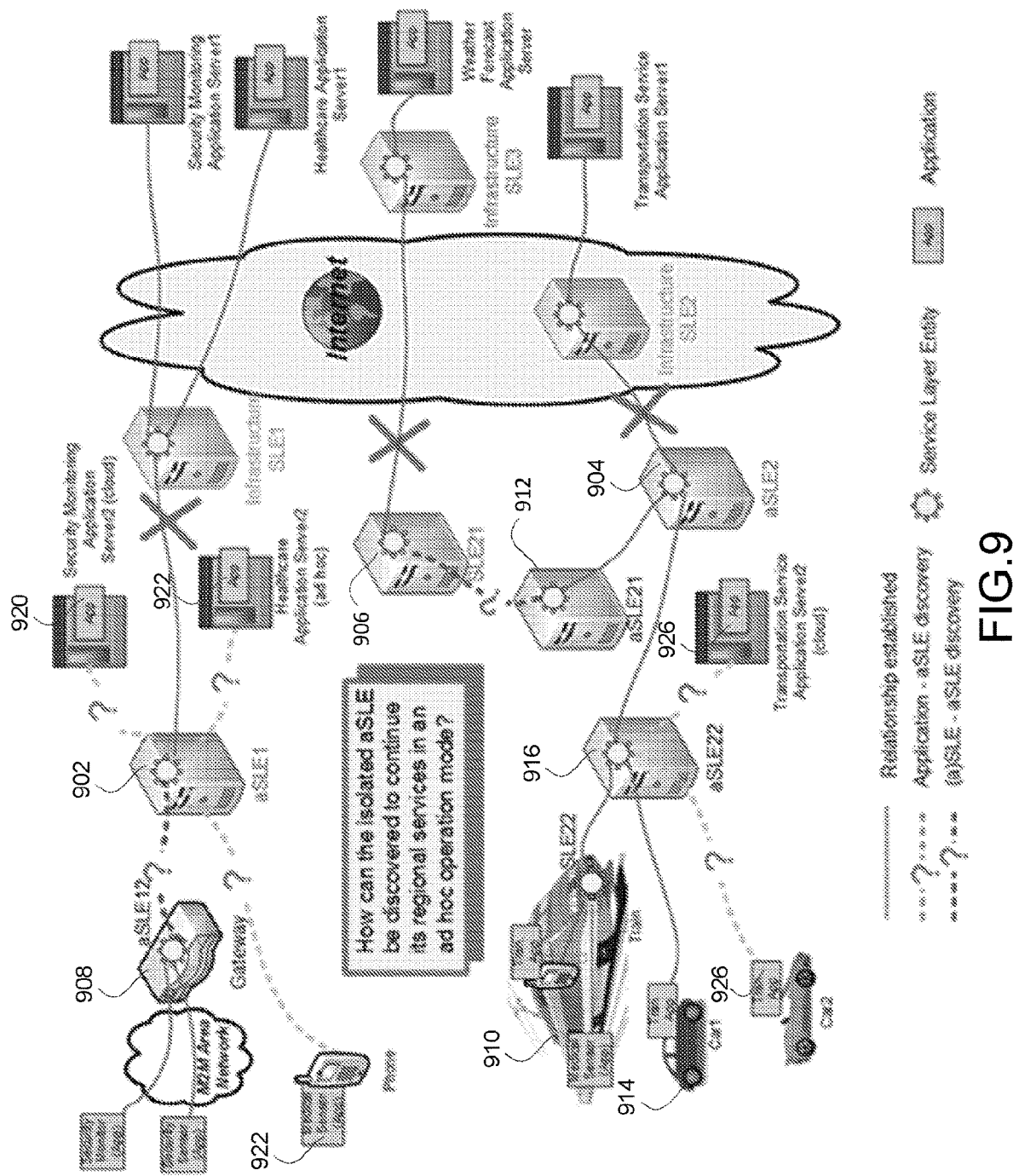
FIG. 9 is a diagram that illustrates a use case 2 for an ad hoc service layer.

In use case 2, as illustrated in FIG. 9, when an emergency happens, a Service Layer Entity (SLE) may lose the connections with the infrastructure or internet (e.g. aSLE1 902, aSLE2 904, and SLE21 906)—this triggers the SLE to transfer into an ad hoc operation mode, if the SLE is capable of ad hoc mode operations (e.g. aSLE1 and aSLE2), to continue providing the services under its scope or domain over the available underlying networks. Once an SLE switched from normal operation mode into ad hoc operation mode, i.e. became an aSLE, it would operate like an aSLE. In this scenario, this SLE is unknown to the applications (e.g. Security Application 920 on Server2, Healthcare Application 922 on Phone or Server2, Transportation Service Application 926 on Car2 or Server2, etc.) and or other (a) SLEs (e.g. gateway aSLE12 908, SLE21 906, etc.) which have not established any relationship with this SLE before the switching, therefore this SLE would be discovered as an aSLE without Internet and infrastructure support. To avoid confusion, after switching into ad hoc operation mode this SLE is treated as an aSLE in the discussions through this disclosure.

The aSLE herein may have more information (i.e. resources) or established relationship (e.g. Train 910 or Car1 914 to aSLE2 904 via aSLE22 916) in the normal operation mode, since the information and/or relationship may be validated and/or obtained while it's connected with the infrastructure or Internet prior to switching from normal operation mode to ad hoc operation mode. These may be useful in the ad hoc operation mode.

Some device based service discovery schemes try to address issues of lack of support of Internet or infrastructure servers at the device level for home or office based simple local networks such as Zero-configuration networks and D2D or P2P ad hoc proximity networks. These networks still have these limitations:

mDNS-SD: using local devices to map their DNS names to the IP addresses—ONLY applicable to the devices with mDNS implementation;

UPnP: relying on the IP address generated by DHCP server or AutoIP and the device description (i.e. device service) pointed by URL (i.e. an internet web site);

AllJoyn: relying on a "well-known name" to identify applications.

Most importantly, these networks all mainly focus on device discovery and the simple applications or services carried by the devices; none of them have addressed how to discover a SLE to utilize its common functions as well as the resources to support the applications and to provide interface to the underlying transport network. These networks also all use simple broadcasting or multicasting without security protection at the service layer to the discovery messages.

In summary, there is still a lack of solution to fully support SLE discovery dynamically in a distributed and self-organized system, as exampled in the above Use case 1 and 2, with security protection to the discovery messages at service layer. How does an application securely discover an aSLE to establish association with them without access to Internet or central server?

How does a peer (a) SLE securely discover an aSLE to establish peer association to form a distributive self-organized service network without access to Internet or central server?

It is understood that the functionality illustrated in FIG. 9, may be implemented in the form of software (i.e., computer-executable instructions) stored in a memory of, and executing on a processor of, a node of an M2M network (e.g., a server, gateway, device, or other computer system), such as one of those illustrated in FIG. 32C or 32D described below.

The following describes discovery schemes for ad hoc Service Layer Entities deployed in ad hoc mode discovery schemes for Service Layer Entities that switch from normal operation mode to ad hoc operation mode. Even though the schemes are discussed with ad hoc Service Layer Entity discovery, the flow and procedures are also applicable to discover general ad hoc Services provided by 3rd party. The schemes are also applicable to a general Service Layer Entity discovery without Internet or infrastructure server based registration, i.e. discovery before or without registration.

Ad Hoc Service Entity (aSLE) Discovery for Deployment in Ad Hoc

Several approaches are proposed in this section mainly based on the scenario exampled by Use Case 1, i.e. an aSLE or multiple aSLEs are deployed in ad hoc mode without having access to the Internet, or central server at infrastructure.

A discovery process may be initiated either by
a Discoveree, i.e. an aSLE operating in ad hoc mode, sending out "To Be Discovered" request, or
a Discoverer, i.e. an application on a device or server, or a peer aSLE operating in ad hoc mode, sending out "To Discover" request.

Both scenarios are described with several schemes in the following two sections respectively.

A "To Be Discovered" request may be sent out by an individual discoveree or by a head discoveree which is the head of a group of discoverees and pre-configured prior to ad hoc deployment. Both cases are discussed in the following two sub-sections.

aSLE Discovery Initiated by an aSLE as a Discoveree

Figure 10:
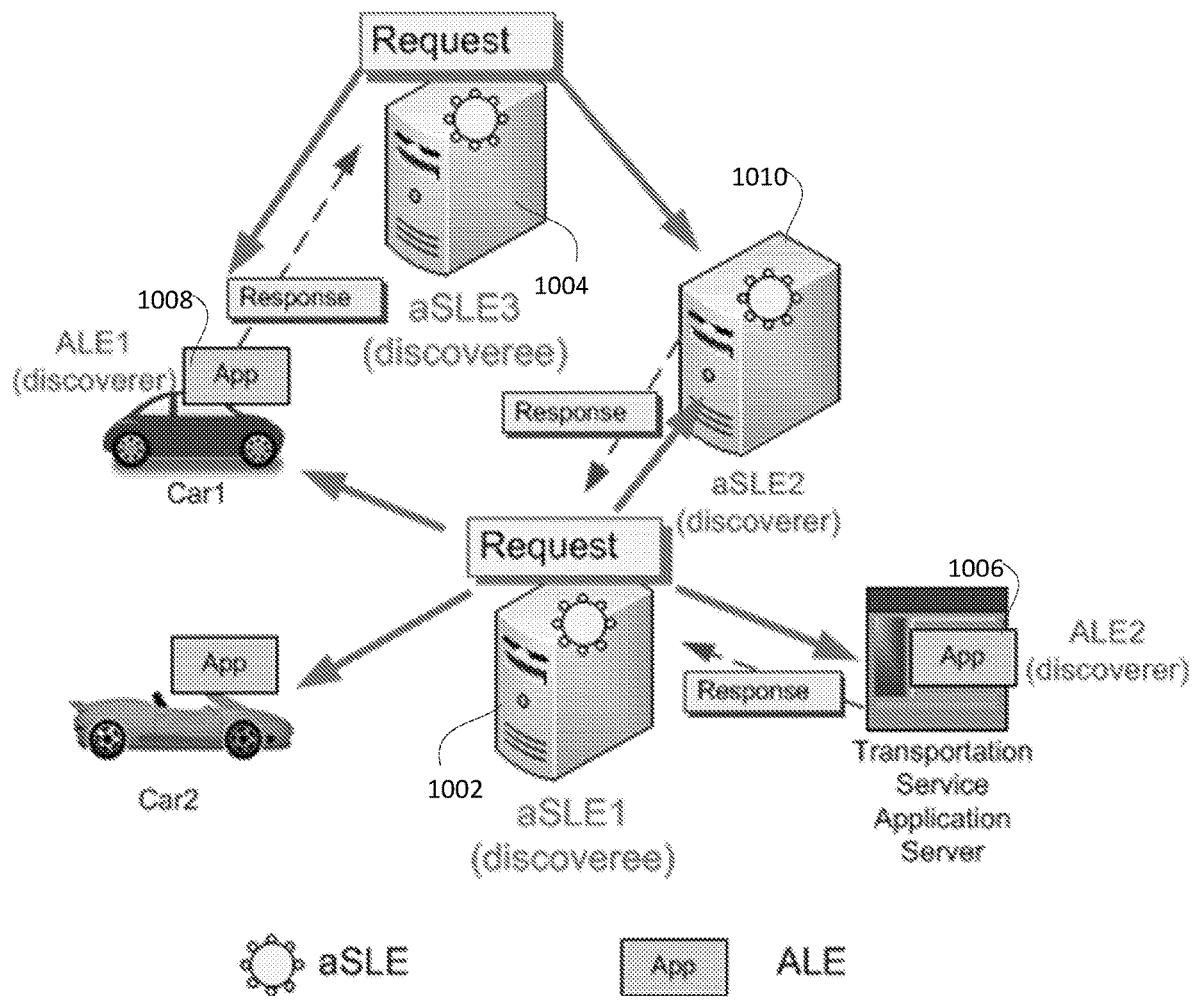
FIG. 10 is a diagram that illustrates aSLE discovery initiated by a discoveree aSLE.

As illustrated in FIG. 10, discoveree aSLE1 1002 and aSLE3 1004 periodically broadcast TO-BE-DISCOVERED REQUEST.

Discoverer ALE2 1006 on Server, discoverer ALE1 1008 on Car1 and discoverer aSLE2 1010 detect the TO-BE-DISCOVERED-REQUEST message from discoveree aSLE1 1002. The contents of this message are shown in Table 1.

Discoverer ALE1 1008 and discoverer aSLE2 1010 also detect the TO-BE-DISCOVERED-REQUEST message from discoveree aSLE3 1004. The contents of this message are shown in Table 1.

Discoverer ALE2 1006 and discoverer aSLE2 1010 decide to send back TO-BE-DISCOVERED RESPONSE message to aSLE1 1002, and then discoveree aSLE1 1002 sends TO-BE-DISCOVERED CONFIRM message to the discover ALE2 1006 and discoverer aSLE2 1010 respectively. The contents of this message are shown in Table 1.

Discoverer ALE1 1008 decides to send back TO-BE-DISCOVERED RESPONSE message to aSLE3 1004, and then discoveree aSLE3 1004 sends TO-BE-DISCOVERED CONFIRM message to the discover ALE1 1008. The contents of this message are shown in Table 1.

The TO-BE-DISCOVERED CONFIRM message is not shown in the FIG. 10 to avoid overcrowding.

It is understood that the functionality illustrated in FIG. 10, may be implemented in the form of software (i.e., computer-executable instructions) stored in a memory of, and executing on a processor of, a node of an M2M network (e.g., a server, gateway, device, or other computer system), such as one of those illustrated in FIG. 32C or 32D described below.

The service layer broadcast or multicast messaging relies on the underlying network's broadcasting or multicasting mechanisms. An ad hoc service, either deployed directly or switched from normal operations, can be provided over an isolated Local Area Network (LAN). The isolated LAN can be an isolated eNB or HeNB, or an isolated local area Wi-Fi WLAN network, for covering a small local area service at much smaller scale comparing with Internet based IoT system supported by Wide Area Network (WAN) and/or other IP networks, This makes it manageable to broadcast or multicast at a service layer. For example, the broadcast or multicast messages may be transmitted by using the underlying networks' broadcast or multicast features such as broadcasting channel or Multicast-Broadcast Single-Frequency Network (MBSFN) of 3GPP LTE; and broadcasting or multicasting of the WI-FI WLAN at the WLAN controller or Accessing Point (AP).

However, a service layer may manage or control the discovery messages based on the current system loading and the discovery requirements. The discovery message traffic may be managed or controlled at service layer in the following approaches.

Discovery Message Traffic Control by a Transmitter.

A transmitter may decide which way to send a discovery message, i.e. broadcasting, multicasting or unicasting, based on its discovery requirements and the current traffic status. For example, if the aSLE is deployed for restricted usage (i.e. rescue team or security agent), the transmitter will send the discovery messages in unicast with the destination address preconfigured. For another example, if the aSLE is deployed for Red Cross agent or other public service purpose, the transmitter may start broadcast first if the system is not over loaded and then later switch to multicast if the system is getting busy, or vice visa. The transmitter can pass a "Transport Method" parameter in the discovery message header to the underlying transport network for indicating the transportation method.

A transmitter may also regulate the discovery message traffic based on the current traffic at the service layer by controlling how frequently the discovery messages would be sent, or how frequently a discovery procedure would be conducted. This parameter in discovery message header is also passed to the underlying transportation network for scheduling purposes.

Discovery Message Traffic Control by a Receiver

A receiver may request that the underlying network block discovery messages if it is not in ad hoc discovery state, e.g. passing ad hoc discovery indicator "aDiscovery=false" to the underlying network. The receiver may switch "aDiscovery=true" when it enters into hoc discovery state. The interaction messages with the underlying network may be managed by the ad hoc Discovery function or by the communication manager at the service layer.

A receiver in ad hoc discovery state may decide when to listen to the discovery messages and notify the underlying network accordingly, e.g. "aDiscoveryListen=true" with "aDiscoveryListenTime/Period", based on its discovery requirements and the current traffic status. The interaction messages with the underlying network may be managed by the ad hoc Discovery function or by the communication manager at the service layer.

A receiver in ad hoc discovery state may decide to respond the discovery message or not based on its discovery requirements and current traffic status.

As summarized in Table 1, the discovery messages of one embodiment are defined and described below.

TABLE 1

Discovery Messages for
"To-Be-Discovered" Initiated by a Discoveree aSLE

| Message | Type | Description |
| --- | --- | --- |
| TO-BE-DISCOVERED REQUEST | broadcast/ multicast/ unicast | Request for "To-Be-Discovered", which may contain the following: Sequence Number or ID Proxy Indicator Message Type Discovery Period Discoveree ID Discoveree IP Address Transport Method Service Provider (optional) Service Capability (optional) Data Storage (optional) Current Status (optional) Supported Applications (optional) Supported Protocols (optional) Supported Devices (optional) Security (optional) Discover ID List (optional) Others (requirements and service context) (optional) |
| TO-BE-DISCOVERED RESPONSE | broadcast/ multicast/ unicast | Response to "To-Be-Discovered", which may contain the following: Sequence Number or ID Proxy Indicator Message Type Discoverer ID Discoverer IP Address Transport Method Service Capability/Service Required (optional) Data Storage/Data Storage Required (optional) Performance Requirements (optional) Supported Applications/Application Type (optional) Supported Protocols (optional) Supported Devices/Device Type (optional) Security (optional) Others (requirements & context) (optional) |
| TO-BE-DISCOVERED CONFIRM | unicast | Confirm to "To-Be-Discovered", which may contain the following: Sequence Number or ID Message Type Accept Reject |

To-be-Discovered Request

Sequence Number or ID: the sequence number or ID of the messages transmitted by a discoveree, this may be used for matching request and response messages.

Proxy Indicator: allows proxy mode if it is set to true. An aSLE may proxy this message to others if this flag is set true.

Message Type: indicates the type of discovery messages, i.e. discovery request, so that the underlying network may decide if the message would be delivered to certain receivers at the service layer. For example, if a message is indicated as an ad hoc discovery request message, then this message will not be delivered to the receivers which are not in ad hoc discovery state and/or not in ad hoc discovery listening period.

Discovery Request Period: indicates how frequently a discoveree sends discovery request message. A discoveree may use this parameter to regulate the discovery messaging traffic based on its discovery requirements and the current system status.

Discoveree ID: a locally unique Service Layer Entity ID (i.e. unique to different SLEs on the same node which has uniquely addressed by the IP address from the underlying network) for the discoveree. The discoveree ID may be:
Pre-configured
 by the device manufacturer,
 by service providers via accessing an ad hoc service certification web site before the deployment in ad hoc, or
 manually by ad hoc service providers before deployed in ad hoc service mode
Self-selected
 randomly from the Discoveree ID list pre-configured, or
 after discoveree ID detection conducted by the discoveree
Self-defined
 randomly with certain naming convention pre-configured, or
 after discoveree ID detection conducted by the discoveree with certain naming convention.

Discoveree IP Address: IP address used by the underlying transport network.

Transport Method: broadcast/multicast/unicast for sending this message via the underlying transport network's protocol based on its discovery requirements and the current system status, as exampled below.
Broadcast: for "to be discovered" by anyone who may receive this "TO-BE-DISCOVERED REQUEST".
 Set the broadcast/multicast flag or indicator as "true" without the destination address or with a reserved destination ID and/or address for broadcasting only. This is passed to the transport layer for indicating transmitting method to the underlying network.
Multicast: for "To Be Discovered" by a specific group addressed by a multicast address.
 Set the broadcast/multicast flag or indicator as "true" with a reserved destination ID and/or address or a group ID and/or address for multicasting.
Unicast: for "To Be Discovered" by a specific discoverer addressed by an address.
 Set the broadcast/multicast flag or indicator as "false" with a destination ID and/or address for unicasting.

TABLE 2

Fields of Transport Method

| | Transport Method | |
|---|---|---|
| Type | Broadcast/Multicast | Destination Address |
| Broadcast | 1 | Null or a reserved ID and/or address for broadcasting |
| Multicast | 1 | An ID and/or address reserved or a group ID and/or address for multicasting |
| Unicast | 0 | An ID and/or address for unicasting |

Service Provider: indicates the service provider that operates discoveree aSLE. For example, a public service agent, health emergency service agent, public security agent, transportation control and management agent, social networking provider etc. This field may be used for a discoverer to quickly decide if this is a desired discoveree that it would be beneficial to continue reading more information about the aSLE such as Service Capabilities, Current Status, etc. for discovery.

Service Capability List: indicates the common services that a discoveree aSLE is capable to provide, such as
 AL and SL management,
 data and repository management,
 communication and delivery management,
 security management,
 device management,
 group management,
 location management,
 registration and service subscription management
 service charging and accounting management,
 semantics support,
 data analytics,
 interface and interactions to the underlying network, etc.

Since the values of all the parameters of the service capability list are Boolean logic "true" or "false", as an example, this field may be constructed as a bit string of "1's" or "0's" where "1" is for "true" and "0" is "false" illustrated in Table 3.

TABLE 3

Example of Service Capability List

| Bit String | Service Capability List |
|---|---|
| {1111 1001 1001} | { AL & SL = true, data & repository = true, Communication & delivery = true, security = true, device = true, group = false, location = false, registration & service subscription = true, service charging & accounting = true, semantics = false, data analytics = false, interface = true } |

Data Storage: total data storage capacity, accessing rules, management policy, etc.

Current Status: this may be updated periodically with the following information:
 statistical performance measurements, such as service layer packet rate, service layer packet error rate, transport network traffic loading, transport network traffic latency, etc.
 scheduling, such as access time allocation, etc.
 geolocation
 mobility
 current system time,
 available data storage not used yet
 current CPU loading, etc.

Supported Applications: list of supported applications, such as security, medical, transportation, social networking, etc.

Supported Protocols: list of supported protocols, such as HTTP, CoAP, MQTT, etc.

Supported Devices: list of supported devices, such as computer servers, PCs, tablets, smart phones, game console, etc.

Security: defines security related parameters, such as security key methods, security key generation algorithms, etc. used for discovery message. For example, set the indicator "0" as "Symmetric Key method" and "1" as "Asymmetric Key method". If using Public Key Method (i.e. Asymmetric Key method), may also include the public key.

Symmetric Key: symmetric key may be pre-programmed on the devices by the device manufacturer,
by the service provider via accessing an ad hoc service certification web site prior to the deployment in ad hoc, or
manually by the service provider before deploying the ad hoc service mode The key may be used by the discoveree to encrypt the "To Be Discovered" request message which can be decrypted only by the discoverers sharing the same key. It may also be used by the discoverer(s) sharing the same key to encrypt the "To Be Discovered" response message which can be decrypted only by the discoveree. This ensures end-to-end security at service layer for discovery messages between a discoveree and a discoverer.

Asymmetric Key: the authentication of public key of the public-private key pair may be conducted during the pre-configuration stage by device manufacturer or service provider via using
a public-key infrastructure (PKI), or
the "web of trust"
, prior to the ad hoc deployment.

TABLE 4

Fields of Security Key

| Public Key | Key | Description |
|---|---|---|
| 0 | Null | Use Symmetric Key method |
| 1 | Public key of the discoveree | Use Asymmetric Key method |

The discoveree (i.e. the sender) may use its private key for its Digital Signature included in the "To Be Discovered" request message to be decrypted by a discoverer (i.e. a receiver) with this discoveree's public key which is either pre-configured or transmitted with this message. If a discoveree's public key is embedded in this message, the discoverer may use its private key to decrypt this request message and then extract the discoveree's public key encrypted in this message to check the discoveree's digital signature. This ensures that the message remains unchanged between the discoveree and the discoverer, i.e. the authentication of this request message.

A discoverer may use the discoveree's public key to encrypt the "To Be Discovered" response message sent back to the discoveree and to be decrypted by the discoveree with its private key. This ensures the confidentiality of the response message from the discoverer.

Both Discoveree(s) and Discoverer(s) may be preconfigured with multiple pairs of public-private keys. Once a discoverer receives a message with a public key from a discoveree, it knows which of its private keys is paired with this public key and can use this private key to decrypt the discoveree's message. All the private keys are kept by discoveree(s) and discoverer(s) respectively, and only the public key is passed in the message. Since in ad hoc operation there is no website or server for public keys, one way to deliver the public key is passing it with the message. It may also be envisioned that a hash of the public key may be sent as part of the message instead of including the public key itself.

Discover ID List: suggested ALE or aSLE ID or ID list to be used by a discoverer for replying the discovery message to avoid name conflicting. The discover IDs are locally unique (i.e. unique for different ALEs or aSLEs on a node uniquely addressed by the IP address) and may be pre-defined
by the device manufacturer,
by the service provider via accessing an ad hoc service certification web site, or
manually by the service provider before deploying the ad hoc service.

This may also be defined after the ID detection (i.e. the IDs that have been used already).

Others: requirements or discoveree context
Requirements: such as accessing priority, time or resource allocation, etc.
Contexts: about the discoveree such as, service expiration time, revision, etc.

To-be-Discovered Response
Sequence Number or ID: the sequence number or ID of the discovery request message transmitted by a discoveree, this may be used for matching request and response messages.

Proxy Indicator: allows proxy mode if it is set to true. An aSLE may proxy this message to others if this flag is set true.

Message Type: indicates the type of discovery messages, i.e. discovery response, so that the underlying network may decide if the message would be delivered to certain receivers or not at the service layer. For example, if a message is indicated as an ad hoc discovery response message, then this message will not be delivered to the receivers which are not in ad hoc discovery state and/or not in ad hoc discovery listening period.

Discoverer ID: a locally unique ALE and/or aSLE ID for the discoverer, which may be defined, for example, via
Pre-configured
by the device manufacturer,
by the service provider via accessing an ad hoc service certification web site prior to the deployment in ad hoc, or
manually by the service provider before the deployment in ad hoc
Self-selected
randomly from the Discoverer ID list pre-configured or suggested by the discoveree, or
from the Discoverer ID list after discoverer ID detection conducted by the discoverer
Self-defined
randomly with certain naming convention pre-configured, or
after discoverer ID detection conducted by the discoverer with certain naming convention.

Discoverer IP Address: IP address used by the underlying transport network.

Transport Method: broadcast/multicast/unicast for sending this message via the underlying transport network's protocol based on its discovery requirements and the current system status, as exampled below.

Unicasting is fully supported after receiving the discoveree's request message. But a discoverer could broadcast or multicast its response encrypted with the discoveree's public key and only the discoveree can decrypt this response with its private key. This provides an option of detecting the discoverer IDs if the ID field is not encrypted.

Broadcast: to anyone who may receive this "TO-BE-DISCOVERED RESPONSE".
Set the broadcast/multicast flag or indicator as "true" without the destination address or with a reserved destination address for broadcasting only.

Multicast: to a specific group addressed by a multicast address.
  Set the broadcast/multicast flag or indicator as "true" with a destination ID and/or address for multicasting.
Unicast: to the discoveree addressed by its address.
  Set the broadcast/multicast flag or indicator as "false" with the discoveree's ID and/or address.
Proxy Indicator: allows proxy mode is set to true.
Service Required: service capabilities specifically required by an ALE or aSLE as the discoverer. It may include any of the following:
  AL and SL management,
  data and repository management,
  communication and delivery management,
  security management,
  device management,
  group management,
  location management,
  registration and service subscription management
  service charging and accounting management,
  semantics support,
  data analytics,
  interface and interactions to the underlying network, etc.
Data Storage Required: Data Storage required by an ALE or aSLE as the discoverer. It may include data storage capacity, accessing rules, management policy, etc., which are specifically from the discoverer if needed.
Performance Requirements: Performance required by the discoverer. It may include data rate, error rate, loading, latency, data storage or CPU allocation, etc. These are specifically from the discoverer if needed.
Supported Applications/Application Type: Supported Applications for a peer aSLE as the discoverer, and Application Type for an ALE as the discoverer. It may be a list of applications supported by the peer aSLE as a discoverer or a specific application type for the ALE as a discoverer. These are specifically from the discoverer if needed.
Supported Protocols: list of supported protocols, such as HTTP, CoAP, MQTT, etc., which are specifically from the discoverer if needed for multi-protocol support.
Supported Devices/Device Type: Supported Devices for a peer aSLE as the discoverer, and Device Type for an ALE as the discoverer. It may include a list of supported devices supported by the peer aSLE as a discoverer or a specific device type for the ALE as a discoverer.
Security: defines security related parameters, such as security key methods, security key generation algorithms, etc. used for the following TO-BE-DISCOVERED CONFIM message from the discoverer if the discoverer wants different security key scheme. For example, set the indicator "0" as "Symmetric Key method" and "1" as "Asymmetric Key method". If using Public Key Method, may also include the public key.
Symmetric Key: the symmetric (shared) key may be used by the discoverer to encrypt the next TO-BE-DISCOVERED CONFIRM message.
Asymmetric Key: The discoverer may use its private key for its Digital Signature included in the "To Be Discovered" response message to be decrypted by the discoveree with this discoverer's public key, and the discoveree may use this discoverer's public key to encrypt the next TO-BE-DISCOVERED CONFIRM message to be decrypted by the discoverer with its private key.
Others: requirements or discoverer context
Requirements: such as accessing priority, time or resource allocation, etc.
Contexts: about the discoverer such as geolocation, mobility, time, revision, etc.
To-be-Discovered Confirm
  Sequence Number or ID: the sequence number or ID of the messages transmitted by a discoveree, this may be used for matching with request message.
  Message Type: indicates the type of discovery messages, i.e. discovery confirm.
  Accept: to confirm a successful discovery, and may include a new ID(s), a new key, and other parameters or contexts to be used for following sessions.
  Reject: to indicate a failed discovery, and may include the reasons for failure.

Figure 11:
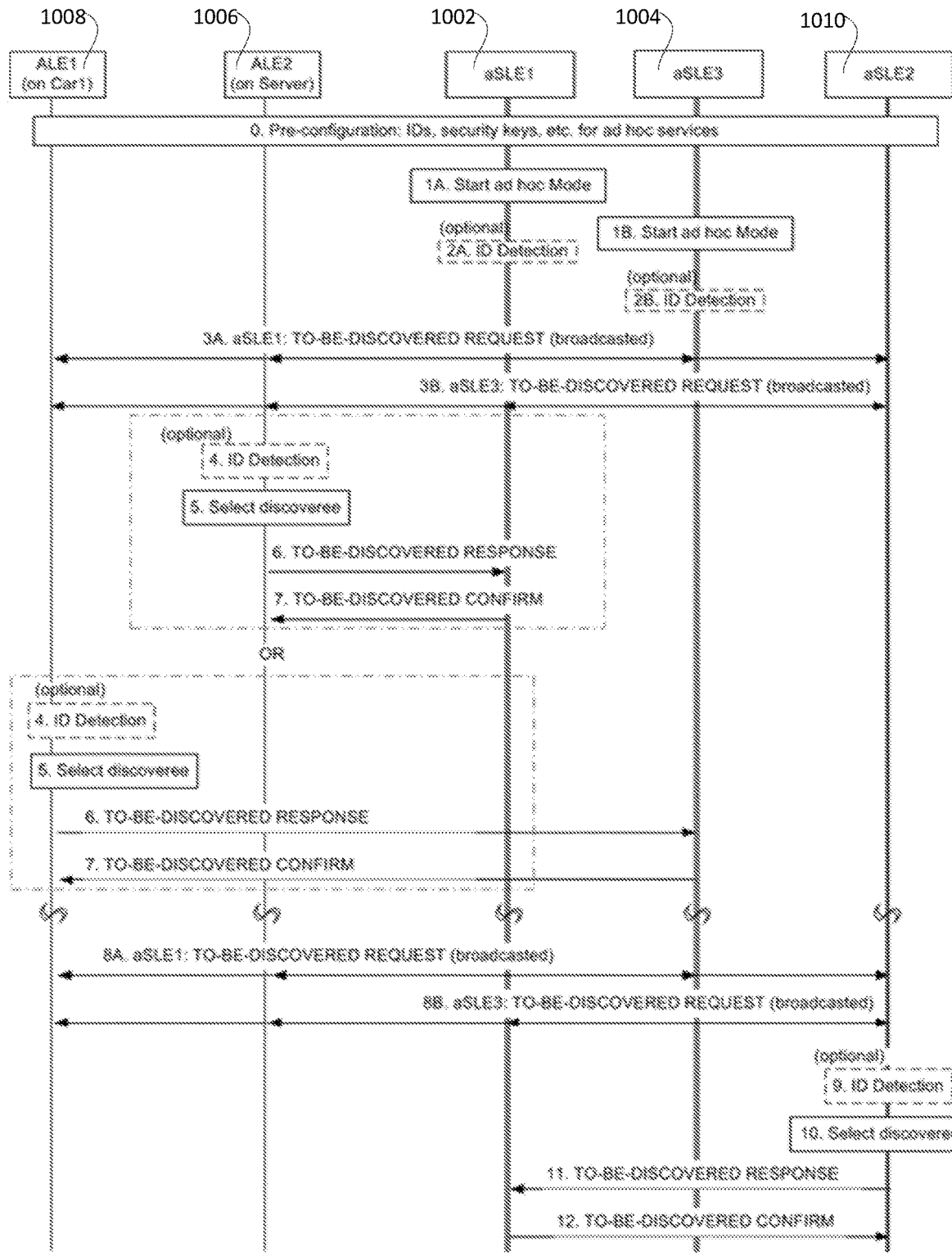
FIG. 11 is a diagram of a call flow for the aSLE discovery initiated by a discoveree aSLE of FIG. 10.

FIG. 11 shows the message call flow for aSLE Discovery Initiated by an aSLE, which may include the following steps.

Step 0 of FIG. 11 is a pre-configuration step. In step 0 of FIG. 11, all the ALEs and aSLEs supporting ad hoc operations can be preconfigured:
  by the device manufacturer,
  by the service provider via accessing an ad hoc service certification web site prior to the deployment in a hoc, or
  manually by the service provider before deploying the ad hoc service mode, for default settings required by ad hoc services, e.g. IDs, security keys, etc.

In step 1 of FIG. 11, an ad hoc Mode is started. The discoveree aSLE1/aSLE3 is triggered from the underlying network or commanded by the communication manager at the service layer to enter into ad hoc Mode.

Step 2 of FIG. 11 is an optional ID Detection step. The discoveree aSLE1/aSLE3 can scan the IDs in the discovery message header that have already been used by discoveree(s) or discover(s) which will not be assigned to other discoveree(s) or discoverer(s) to ensure the local uniqueness of IDs.

In step 3 of FIG. 11, the discoveree aSLE1/aSLE3 periodically broadcasts "To Be Discovered" request message.

Step 4 of FIG. 11, is an optional ID Detection step. The discoverer ALE2 or ALE1 scans the IDs that have already been used by discoverer(s) which will not be assigned to other discoverer(s) to ensure the local uniqueness of IDs.

In step 5 of FIG. 11, discoverer ALE2/ALE1 selects the discoveree based on: Service Provider, Service Capability, Data Storage, Current Status, Supported Applications, Supported Protocols, Supported Devices, etc. from the TO-BE-DISCOVERED REQUEST message, and its own requirements for a discoveree.

In step 6 of FIG. 11, discoverer ALE2/ALE1 sends the TO-BE-DISCOVERED RESPONSE message to the discoveree aSLE1/aSLE3.

In step 7 of FIG. 11, discoveree aSLE1/aSLE3 sends a TO-BE-DISCOVERED CONFIRM message to ALE2/ALE1 for a successful or failed discovery
  (After Discovery Request Period))

In step 8 of FIG. 11 periodically, discoveree aSLE1/aSLE3 broadcasts "To Be Discovered" request message.

Step 9 of FIG. 11, is an optional ID Detection step. The discoverer aSLE2 scans the IDs that have already used by discoverer(s) which will not be assigned to other discoverer(s) to ensure the local uniqueness of IDs.

In step 10 of FIG. 11, discoverer aSLE2 selects discoveree aSLE1 based on Service Provider, Service Capability, Data Storage, Current Status, Supported Applications, Supported Protocols, Supported Devices, etc. from the TO-BE-DISCOVERED REQUEST message and its own requirements for a discoveree.

In step 11 of FIG. 11, the discoverer aSLE2 sends the TO-BE-DISCOVERED RESPONSE message to the discoveree aSLE1.

In step 12 of FIG. 11, the discoveree aSLE1 sends TO-BE-DISCOVERED CONFIRM to aSLE2 for a successful or failed discovery.

Figure 32A:
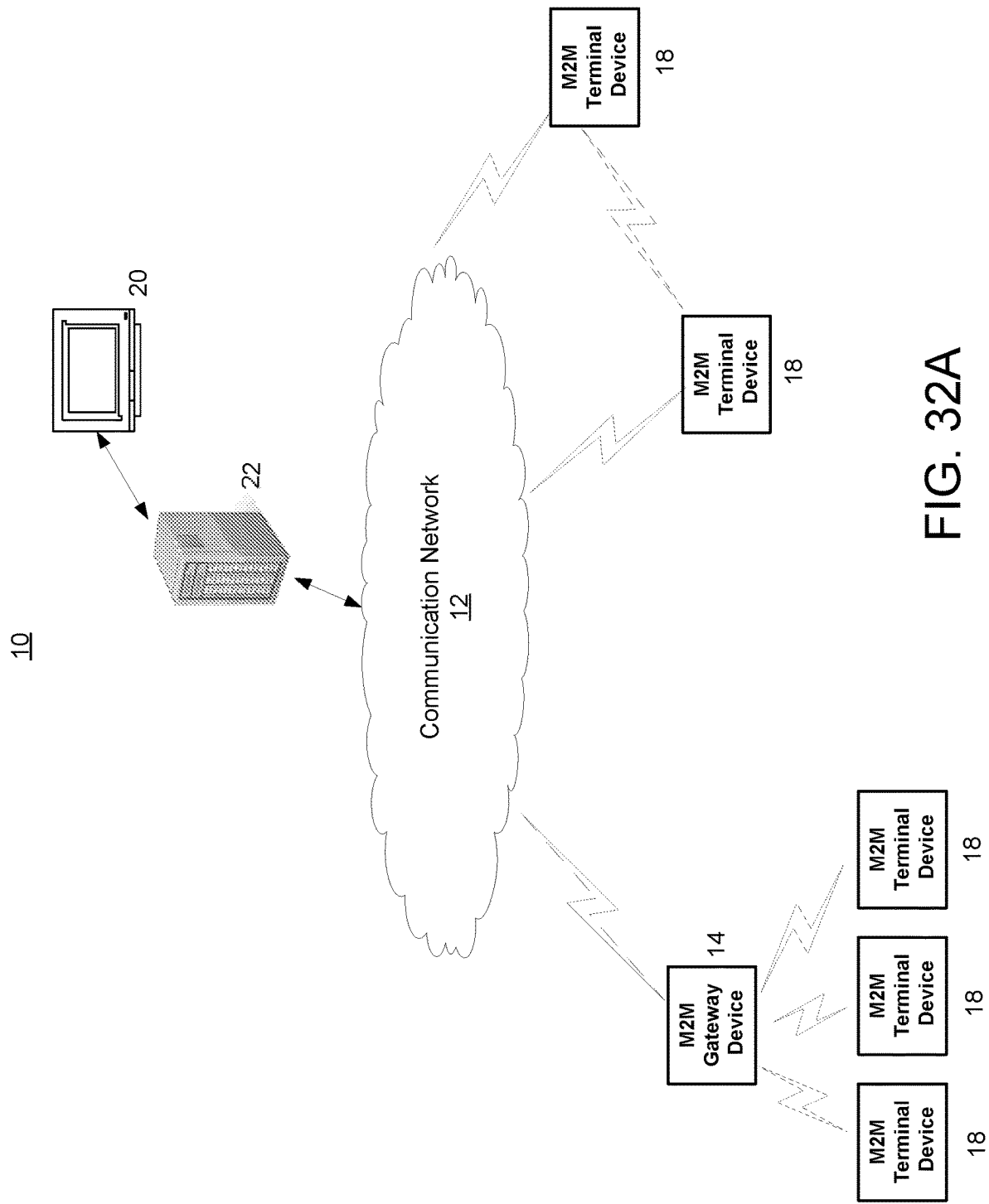
FIG. 32A is a diagram of an example machine-to machine (M2M) or Internet of Things (IoT) communication system in which one or more disclosed embodiments of IoT event management systems and methods may be implemented.
Figure 32B:
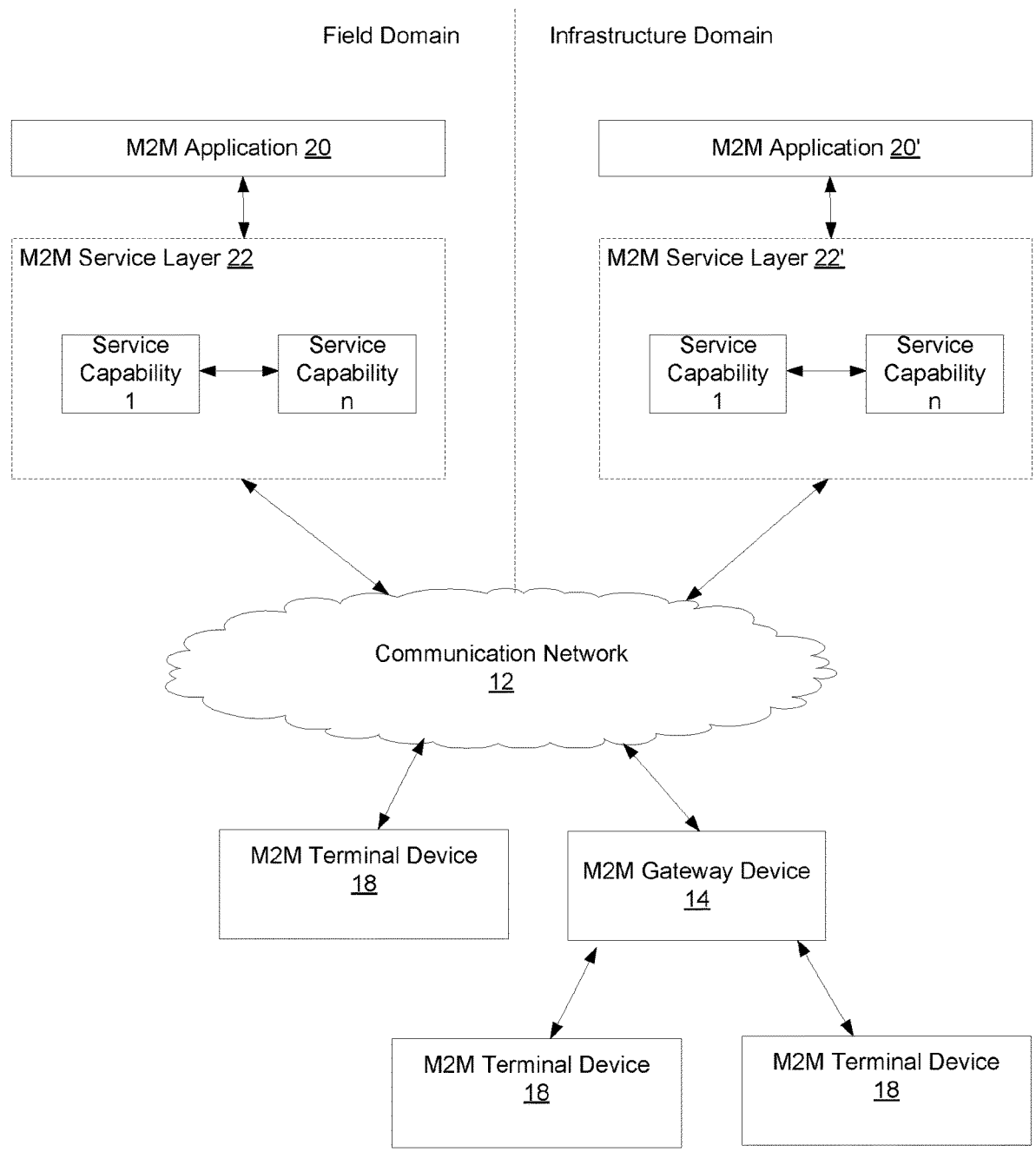
FIG. 32B is a system diagram of an example architecture that may be used within the M2M/IoT communications system illustrated in FIG. 32A.
Figure 32C:
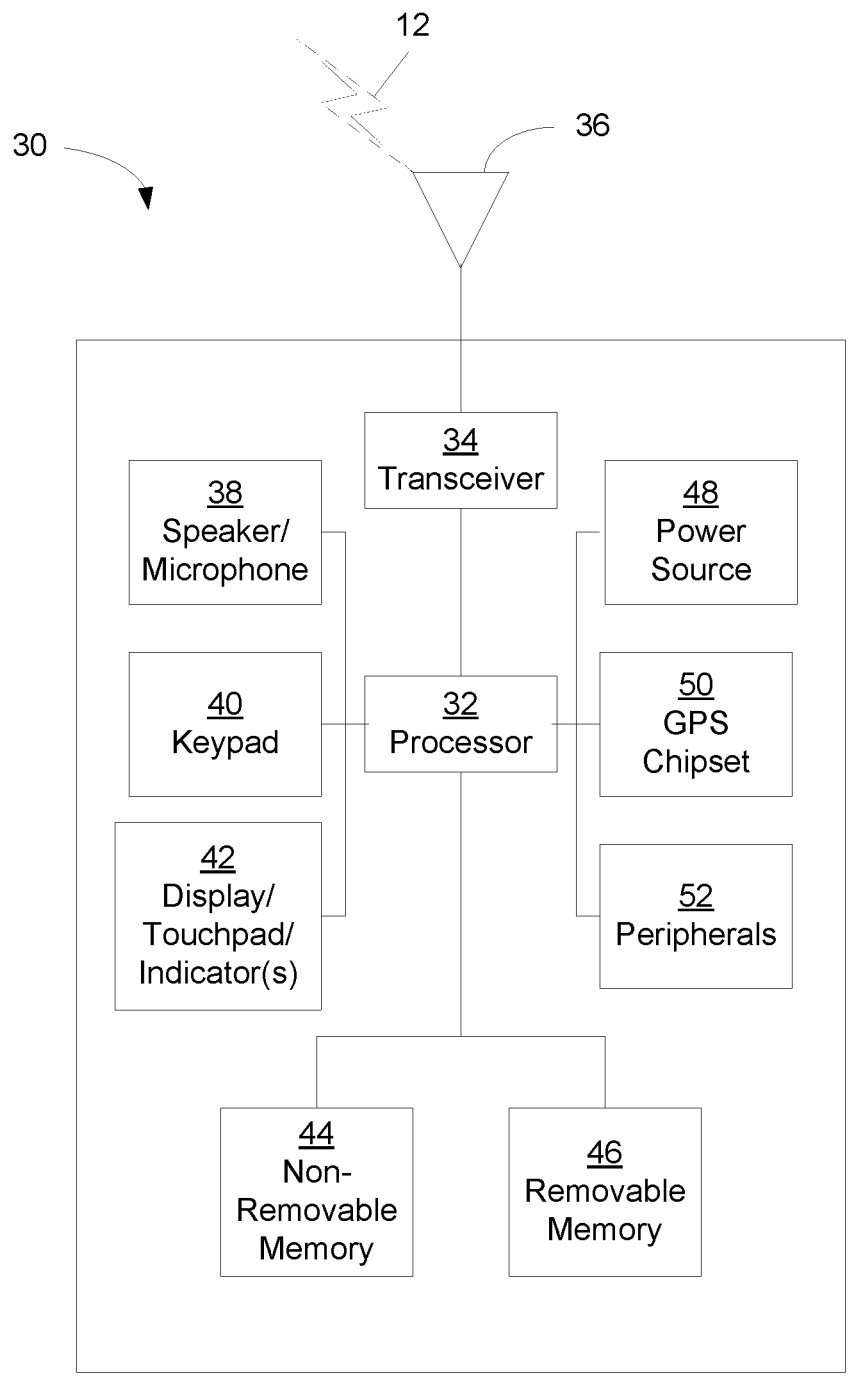
FIG. 32C is a system diagram of an example M2M/IoT terminal or gateway device that may be used within the communications system illustrated in FIG. 32A.
Figure 32D:
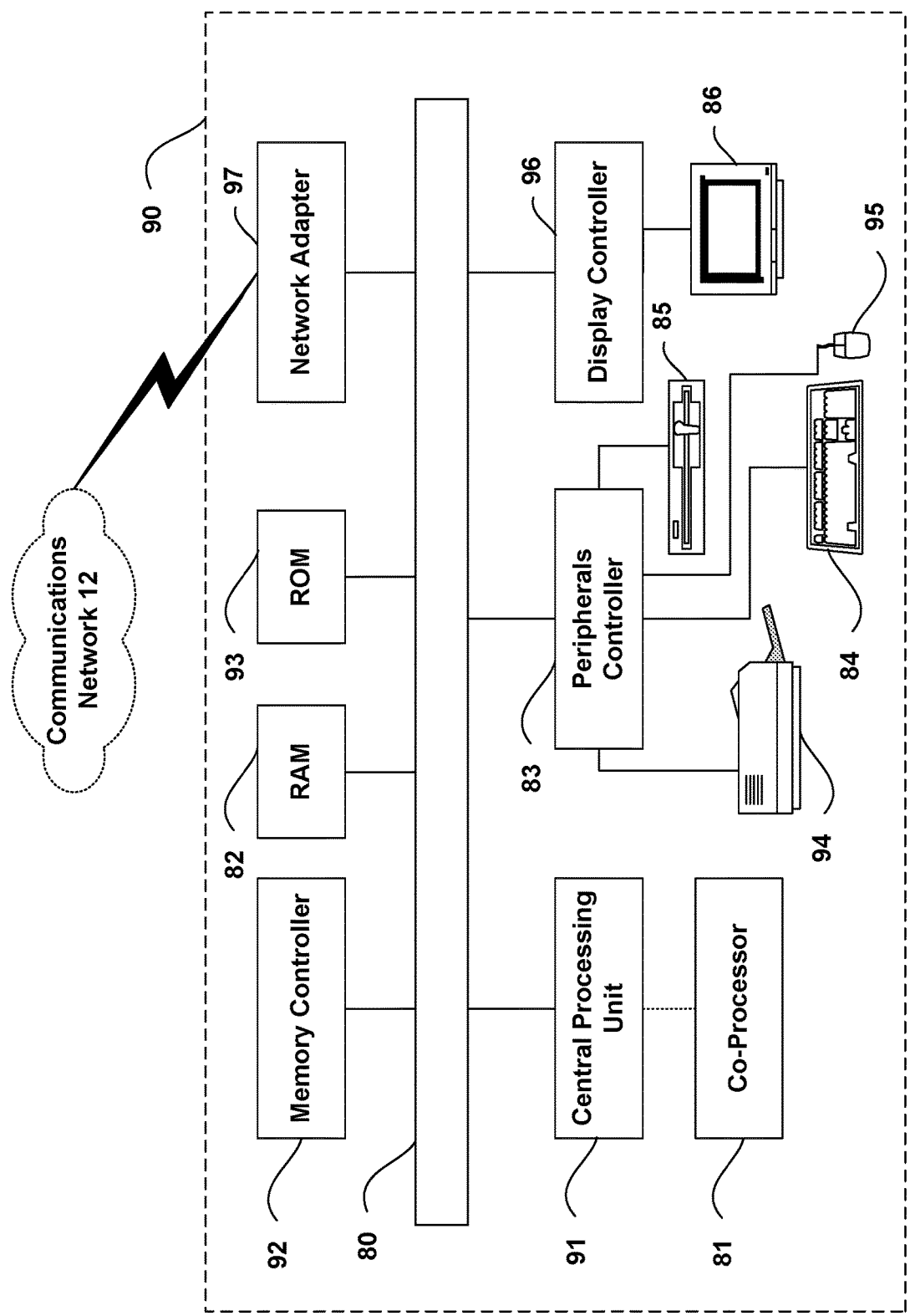
FIG. 32D is a block diagram of an example computing system in which aspects of the communication system of FIG. 32A may be embodied.

It is understood that the entities performing the steps illustrated in FIG. 11 are logical entities that may be implemented in the form of software (i.e., computer-executable instructions) stored in a memory of, and executing on a processor of, a network node or computer system such as those illustrated in FIG. 32C or FIG. 32D. That is, the method(s) illustrated in FIG. 11 may be implemented in the form of software (i.e., computer-executable instructions) stored in a memory of a network node, such as the node or computer system illustrated in FIG. 32C or FIG. 32D, which computer executable instructions, when executed by a processor of the node, perform the steps illustrated in FIG. 11. It is also understood that any transmitting and receiving steps illustrated in FIG. 11 may be performed by communication circuitry of the node under control of the processor of the node and the computer-executable instructions (e.g., software) that it executes.

aSLE Discovery Initiated by a Head aSLE (HaSLE) as a Discoveree

Figure 12:
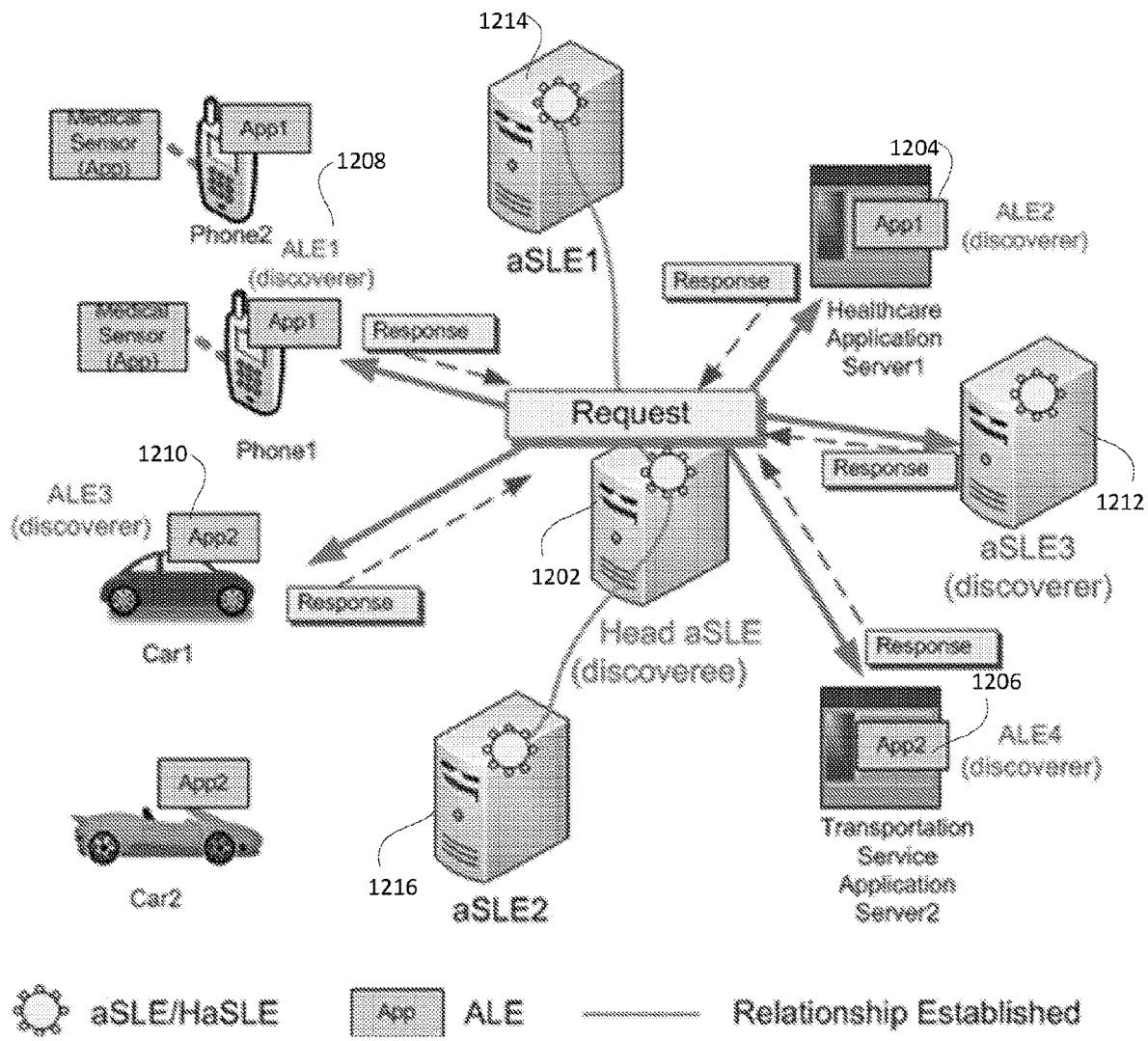
FIG. 12 is a diagram that illustrates aSLE discovery initiated by a discoveree Head aSLE (HaSLE).

In some scenarios, an ad hoc service provider deploys multiple aSLEs together with one aSLE as the HaSLE taking most of the control and management roles to reducing the total discovery messaging overhead, as illustrated in FIG. 12.

For ad hoc discovery, the discoveree HaSLE 1202 periodically broadcasts TO-BE-DISCOVERED REQUEST message, discoverer ALE2 1204 (i.e. App1 Server1), ALE4 1206 (i.e. App2 Server2), ALE1 1208 (i.e. App1 Phone1), ALE3 1210 (i.e. App2 Car1) or aSLE3 1212 receives the "To Be Discovered" request and sends back TO-BE-DISCOVERED RESPONSE message to discoveree HaSLE separately. Then discoveree HaSLE selects an aSLE on its candidate list and sends TO-BE-DISCOVERED CONFIRM message to the discoverers respectively with the selected aSLE info, as well as TO-BE-DISCOVERED NOTICE message to the aSLE(s) selected with the discoverer's info.

The discovery messages are similar to the messages summarized in Table 1, except that HaSLE will include the selected aSLE information in the TO-BE-DISCOVERED CONFIRM message, and HaSLE will send TO-BE-DISCOVERED NOTICE message(s) to the aSLE(s) selected for a successful discovery, unless the aSLE selected is itself.

For example, aSLE1 1214 is selected for discoverer ALE1 1208 and ALE2 1204, aSLE2 1216 is selected for discoverer ALE3 1210 and ALE4 1206, and HaSLE 1202 itself is selected for discoverer aSLE3 1212.

TABLE 5

Discovery Messages for "To-Be-Discovered" Initiated by an HaSLE

| Message | Type | Description |
|---|---|---|
| TO-BE-DISCOVERED REQUEST | broadcast/multicast | Request for "To-Be-Discovered". Refer to Error! Reference source not found. Table 1 for details. |
| TO-BE-DISCOVERED RESPONSE | broadcast/multicast/unicast | Response to "To-Be-Discovered". Refer to Table 1 for details. |
| TO-BE-DISCOVERED CONFIRM | unicast | Confirm to "To-Be-Discovered". Refer to Table 1 for details. |
| TO-BE-DISCOVERED NOTICE | unicast | Notice to the aSLE selected for a successful discovery, which may contains the following Sequence Number or ID Proxy Indicator Message Type Discoverer ID Discoverer IP Address Transport Method Service Required (optional) Data Storage Required (optional) Performance Required (optional) Supported Application/Application Type (optional) Supported Protocols (optional) Supported Device/Device Type (optional) Security (optional) Others (requirements or discoverer context) (optional). The optional fields may be included if the discoverer responds back with a specific or different value from what the discoveree initially offers. |

As summarized in Table 5, the details of the Discovery Messages are described below.

To-be-Discovered Request
  Discussed above.
To-be-Discovered Response
  Discussed above.
To-be-Discovered Confirm
  Accept: to confirm a successful discovery with the selected aSLE's info such as ID, IP address, security key, and other parameters or contexts to be used for following sessions.
  Reject: to indicate a failed discovery, and may include the reasons for failure.
TO-BE-DISCOVERED NOTICE—notice to the aSLE selected by the HaSLE after confirming a successful discovery with the discoverer.
  Sequence Number or ID: the sequence number or ID of the messages transmitted by a discoveree, this may be used for matching discovery request message.
  Proxy Indicator: allows proxy mode if it is set to true. An aSLE may proxy this message to others if this flag is set true.
  Message Type: indicates the type of discovery messages, i.e. discovery confirm.
  Discoverer ID: a locally unique ALE or aSLE ID for the discoverer.
  Discoverer IP Address: IP address used by the underlying transportation network.
  Transport Method: broadcast/multicast/unicast for sending this message via the underlying transportation network's protocol.
  Proxy Indicator: allows proxy mode is set to true.
  Service Required: Service required by the discoverer.
  Data Storage Required: Data Storage required by the discoverer.
  Performance Required: required by the discoverer.
  Supported Application/Application Type: Supported Application for an aSLE as a discoverer and Application Type for an ALE as a discoverer.
  Supported Protocols: supported protocol(s) for the discoverer.
  Supported Device/Device Type: Supported Device for an aSLE as a discoverer and Device Type for an ALE as a discoverer.

Security: defines security related parameters, such as key method, key generation algorithm, etc. to be used for next session if needed.

Symmetric Key: may be used between the discoverer and the aSLE selected.

Asymmetric Key: may be used between the discoverer and the aSLE selected.

Others: requirements or discoverer context.

It is understood that the functionality illustrated in FIG. 12, may be implemented in the form of software (i.e., computer-executable instructions) stored in a memory of, and executing on a processor of, a node of an M2M network (e.g., a server, gateway, device, or other computer system), such as one of those illustrated in FIG. 32C or 32D described below.

Figure 13:
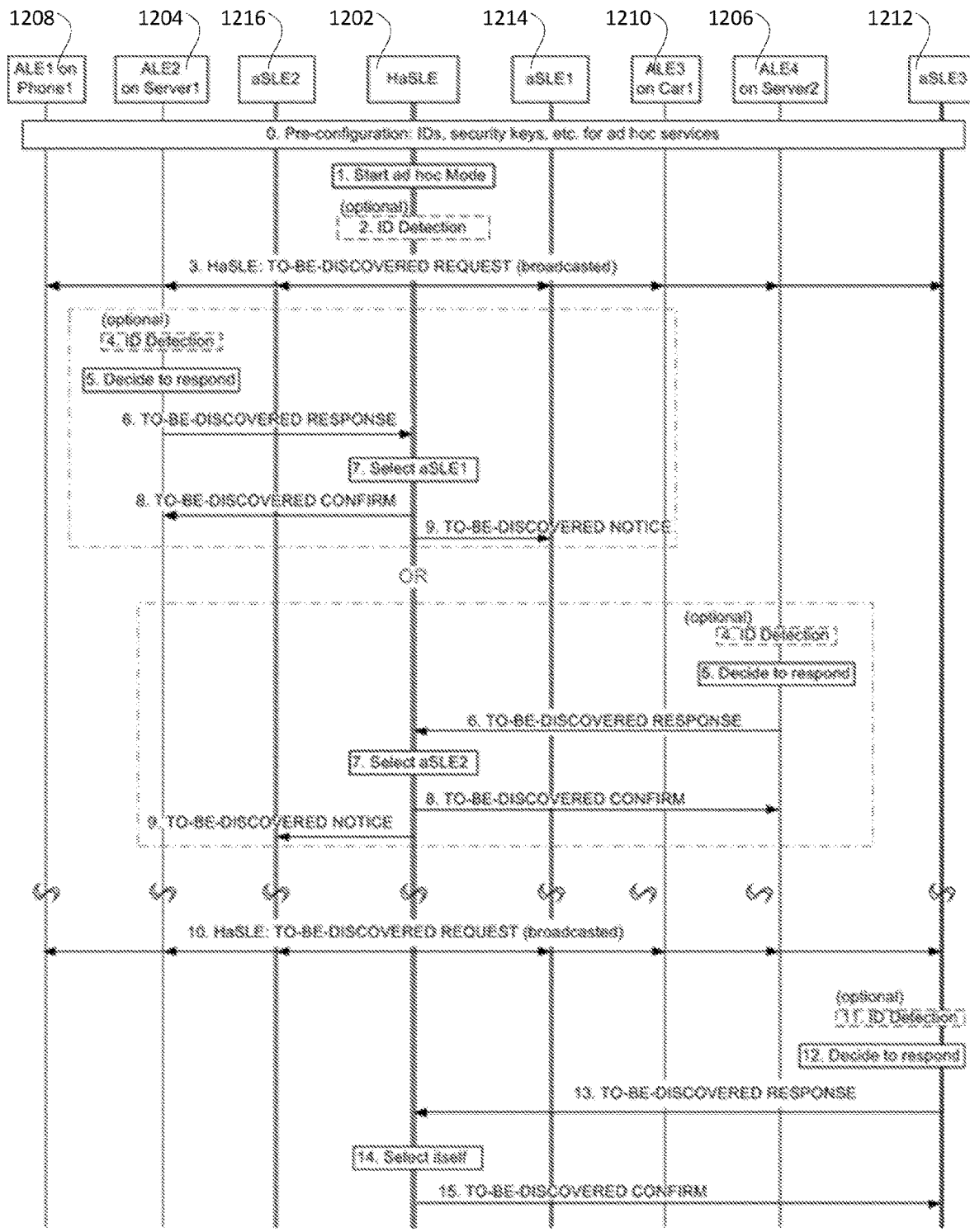
FIG. 13 is a diagram of a call flow that illustrates the aSLE discovery initiated by a HaSLE as a discoveree of FIG. 12.

FIG. 13 shows the message call flow for aSLE Discovery Initiated by a HaSLE, which may include the following steps.

Step 0 of FIG. 13 is a pre-configuration step. All the ALEs and aSLEs are preconfigured with the default values for the ad hoc parameters.

In step 1 of FIG. 13, the HaSLE 1202 is triggered by the underlying transport network or commanded by the communication manager at the service layer to enter ad hoc Mode.

Step 2 of FIG. 13, is an optional ID Detection step. The discoveree HaSLE 1202 scans the IDs that have already been used by discoveree(s) or discover(s) and update its ID list accordingly.

In step 3 of FIG. 13, the discoveree HaSLE 1202 broadcasts "To Be Discovered" request message.

Step 4 of FIG. 13 is an optional ID Detection step. The discoverer ALE2 1204 or ALE4 1206 scans the IDs that have already been used by discoverer(s) and update its ID list accordingly.

In step 5 of FIG. 13, discoverer ALE2 1204/ALE4 1206 decides to respond to the discoveree HaSLE 1202 based on the received information from the TO-BE-DISCOVERED REQUEST message, such as Service Provider, Service Capability, Data Storage, Current Status, Supported Applications, Supported Protocols, Supported Devices, etc., and its own requirements for a discoveree, In step 6 of FIG. 13, the discoverer ALE2 1204 or ALE4 1206 sends the TO-BE-DISCOVERED RESPONSE message to the discoveree HaSLE 1202.

In step 7 of FIG. 13, based on the service capabilities and current status of the candidate aSLEs as well as the requirements from a discoverer, HaSLE 1202 selects the aSLE to be assigned to the discoverer, e.g. aSLE1 1214 is selected for discoverer ALE2 1204 and aSLE2 1216 for discoverer ALE4 1206.

In step 8 of FIG. 13, discoveree HaSLE 1202 sends TO-BE-DISCOVERED CONFIRM message to ALE2 1204 or ALE4 1206 for a successful or failed discovery. If it's a successful discovery, the HaSLE 1202 also includes the information (i.e. ID, security key, etc.) of the aSLE selected in this message.

In step 9 of FIG. 13, the discoveree HaSLE 1202 sends TO-BE-DISCOVERED NOTICE message to the aSLE selected, e.g. aSLE1 1214 for ALE2 1204 or aSLE2 1216 for ALE4 1206 with the discoverer's information (i.e. ID, services required, security key, etc.) included. (After Discovery Request Period)

In step 10 of FIG. 13, periodically, discoveree HaSLE 1202 broadcasts "To Be Discovered" request message.

Step 11 of FIG. 13 is an optional ID Detection step. The discoverer aSLE3 1212 scans the IDs that have already been used by discoverer(s).

In step 12 of FIG. 13, discoverer aSLE3 1212 decides to respond to discoveree HaSLE1202 based on the information broadcasted in the TO-BE-DISCOVERED REQUEST message, and its own requirements for a discoveree.

In step 13 of FIG. 13, discoverer aSLE3 1212 sends the TO-BE-DISCOVERED RESPONSE message to the discoveree HaSLE 1202.

Step 14 of FIG. 13, is a Select aSLE step since the discoverer aSLE3 1212 is an aSLE and HaSLE 1202 is the head of aSLEs deployed in the area or region, HaSLE1202 selects itself to be assigned to the discoverer aSLE3 1212, and HaSLE 1202 adds aSLE3 1212 into its aSLE cluster.

In step 15 of FIG. 13, discoveree HaSLE 1202 sends a TO-BE-DISCOVERED CONFIRM message to aSLE3 1212 for a successful or failed discovery. HaSLE 1202 doesn't need to send the TO-BE-DISCOVERED-NOTICE message to itself in this case.

It is understood that the entities performing the steps illustrated in FIG. 13 are logical entities that may be implemented in the form of software (i.e., computer-executable instructions) stored in a memory of, and executing on a processor of, a network node or computer system such as those illustrated in FIG. 32C or FIG. 32D. That is, the method(s) illustrated in FIG. 13 may be implemented in the form of software (i.e., computer-executable instructions) stored in a memory of a network node, such as the node or computer system illustrated in FIG. 32C or FIG. 32D, which computer executable instructions, when executed by a processor of the node, perform the steps illustrated in FIG. 13. It is also understood that any transmitting and receiving steps illustrated in FIG. 13 may be performed by communication circuitry of the node under control of the processor of the node and the computer-executable instructions (e.g., software) that it executes.

aSLE Discovery Initiated by a Discoverer—to Discover

A "To Discover" request may be sent out by an individual discoverer (i.e. an ALE or an aSLE), and a discoveree (i.e. an aSLE or HaSLE) or discoverees receive the request(s) and then decide to respond back or not.

aSLE Discovery Managed by a Discoveree aSLE

Figure 14:
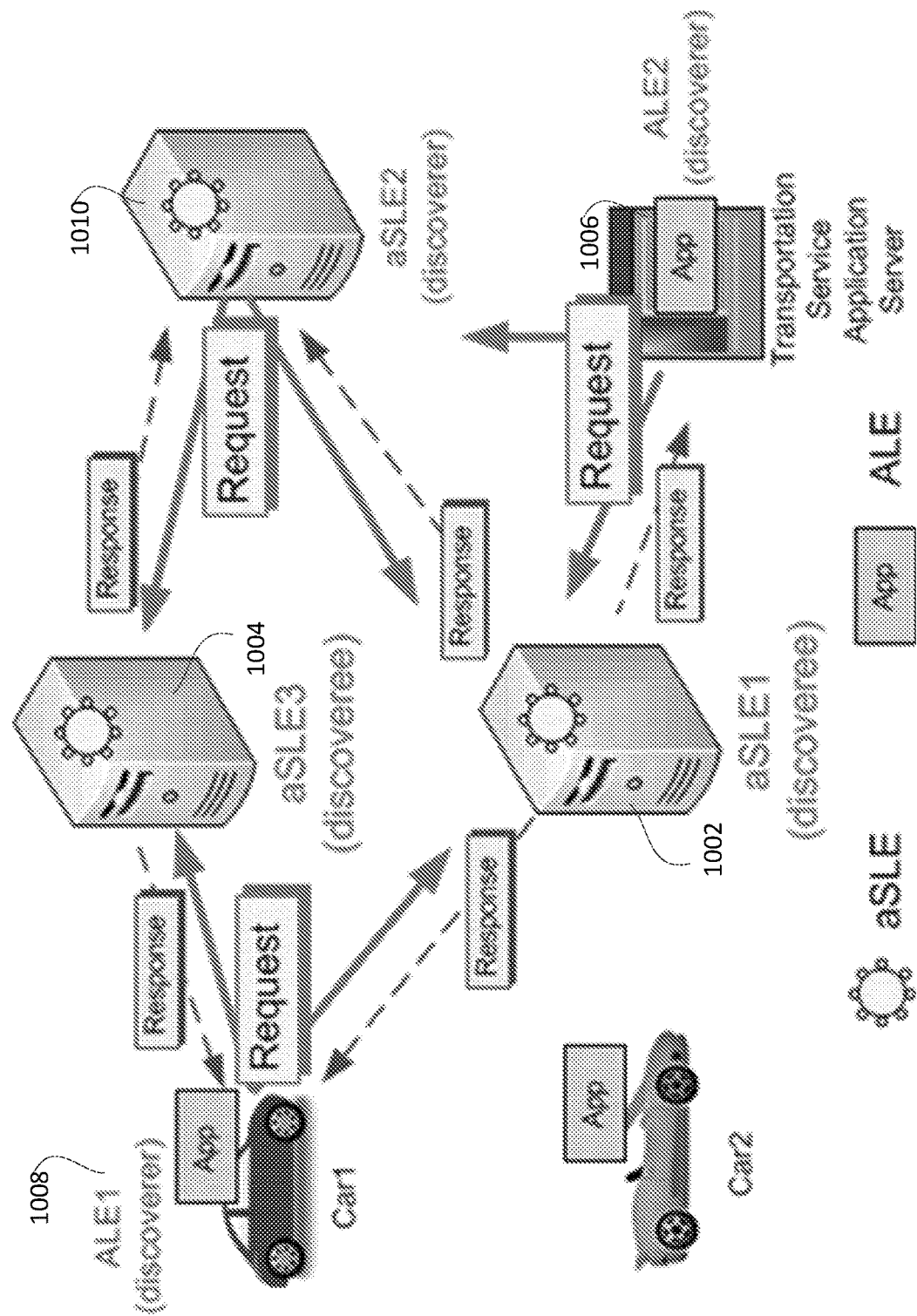
FIG. 14 is a diagram of a SLE discovery managed by a discoveree aSLE.

As illustrated in FIG. 14, discoverer ALE1 1008 on Car1, ALE2 1006 on Transportation Service Application Server or aSLE2 1010 broadcasts TO-DISCOVER REQUEST, discoveree aSLE1 1002 and aSLE3 1004 detect the request and send TO-DISCOVER RESPONSE respectively to discovers. Discoverer ALE1 1008 and ALE2 1006 decide which discoveree to respond based on the discoverees' responses and their own requirements for discovery, and then send TO-DISCOVER CONFIRM to the selected discoveree respectively, i.e. ALE1 1008 sends confirm message to aSLE3 1004 and ALE2 1006 sends confirm message to aSLE1 1002 (not shown in figure).

If a discoverer receives more than one response, it may pick the most suitable one based on its requirements and the discoveree's "current status".

The discovery messages are summarized in Table 6. Refer to Table 1 and Table 5 for details.

TABLE 6

Discovery Messages for "To-Discover" Managed by a Discoveree aSLE

| Message | Type | Description |
|---|---|---|
| TO-DISCOVER REQUEST | broadcast/ multicast/ unicast | Request for "To-Discover", which may contain the following:<br>Sequence Number or ID<br>Proxy Indicator<br>Message Type<br>Discovery Period<br>Discoverer ID<br>Discoverer IP Address<br>Transport Method (optional)<br>Service Capability/Service Required (optional)<br>Data Storage/Data Storage Required (optional)<br>Performance Requirements (optional)<br>Supported Applications/Application Type (optional)<br>Supported Protocols (optional)<br>Supported Devices/Device Type (optional)<br>Security (optional)<br>Others (requirements & context) (optional) |
| TO-DISCOVER RESPONSE | broadcast/ multicast/ unicast | Response to "To-Discover", which may contain the following:<br>Sequence Number or ID<br>Proxy Indicator<br>Message Type<br>Discoveree ID<br>Discoveree IP Address<br>Transport Method<br>Proxy Indicator<br>Service Capability (optional)<br>Operating System (optional)<br>Data Storage (optional)<br>Current Status (optional)<br>Supported Applications (optional)<br>Supported Protocols (optional)<br>Supported Devices (optional)<br>Security (optional)<br>Others (requirements and service context) (optional)<br>The optional fields may be included. The discoveree may respond back with different values from what the discoverer initially requested, multiple options (e.g. multi-protocol), or current status of the system, etc. |
| TO-DISCOVER CONFIRM | unicast | Confirm to "To-Discover", which may contain the following:<br>Sequence Number or ID<br>Message Type<br>Accept<br>Reject |

Figure 15:
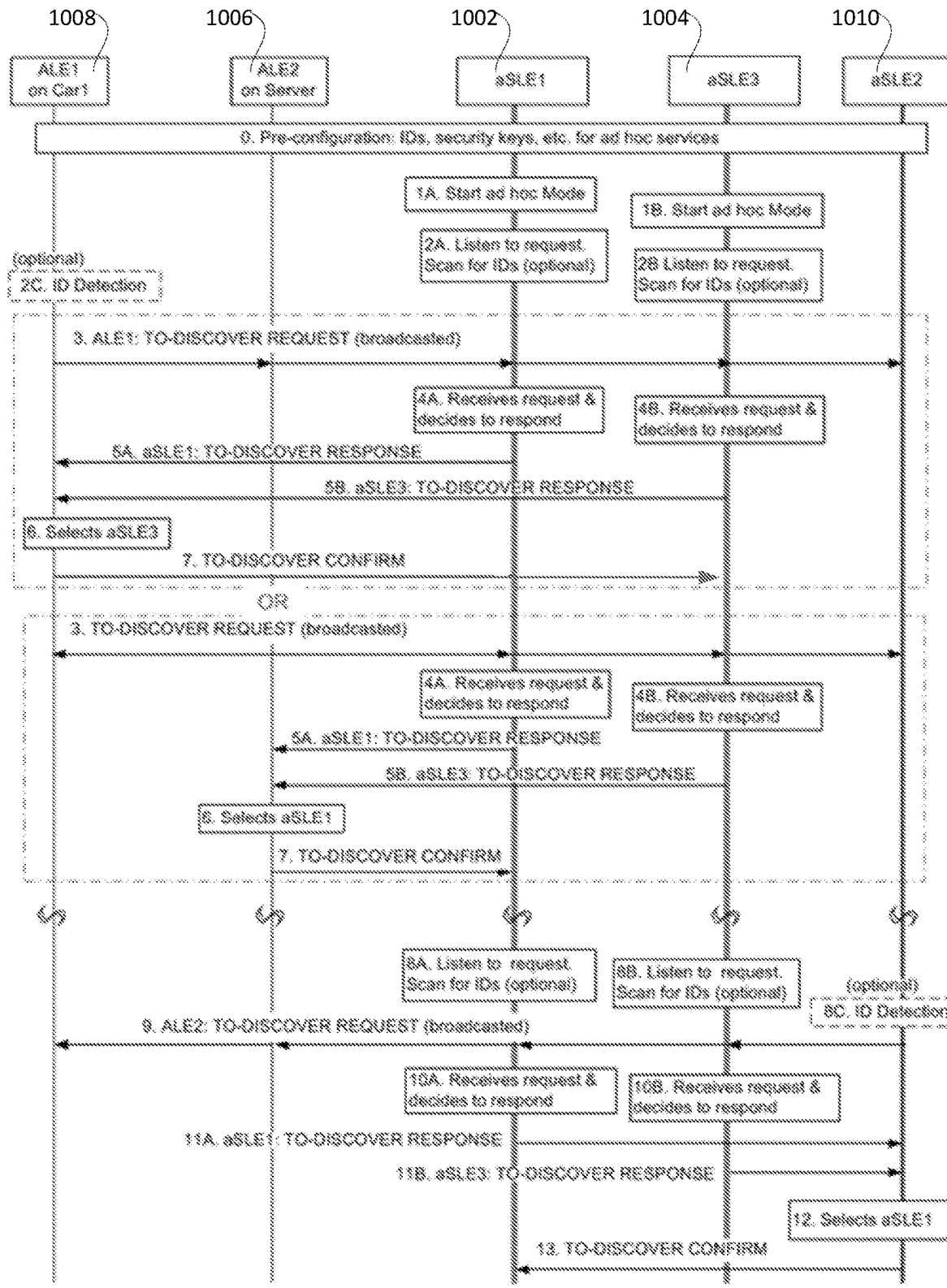
FIG. 15 is a diagram of a call flow for the aSLE discovery managed by a discoveree aSLE of FIG. 14.

It is understood that the functionality illustrated in FIG. 14, may be implemented in the form of software (i.e., computer-executable instructions) stored in a memory of, and executing on a processor of, a node of an M2M network (e.g., a server, gateway, device, or other computer system), such as one of those illustrated in FIG. 32C or 32D described below FIG. 15 shows the message call flow for aSLE Discovery Initiated by an ALE or aSLE as a discoverer, which may include the following steps.

Step 0 of FIG. 15 is a pre-configuration step. All the ALEs and aSLEs are preconfigured with the default values for the ad hoc deployment.

Step 1 of FIG. 15 is an ad hoc Mode step. The discoveree aSLE1 1002/aSLE3 1004 is triggered by the underlying network or commanded by the communication manager at service layer to enter ad hoc Mode.

Step 2 of FIG. 15 is an optional ID detection step. Step 2 of FIG. 15 includes substeps 2a, 2b, and 2c that may be conducted simultaneously or at any order in time.

In steps 2a and 2b the discoveree aSLE1 1002/aSLE3 1004 starts to listen to "To Discover" request messages periodically.

The discoveree aSLE1 1002/aSLE3 1004 also scans for the IDs used already while listening to "To Discover" request.

In step 2c, discoverer ALE1 1008 or ALE2 1006 scans the IDs that have already been used by discover(s).

In step 3 of FIG. 15, discoverer ALE1 1008 or ALE2 1006 broadcasts "To Discover" request message.

In step 4 of FIG. 15, discoveree aSLE1 1002 or aSLE3 1004 receives the "To Discover" request message from discoverer ALE1 1008 or ALE2 1006 and decides either or not to respond the request based on the discoverer ALE1 1008 or ALE2's 1006 request and discoveree aSLE1 1002/aSLE3's 1004 capabilities and current status.

In step 5 of FIG. 15, discoveree aSLE1 1006 or aSLE3 1004 sends the TO-DISCOVER RESPONSE message to the discoverer ALE1 1008 or ALE2 1006.

In step 6 of FIG. 15, discoverer ALE1 1008 or ALE2 1006 selects discoveree based on the information in the discovery response from the discoveree and its own requirements as a discoverer, e.g. ALE1 1008 selects aSLE3 1004 and ALE2 1006 selects aSLE1 1002.

In step 7 of FIG. 15, discoverer ALE1 1008 or ALE2 1006 sends TO-DISCOVER CONFIRM message to the discoveree selected. For example, ALE1 1008 confirms with aSLE3 1004 and ALE2 1006 confirms with aSLE1 1002 for a successful or rejected discovery.

(After Discovery Request Period)

Step 8 of FIG. 15 is an optional ID detection step. Substeps 8a, 8b and 8c of FIG. 15 may be conducted simultaneously or at any order in time.

In steps 8a, 8b and 8c of FIG. 15, discoveree aSLE1 1002/aSLE3 1004 starts to listen to "To Discover" request messages periodically The discoveree aSLE1 1002/aSLE3 1004 also scans for the IDs used already while listening to "To Discover" request.

In step 8c of FIG. 15, discoverer aSLE2 1010 scans the IDs that have already been used by discover(s).

In step 9 of FIG. 15, the discoverer aSLE2 1010 broadcasts "To Discover" request message.

In step 10 of FIG. 15, the discoveree aSLE1 1002/aSLE3 1004 receives the "To Discover" request message from aSLE2 1010 and decides either or not to respond the request based on the discover aSLE2's request and discoveree aSLE1/aSLE3's capabilities, current status, and its limitations.

In step 11 of FIG. 15, the discoveree aSLE1 1002/aSLE3 1004 sends the TO-DISCOVER RESPONSE message to the discoverer aSLE2 1010.

In step 12 of FIG. 15, the discoverer aSLE2 101010 selects discoveree based on the information in the discovery response from the discoveree and its own requirements as a discoverer, e.g. aSLE2 1010 selects aSLE1 1002.

In step 13 of FIG. 15, the discoverer aSLE2 1010 sends a TO-DISCOVER CONFIRM message to discoveree aSLE1 1002 for a successful or rejected discovery.

It is understood that the entities performing the steps illustrated in FIG. 15 are logical entities that may be implemented in the form of software (i.e., computer-executable instructions) stored in a memory of, and executing on a processor of, a network node or computer system such as those illustrated in FIG. 32C or FIG. 32D. That is, the method(s) illustrated in FIG. 15 may be implemented in the form of software (i.e., computer-executable instructions) stored in a memory of a network node, such as the node or computer system illustrated in FIG. 32C or FIG. 32D, which computer executable instructions, when executed by a processor of the node, perform the steps illustrated in FIG. 15. It is also understood that any transmitting and receiving steps illustrated in FIG. 15 may be performed by communication circuitry of the node under control of the processor of the node and the computer-executable instructions (e.g., software) that it executes.

aSLE Discovery Managed by a Discoveree HaSLE

In some scenarios, an ad hoc service provider deploys multiple aSLEs with one aSLE as the HaSLE taking most of the control and management roles. aSLE discovery managed by a discoveree HaSLE for "To Discover" is discussed in this subsection.

Figure 16:
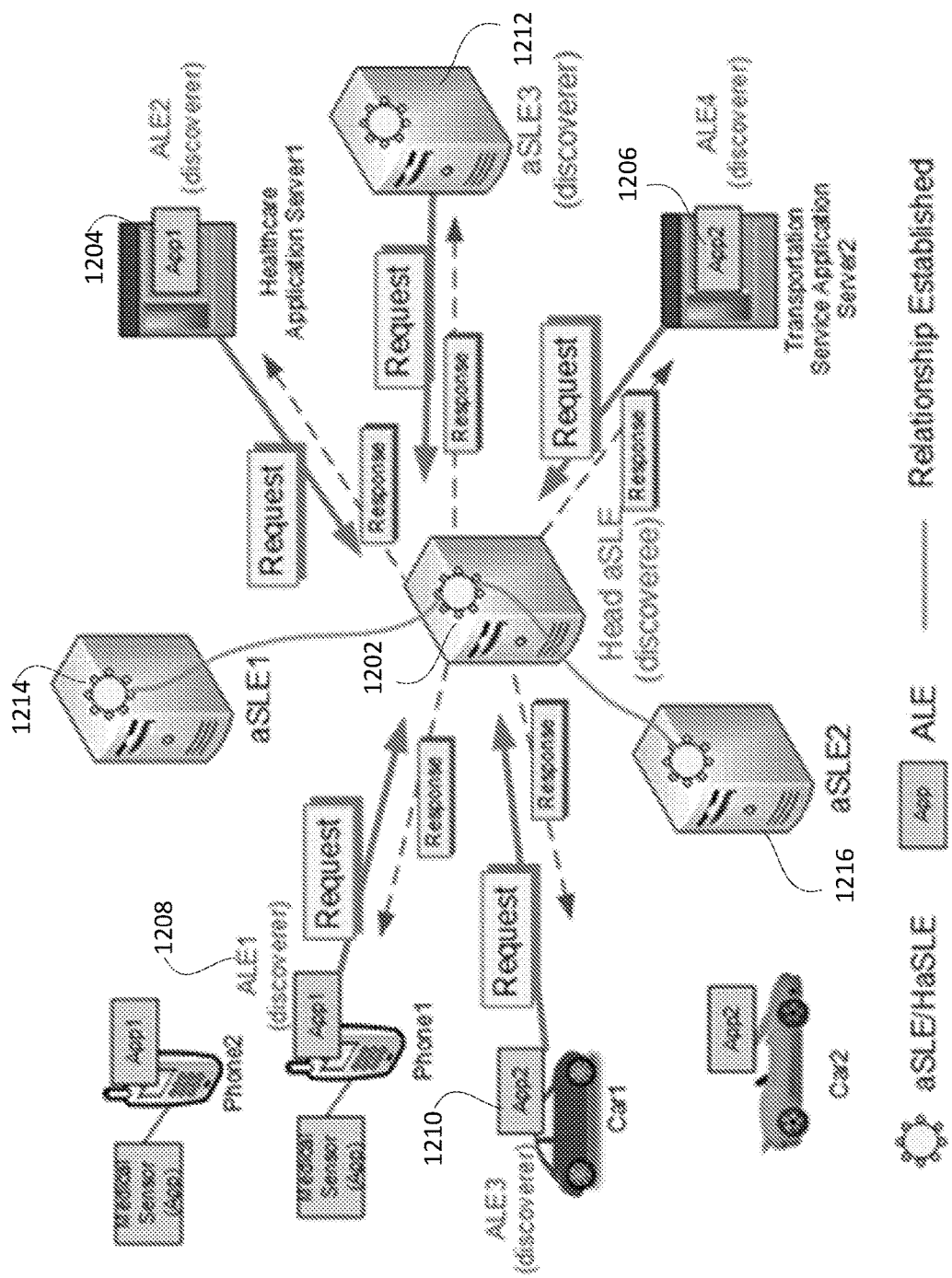
FIG. 16 is a diagram of aSLE discovery managed by a discoveree HaSLE.

In the example of FIG. 16, the discoveree is HaSLE 1202 which periodically listens to TO-DISCOVERED REQUEST messages. Discover ALE1 1208 on Phone1, ALE2 1204 on Healthcare Application Server1, ALE3 1210 on Car1, ALE4 1206 on Transportation Service Application Server2, or aSLE3 1212 broadcasts a "To Discover" request and waits for any discoveree's response message TO-DISCOVER RESPONSE. In this case, the discoveree HaSLE 1202 is in charge of the discovery and decides to respond to any "To Discover" request or not, as well as selecting the aSLE for the discoverer based on the service capabilities, current status, as well as the discoverer's requirements. Upon receiving a response from the discoveree HaSLE 1202, the discoverer ALE1 1208, ALE2 1204, ALE3 1210, ALE4 1206 or aSLE3 1212 sends TO-DISCOVER CONFIRM message to the discoveree HaSLE 1202 for a successful or failed discovery. The HaSLE 1202 sends a notice message TO-DISCOVER NOTICE message to the selected aSLE(s) respectively after a discovery is acknowledged as successful by the discover ALE1 1208, ALE2 1204, ALE3 1210, ALE4 1206 or aSLE3 1212, e.g. aSLE1 for discoverer ALE1 1208 and ALE2 1204, aSLE2 for ALE3 1210, ALE4 1206, and itself HaSLE 1202 for aSLE3 1212.

The discovery messages are similar to the messages summarized in Table 1, Table 5 and Table 6 above. The discovery messages of one embodiment are summarized in Table 7.

TABLE 7

Discovery Messages for "To-Discover" Managed by a Discoveree HaSLE

| Message | Type | Description |
|---|---|---|
| TO-DISCOVER REQUEST | broadcast/ multicast/ unicast | Request for "To-Discover". Refer to Table 6 for details. |
| TO-DISCOVER RESPONSE | broadcast/ multicast/ unicast | Response to "To-Discover". Refer to Table 6 for details. |
| TO-DISCOVER CONFIRM | unicast | Confirm to "To-Discover". Refer to Table 6 for details. |
| TO-DISCOVER NOTICE | unicast | Notice to the aSLE selected for a successful discovery, which may contains the following Sequence Number or ID Proxy Indicator Message Type Discoverer ID Discoverer IP Address Transport Method Proxy Indicator Service Required (optional) Data Storage Required (optional) Performance Required (optional) Application Type (optional ) |

TABLE 7-continued

Discovery Messages for "To-Discover" Managed by a Discoveree HaSLE

| Message | Type | Description |
|---|---|---|
| | | Supported Protocols (optional) Device Type (optional) Security (optional) Others (requirements or discoverer context) (optional). |

It is understood that the functionality illustrated in FIG. 16, may be implemented in the form of software (i.e., computer-executable instructions) stored in a memory of, and executing on a processor of, a node of an M2M network (e.g., a server, gateway, device, or other computer system), such as one of those illustrated in FIG. 32C or 32D described below.

Figure 17:
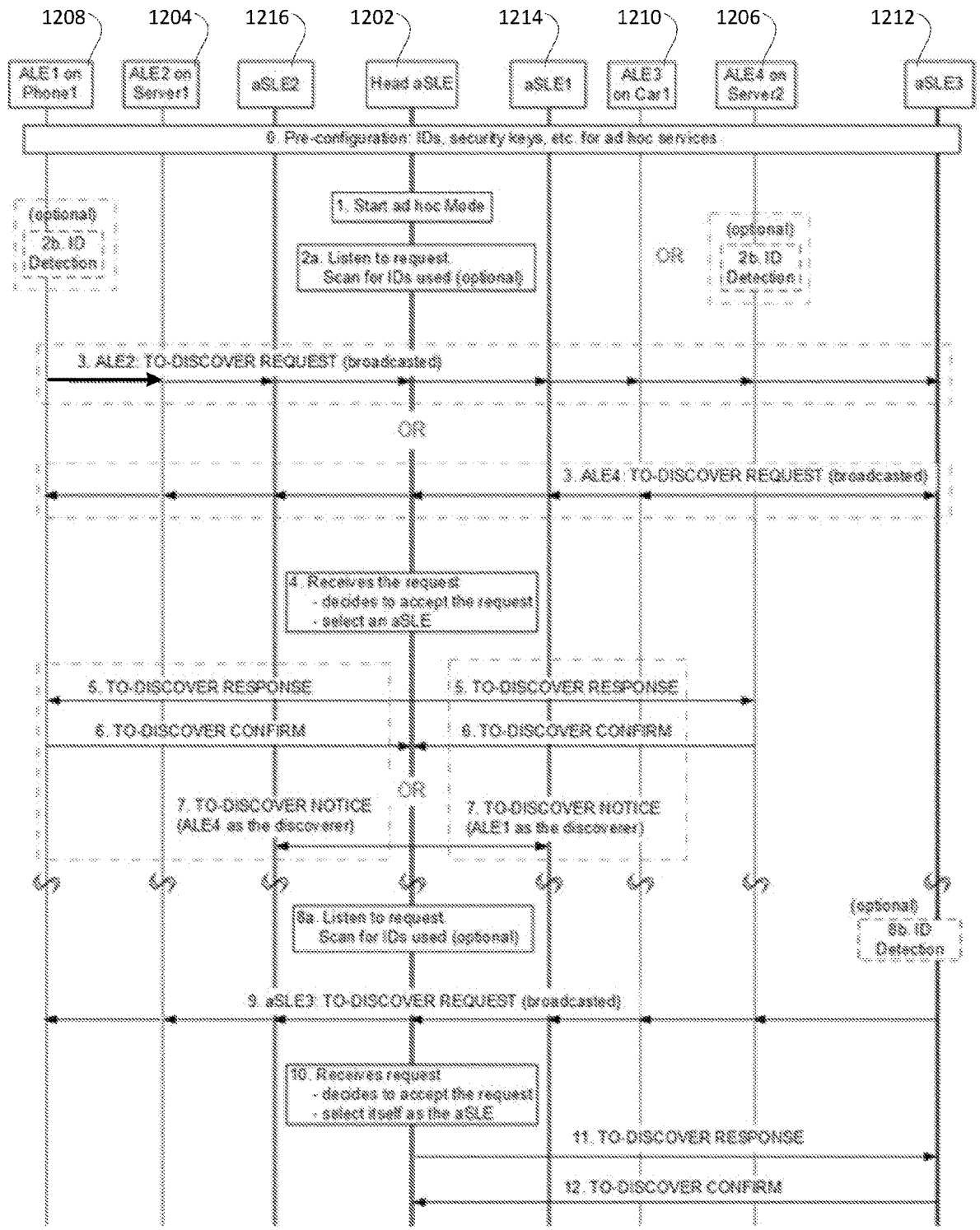
FIG. 17 is a diagram of a call flow for the aSLE discovery managed by discoveree HaSLE of FIG. 16.

FIG. 17 shows the message call flow for aSLE Discovery managed by a discoveree HaSLE, which may include the following steps.

In step 0 of FIG. 17, all ALEs and aSLEs are preconfigured with the default values for the ad hoc deployment.

In step 1 of FIG. 17, the ad hoc service layer entity HaSLE 1202 is triggered by the underlying network or commanded by the communication manager on the service layer to enter ad hoc Mode.

Step 2 of FIG. 17 is an optional ID detection step. Step 2a and Step 2b may be conducted simultaneously or at any order in time.

In step 2a of FIG. 17, the discoveree HaSLE 1202 starts to listen to "To Discover" request messages periodically. The discoveree HaSLE 1202 also scans for the IDs used already while listening to "To Discover" request.

In step 2b of FIG. 17 the discoverer ALE1 1208 or ALE4 1206 scans the IDs that have already been used by discover (s).

In step 3 of FIG. 17, the discoverer ALE1 1208/ALE4 1206 broadcasts "To Discover" request message.

In step 4 of FIG. 17, the discoveree HaSLE 1202 receives the "To Discover" request message from discoverer ALE1 1208 or ALE4 1206 and decides either or not to respond the request. If it decides to respond, HaSLE 1202 selects an aSLE based on the discoverer ALE1 1208 or ALE4's 1206 request and discoverees' capabilities, current status, limitation etc.

In step 5 of FIG. 17, the discoveree HaSLE 1202 sends the TO-DISCOVER RESPONSE message to the discoverer ALE1 1208 or ALE4 1206 including the information of the aSLE 1214 selected in this message, e.g. aSLE1 1214 is selected for ALE1 1208 and aSLE2 1216 is selected for ALE4 1206.

In step 6 of FIG. 17, the discoverer ALE1 1208 or ALE4 1206 sends a TO-DISCOVER CONFIRM message to discoveree HaSLE 1202 for a successful or rejected discovery.

In step 7 of FIG. 17, the discoveree HaSLE 1202 sends the TO-DISCOVER NOTICE message to the aSLE selected, i.e. aSLE1 1214 for ALE1 1208, aSLE2 1216 for ALE4 1206, with discoverer's information respectively if it's a successful discovery.I Step 8 of FIG. 17 is an optional ID detections step. Substeps 8a and 8b of FIG. 17 may be conducted simultaneously or at any order in time. In step 8a of FIG. 17, the discoveree HaSLE 1202 starts to listen to "To Discover" request messages periodically. The discoveree HaSLE 1202 also scans for the IDs used already while listening to "To Discover" request.

In step 8b of FIG. 17, the discoverer aSLE3 1212 scans the IDs that have already been used by discover(s).

In step 9 of FIG. 17, the discoverer aSLE3 1212 broadcasts a "To Discover" request message.

In step 10 of FIG. 17, the discoveree HaSLE 1202 receives the "To Discover" request message from aSLE3 1212 and decides either or not to respond the request and selects itself for "To Discover" request based on the discover aSLE3's 1212 request and discoveree's capabilities and current status.

In step 11 of FIG. 17, the discoveree HaSLE 1202 sends the TO-DISCOVER RESPONSE message to the discoverer aSLE3 1212 with its information.

In step 12 of FIG. 17, the discoverer aSLE3 1212 sends TO-DISCOVER CONFIRM message to discoveree HaSLE 1202 for a successful or rejected discovery. HaSLE 1202 doesn't need to send the TO-BE-DISCOVERED-NOTICE message if itself is selected.

It is understood that the entities performing the steps illustrated in FIG. 17 are logical entities that may be implemented in the form of software (i.e., computer-executable instructions) stored in a memory of, and executing on a processor of, a network node or computer system such as those illustrated in FIG. 32C or FIG. 32D. That is, the method(s) illustrated in FIG. 17 may be implemented in the form of software (i.e., computer-executable instructions) stored in a memory of a network node, such as the node or computer system illustrated in FIG. 32C or FIG. 32D, which computer executable instructions, when executed by a processor of the node, perform the steps illustrated in FIG. 17. It is also understood that any transmitting and receiving steps illustrated in FIG. 17 may be performed by communication circuitry of the node under control of the processor of the node and the computer-executable instructions (e.g., software) that it executes.

ID Management

For ad hoc SLE discovery, ID management includes ID generation or selection and ID conflict resolution. Several ID generation or selection schemes are described above for ad hoc SLE discovery messages and procedures. In this section, ID conflict management is discussed with detailed examples.

In ad hoc mode, if IDs are self-selected or generated, there is possibility that an ID is used by more than one discoveree or discoverer simultaneously, i.e. ID conflict. We propose ID conflict management in a distributive self-organized ad hoc system.

Figure 18:
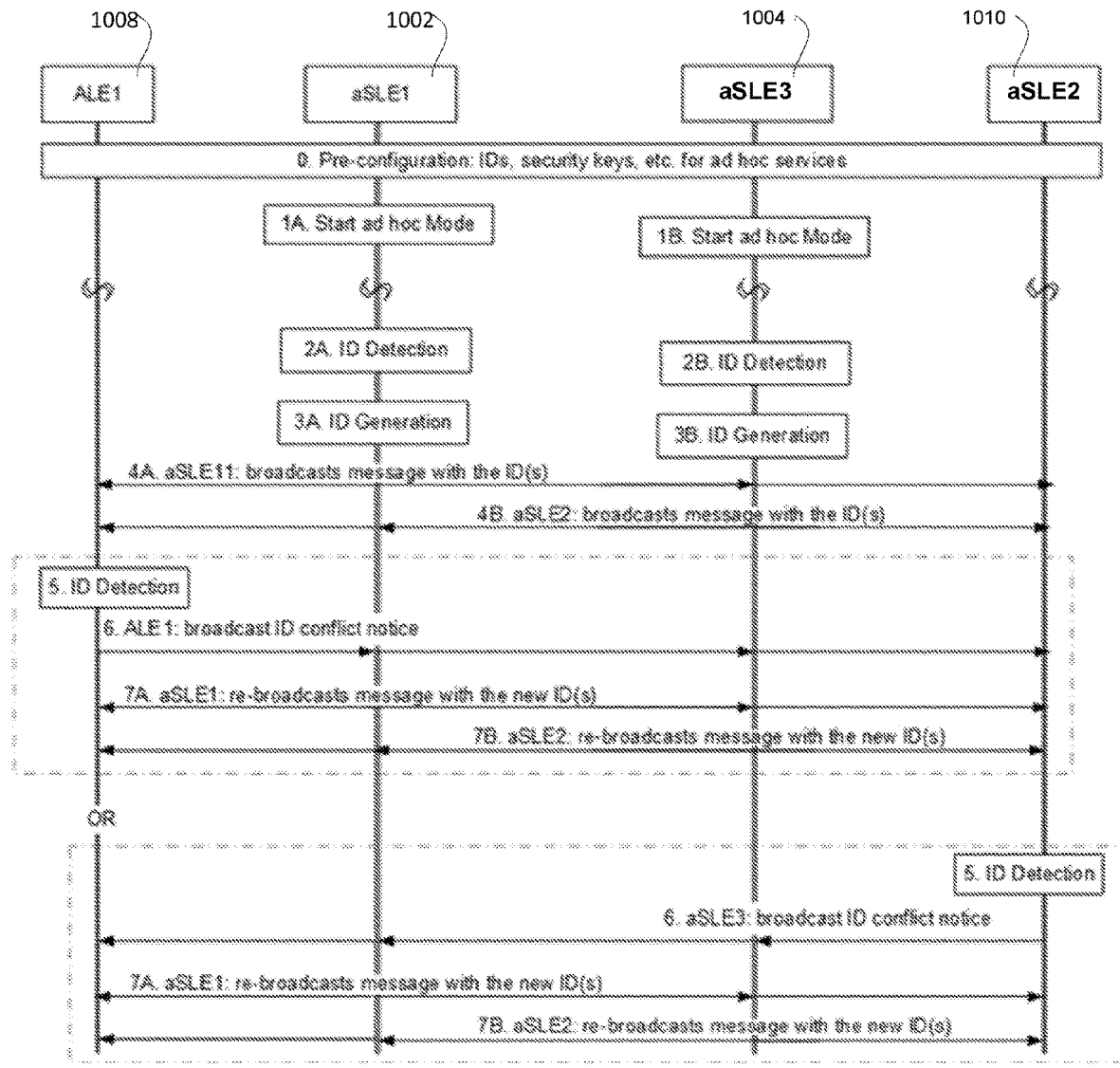
FIG. 18 is a diagram of a call flow that illustrates ID Conflict management.

As illustrated in FIG. 18, in one embodiment, ID conflict management may contain the following steps.

In step 0 of FIG. 18, all discoverees and discoverers, either as aSLEs or ALEs, are preconfigured with the default values for the ad hoc deployment.

Step 1a and step 1b of FIG. 18 may be conducted simultaneously or at any order in time.

In step 1 of FIG. 18, aSLE1 1002 or aSLE3 1004 enters into ad hoc mode either by the trigger from the underlying network or the command from the communication manager at the SL.

In step 2 of FIG. 18, aSLE1 1002 or aSLE3 1004 scans for the IDs used already while listening to discovery messages broadcasted.

In step 3 of FIG. 18, aSLE1 1002 or aSLE3 1004 generates IDs based on the ID scan results.

In step 4 of FIG. 18, aSLE1 1002 or aSLE3 1004 broadcasts a discovery message using the ID(s) self-generated after the ID detection.

In step 5 of FIG. 18, ALE1 1008 or aSLE2 1010 scans for the IDs used already while listening to discovery messages broadcasted.

In step 6 of FIG. 18, ALE1 1008 or aSLE2 1010 either multicasts ID conflict notice to aSLE1 1002 or aSLE3 1004, or broadcasts ID conflict notice too all with suggested resolution to ID conflict. There are many ways to suggest non-conflict IDs, for example as shown below in Table 8 by assigning different suffix to the same ID used by aSLE1 1002 and aSLE3 1004.

TABLE 8

Example for ID Extension with Suffix for Solving ID Conflict

| ID Main Body | ID suffix | Description |
| --- | --- | --- |
| Xyz | null/0 | Default value is "null" or "0". When an ID is self-generated, the suffix is always set to "null" or "0". |
| Xyz | a/1 | Assigned "a" or "1" to transmitter' by the receiver and included in the ID conflict notice. |
| Xyz | b/2 | Assigned "b" or "2" to transmitter2 by the receiver and included in the ID conflict notice. |

In step 7 of FIG. 18, aSLE1 1002 or aSLE3 1004 re-broadcasts the discovery message using the new ID(s) suggested by ALE1 1008 or aSLE2 1010.

It is understood that the entities performing the steps illustrated in FIG. 18 are logical entities that may be implemented in the form of software (i.e., computer-executable instructions) stored in a memory of, and executing on a processor of, a network node or computer system such as those illustrated in FIG. 32C or FIG. 32D. That is, the method(s) illustrated in FIG. 18 may be implemented in the form of software (i.e., computer-executable instructions) stored in a memory of a network node, such as the node or computer system illustrated in FIG. 32C or FIG. 32D, which computer executable instructions, when executed by a processor of the node, perform the steps illustrated in FIG. 18. It is also understood that any transmitting and receiving steps illustrated in FIG. 18 may be performed by communication circuitry of the node under control of the processor of the node and the computer-executable instructions (e.g., software) that it executes.

Discovery Message and Security

As listed in Table 1, Table 5, Table 6 and Table 7 respectively, there are many fields in a discovery request or response message and many of them are optional depending on a discoveree's capabilities as well as a discoverer's requirements. For example, some public service applications do not require security (i.e. encrypting the message), and therefore "Security" field may not be included in the discovery message. In this section, we discuss discovery message formation with security.

There are two main considerations to optimize the discovery message formation: 1) flexible minimum length of the discovery message; 2) security applied to the message. Name-Value Pair, Index-Value pair or Bitmap schemes as illustrated in FIGS. 19a, 19b and 19c respectively can be used for discovery request message sent by a discoveree as an example.

Header: the header can contain all the mandatory fields which may not be encrypted for easy detection (e.g. Proxy Mode detection, discoveree ID detection, etc.), such as Sequence Number or ID of the message sent from the discoveree at SL, Proxy Indicator for proxy mode if set as 1, Discoveree ID to identify the discoveree locally uniquely at SL, Discoveree IP Address used by transport network, and Transport Method sent to underlying network (i.e. Broadcast, Multicast, or Unicast)

Payload: the payload can contain all the optional fields which may be encrypted for securing discovery message at SL. Three schemes are proposed as the following.

Figures 19A, 19B, 19C:
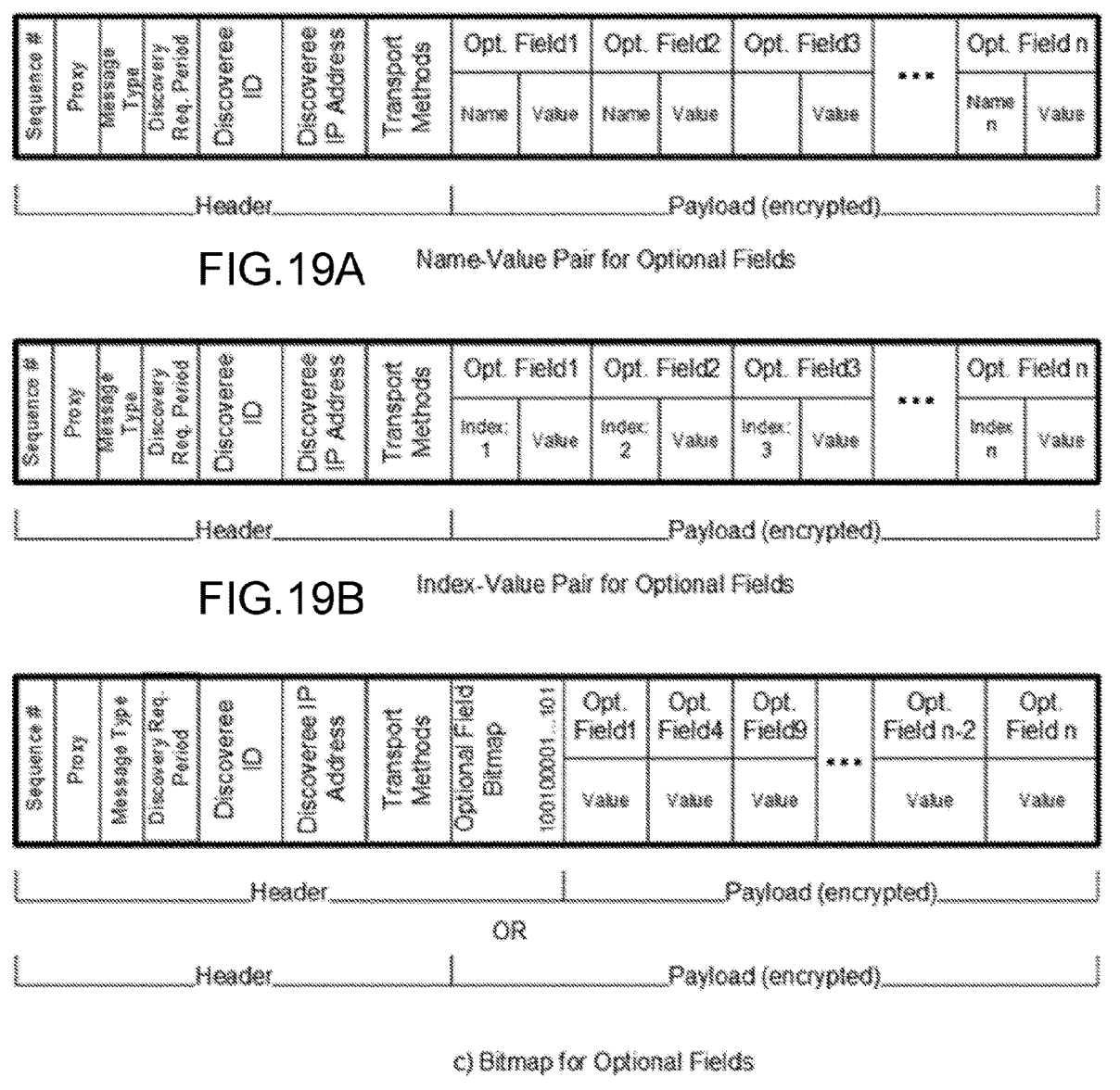

Name-Value Pair: as shown in FIG. 19(A), the optional fields can be filled with name-value pairs, and all the optional fields together form the payload. For example
- optional field 1 is {Ser Prv, ATT} for "Service Provider=ATT",
- optional field 2 is {Ser Lst, 111110011001} for "Service capability List=111 1001 1001" (the bit string is explained in Table 3)
- optional field 3 is {Dt Stg, 256} for "Data Storage=256 TB (Terabytes)", etc.
- Name-Value Pair can be parsed or processed by pattern or naming convention, i.e. does not have to be exact as the Index-Value Pair or Bitmap method, but takes more bits for name characters.
- A discoverer needs to decrypt the optional fields for the discovery request content.

Index-Value Pair: as shown in FIG. 19B, the optional fields are filled with index-value pairs, and all the optional fields together form the payload. For example
- optional field 1 is {000, ATT} for "Service Provider=ATT",
- optional field 2 is {010, 111110011001} for "Service capability List=111 1001 1001" (the bit string is explained in Table 3),
- optional field 3 is {011, 256} for "Data Storage=256 TB (Terabytes)", etc.
- Index-Value Pair takes fewer bits for the index comparing with Name-Value Pair, but it needs a look-up table for defining the index and it has to be exact.
- A discoverer needs to decrypt and decode the optional fields for the discovery request content.

Bitmap: as shown in FIG. 19C, the optional fields are indicated by bitmap, and all the optional fields together form the payload with or without the bitmap field. For example bitmap {1111 0000 1 . . . 101} indicates that the payload contains optional field 1, 2, 3, 4, 9, . . . , n−2 and n, where
- optional field 1 value is {ATT} for "Service Provider=ATT",
- optional field 2 is {111110011001} for "Service capability List=111 1001 1001"
- optional field 3 is {256} for "Data Storage=256 TB (Terabyte)", etc.

Bitmap uses the least bits for optional fields comparing with Name-Value Pair or Index-Value Pair, but it needs look-up table for defining the optional fields in bitmap with the optional field's name.

If the Bitmap field is included in the header, then a discoverer may decode the Bitmap first to decide if it needs to decrypt and decode the following optional fields.

Ad Hoc Service Entity (aSLE) Discovery for Switched Ad Hoc Operation Mode

As shown by Use Case 2, an SLE node or a cluster of SLE nodes in the IoT system may be disconnected from the infrastructure due to emergency. If these isolated SLE nodes are capable for ad hoc operations, they may switch from normal operation mode to ad hoc operation mode to continue their services in the area or region.

In a centralized hierarchical IoT service network, we focus on the following two scenarios.

Figure 20:
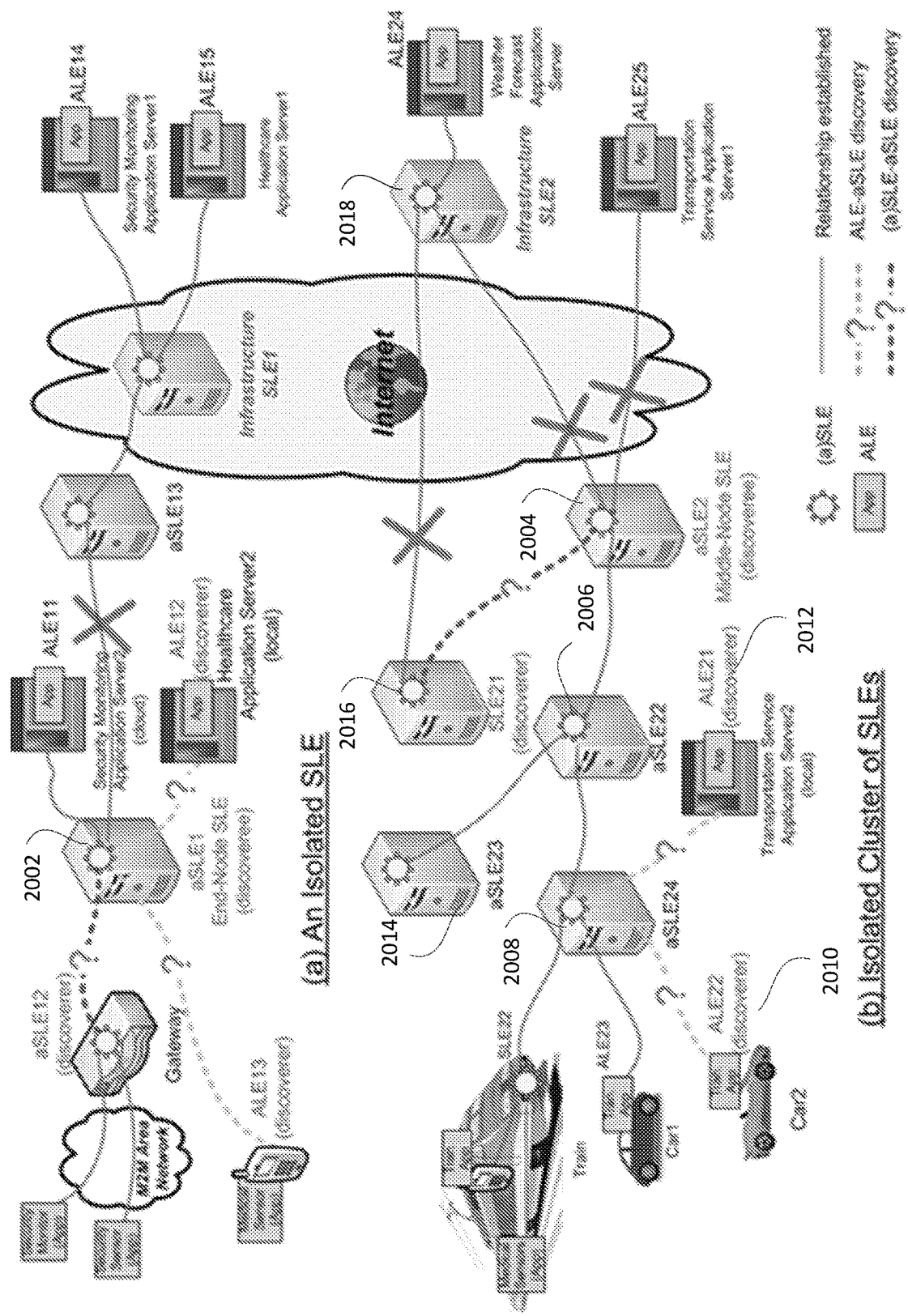
FIG. 20 is a diagram of isolated service layer entities in a switched ad hoc operation mode.

If only one SLE is disconnected, i.e. aSLE1 2002 in FIG. 20: (a), it may act like an independent aSLE in ad hoc operation. In this scenario, the mechanisms, described above, are applicable.

If a cluster of SLEs are disconnected, i.e. aSLE2 2004, aSLE22 2006, aSLE23 2014, and aSLE24 2008 in FIG. 20B, the top aSLE close to the infrastructure node (i.e. Infrastructure SLE2 2018) within the cluster's hierarchical structure (i.e. aSLE2 2004) may be a Head aSLE of the cluster of aSLE22 2006, aSLE23 2014, and aSLE24 2008—taking control and management role. In this scenario, the mechanisms, described above are applicable.

It is understood that the functionality illustrated in FIG. 20, may be implemented in the form of software (i.e., computer-executable instructions) stored in a memory of, and executing on a processor of, a node of an M2M network (e.g., a server, gateway, device, or other computer system), such as one of those illustrated in FIG. 32C or 32D described below.

Since an aSLE may go through registration and security check (i.e. authentication, authorization, etc.) during the normal operation before switching into ad hoc operation mode, the ID management, security key handling, etc. may be conducted differently.

ID Management

All (a)SLE(s) and/or ALE(s) assigned with IDs at the SL in normal operation mode may continue using the IDs assigned after switching into ad hoc operation mode, and they do not perform ID detection unless re-assign the IDs for ad hoc mode only during preparing the ad hoc operation mode stage.

"To be Discovered": a discoveree switched into ad hoc operation mode may broadcast 'To be Discovered" request with its discoveree ID assigned in normal operation mode or at ad hoc preparing stage, and may also include the discoverer ID(s) following the naming convention defined in the normal operation mode or ad hoc preparing stage. Discoverer(s) may respond back with the ID(s) listed by the discoveree.

i) The discoveree has to resolve any ID conflict if more than one discoverer responds back with the same discoverer ID.

ii) The discoveree broadcast/multicast the discoverer ID assignment to the discoverers.

iii) The discoverers respond with assigned ID.

"To Discover": a discoverer switched into ad hoc operation mode may broadcast "To Discover" request with its discoverer ID assigned in normal operation mode or at ad hoc preparing stage and a discoverer or discovers may respond back with their discoveree IDs assigned in normal operation mode or at ad hoc preparing stage. A discoverer deployed in ad hoc mode may conduct ID detection and generate a discoverer ID accordingly. In this case, the discoveree has to resolve possible discoverer ID confliction following the steps described in above "To be Discovered".

Security Key Handling

All (a)SLE(s) and/or ALE(s) assigned with security key methods and key generation algorithms at the SL in normal operation mode may continue using them after switching into ad hoc operation mode unless re-define security methods for ad hoc mode only during preparing the ad hoc operation mode stage.

"To be Discovered": a discoveree switched into ad hoc operation mode may broadcast "To be Discovered" request with its security method defined in normal operation mode or at ad hoc preparing stage.

i) Discoverer(s) switched into ad hoc operation mode may respond back with its security method defined in normal operation mode or at ad hoc preparing stage, if the security method is not specified in the discoveree's "To be Discovered" request.
ii) Discoverer(s) deployed into ad hoc operation mode may respond back per the security method defined by the discoveree in the "to be Discovered" request message.

"To Discover": a discoverer switched into ad hoc operation mode may broadcast "To Discover" request with its security method defined in normal operation mode or at ad hoc preparing stage, and a discoveree or discoverees may respond back with their security method defined in normal operation mode or at ad hoc preparing stage, if it's not specified in the discoverer's request. A discoverer deployed in ad hoc mode may broadcast "To Discover" request with its security method pre-defined for ad hoc deployment.

A call flow is exampled for aSLE discovery initiated by a Head aSLE—To Be Discovered. An aSLE may continue using the IDs assigned during the normal operation and therefore the ID detection is not shown in FIG. 21.

Figure 21:
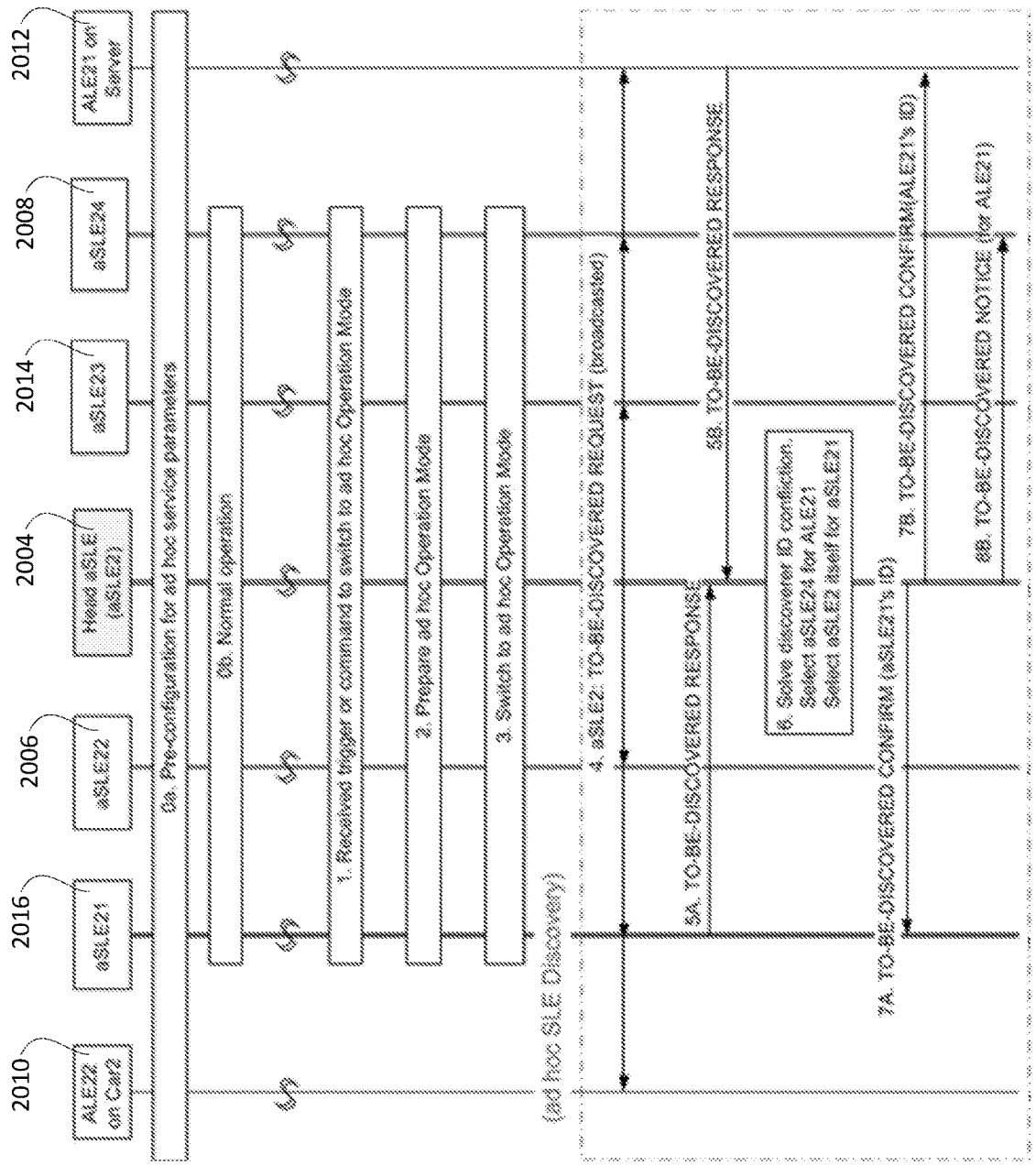
FIG. 21 is a diagram of a call flow for isolated aSLE discovery in a switched ad hoc operation mode.

As illustrated in FIG. 21, the discovery for switched ad hoc mode as shown in FIG. 20B may contain the following steps.

In step 0 of FIG. 21, all ALEs and aSLEs are preconfigured with the default values for the ad hoc operations Step 0b: Normal Operation: all (a)SLEs operate in normal operation mode.

In step 1 of FIG. 21, aSLE2 2004, aSLE21 2016, aSLE22 2006, aSLE23 2014 and aSLE24 2008 receive trigger from underlying network or command from the communication manager at the SL that they will lose or have lost the connection with the rest of the IoT service network at SL, i.e. they will or have become isolated SLEs from the IoT service network.

In step 2 of FIG. 21, aSLE2 2004, aSLE21 2016, aSLE22 2006, aSLE23 2014 and aSLE24 2008 prepare for ad hoc operation mode by loading the ad hoc parameters preconfigured prior to operations.

In step 3 of FIG. 21, aSLE2 2004, aSLE21 2016, aSLE22 2006, aSLE23 2014 and aSLE24 2008 switch to ad hoc operation mode as a self-organized IoT service sub-network and continue supporting the applications and underlying networks.

In step 4 of FIG. 21, aSLE2 2004, acting as an HaSLE, broadcasts TO-BE-DISCOVERED REQUEST message for switched ad hoc service discovery.

Steps 5a and 5b of FIG. 21 may be conducted simultaneously or at any order in time.

In step 5 of FIG. 21, aSLE21 2016 or ALE21 2012 decides to respond to aSLE2's discovery request by sending TO-BE-DISCOVERED RESPONSE with the IDs suggested by the discoveree aSLE2 2004.

In step 6 of FIG. 21, aSLE2 2004, acting as an HaSLE, detects that both aSLE21 2016 and ALE21 2012 use the same discoverer ID in their discovery response and resolves the conflict. aSLE2 2004 also selects the discoveree aSLE24 2008 from its cluster for discoverer ALE21 2012 and itself for discoverer aSLE21.

In step 7 of FIG. 21, aSLE2 2004, acting as an HaSLE, sends TO-BE-DISCOVERED CONFIRM message to the discoverer ALE21 2012 with its new discoverer ID as well as the discoveree aSLE24 2008 selected for it. aSLE2 2004 also sends TO-BE-DISCOVERED CONFIRM message to the discoverer aSLE21 2016 with its new discoverer ID as well as itself as the discoveree for discoverer aSLE21 2016.

In step 8B of FIG. 21, aSLE2 2004, acting as an HaSLE, sends a TO-BE-DISCOVERED NOTICE message to the discoveree aSLE24 2008 for discoverer ALE21 2016 accordingly.

It is understood that the entities performing the steps illustrated in FIG. 21 are logical entities that may be implemented in the form of software (i.e., computer-executable instructions) stored in a memory of, and executing on a processor of, a network node or computer system such as those illustrated in FIG. 32C or FIG. 32D. That is, the method(s) illustrated in FIG. 21 may be implemented in the form of software (i.e., computer-executable instructions) stored in a memory of a network node, such as the node or computer system illustrated in FIG. 32C or FIG. 32D, which computer executable instructions, when executed by a processor of the node, perform the steps illustrated in FIG. 21. It is also understood that any transmitting and receiving steps illustrated in FIG. 21 may be performed by communication circuitry of the node under control of the processor of the node and the computer-executable instructions (e.g., software) that it executes.

Discovery Proxied

In an ad hoc service system, the discovery messages may be proxied by an HaSLE or another aSLE to increase the discovery range, to control the discovery message traffic, and to manage the security perspective in ad hoc SLE discovery.

Forward Proxy aSLE Discovery

Figure 22:
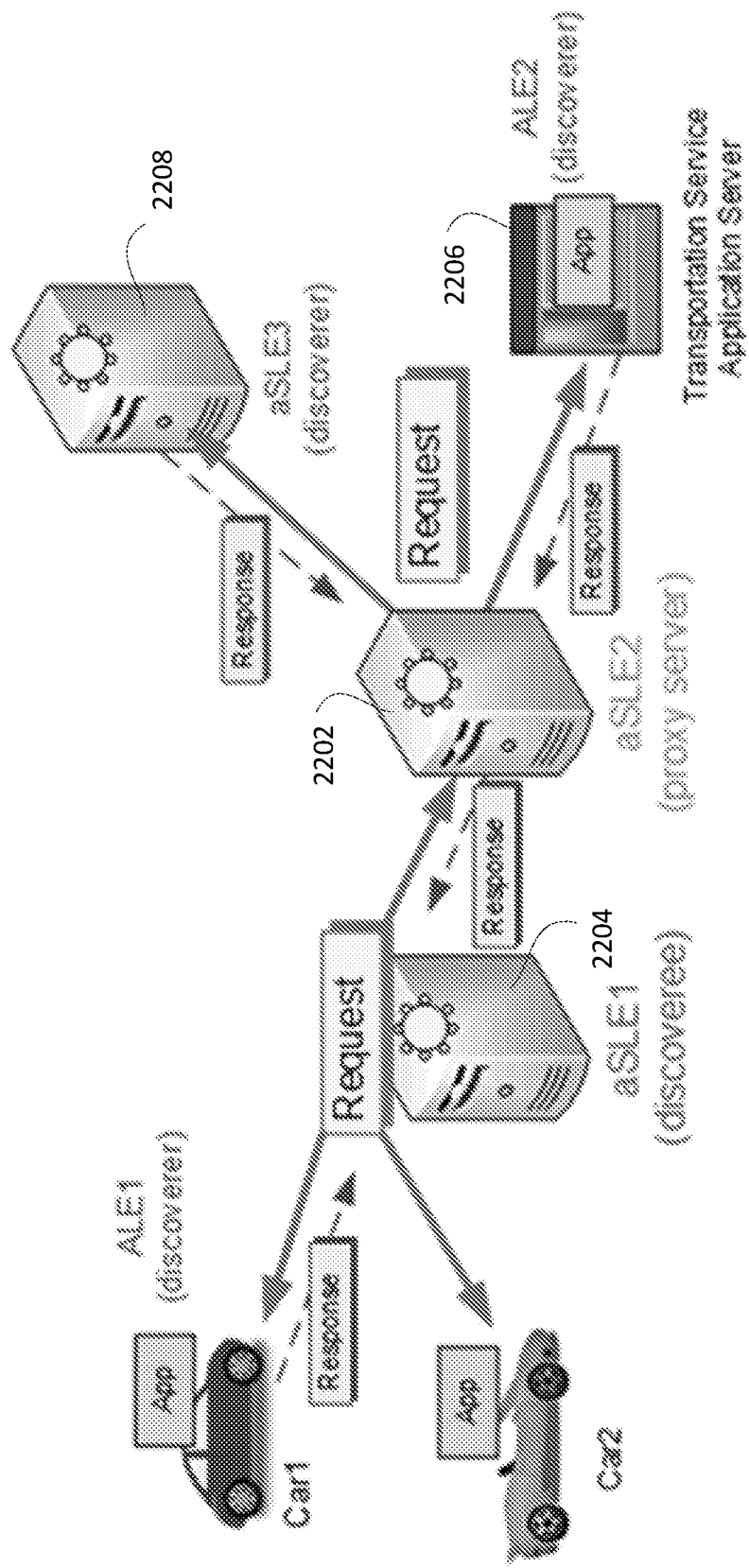
FIG. 22 is a diagram of a forward proxy aSLE discovery.

For both "To Be Discovered" and "To Discover", an HaSLE or aSLE may forward proxy the discovery message if the "Proxy Indicator" is set to "1" (i.e. true) in the message header, as illustrated in FIG. 22 with aSLE1 2204 as a discoveree and aSLE2 2202 as a proxy server.

As shown in FIG. 22, aSLE2 2202 acts as a forward proxy server (i.e. open proxy) to proxy a discovery request from the discoveree aSLE1 2204 to the discoverer ALE2 2206 or aSLE3 2208, and then to proxy the discovery response from the discoverer ALE2 2206 or aSLE3 2208 to the discoveree aSLE1 2204.

It is understood that the functionality illustrated in FIG. 22, may be implemented in the form of software (i.e., computer-executable instructions) stored in a memory of, and executing on a processor of, a node of an M2M network (e.g., a server, gateway, device, or other computer system), such as one of those illustrated in FIG. 32C or 32D described below.

Figure 23:
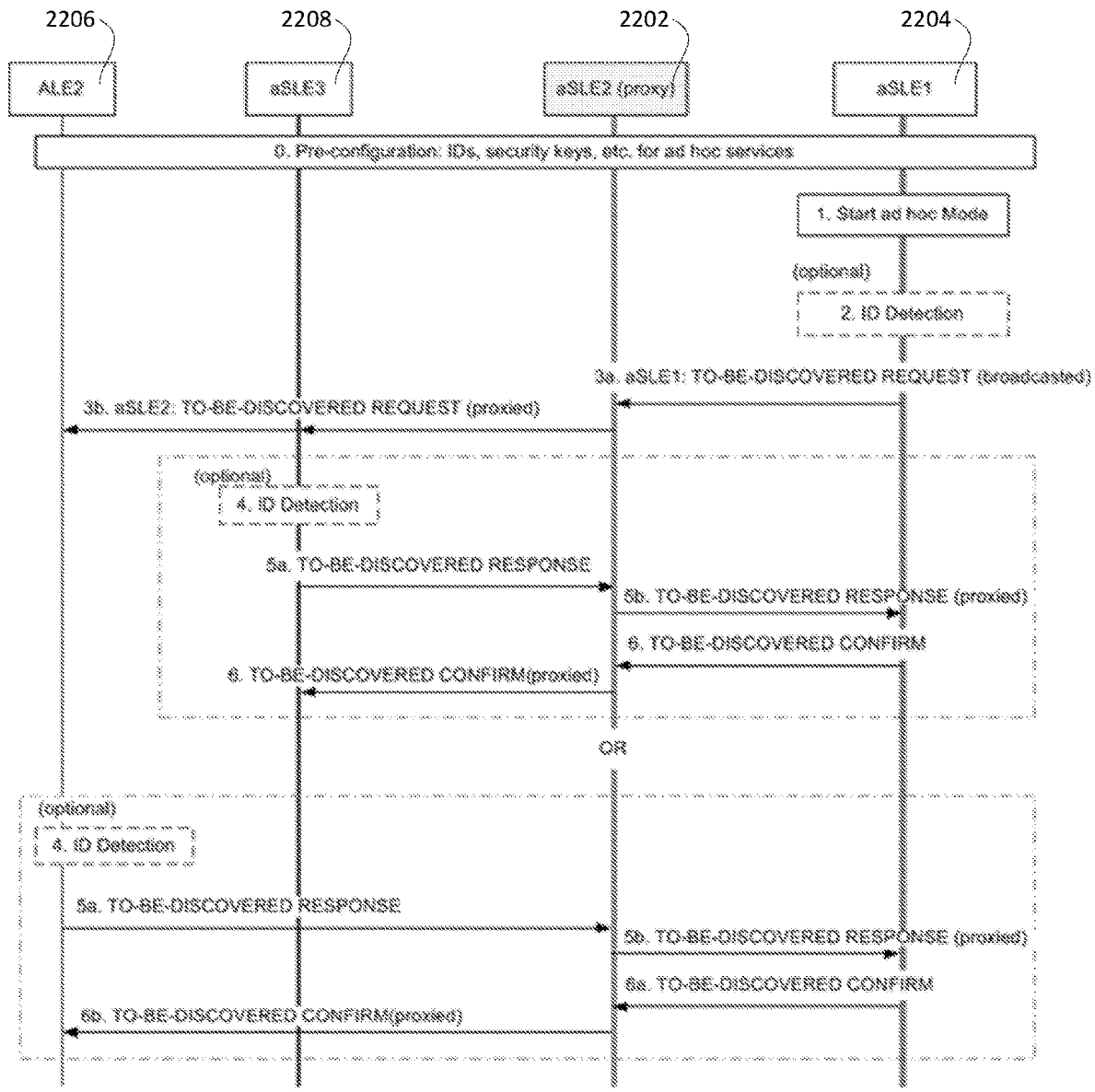
FIG. 23 is a diagram of a call flow for discovery message for "to be discovered" forward proxy discovery.

The detailed call flow is shown in FIG. 23, which may contain the following steps.

In step 0 of FIG. 23, all ALEs and aSLEs are preconfigured with the default values for ad hoc operations.

In step 1 of FIG. 23, aSLE1 2204 enters ad hoc operation mode after receiving a trigger from underlying network or a command from the communication manager at the SL.

Step 2 of FIG. 23 is an optional ID detection step. In step 2 of FIG. 23, [aSLE1] ID detection: aSLE1 2204 scans the IDs for discoveree(s) and/or discoverer(s) that have been used already in discovery messages, and selects or generates the locally unique IDs for its discovery request message.

In step 3a of FIG. 23, aSLE1 2204 broadcasts or unicast (with preconfigured ID and/or address of proxy server) TO-BE-DISCOVERED REQUEST message to start a discovery cycle.

In step 3b of FIG. 23, aSLE2 2202, acting as a forward proxy server, forwards the discovery request without changing the message if the Proxy bit is set "1" (true), i.e. the proxy server does not decrypt the message and the message has the discoverer-discoveree end-to-end security at the SL.

Step 4 of FIG. 23 is an optional ID detection step. In step 4 of FIG. 23, ALE2 2206 or aSLE3 2208 scans the IDs that have been used already in discovery messages, and selects or generates the locally unique IDs for its discovery response message.

In step 5a of FIG. 23, ALE2 2206 or aSLE3 2208 decides to respond the discovery request and sends TO-BE-DISCOVERED RESPONSE back.

In step 5b of FIG. 23, aSLE2 2202, acting as a forward proxy server, forwards the discovery response without changing the message if the Proxy bit is set "1" (true).

In step 6a of FIG. 23, aSLE1 2204 confirms the discovery response with TO-BE-DISCOVERED CONFIRM.

In step 6b of FIG. 23, aSLE2 2202, acting as a forward proxy server, forwards the discovery confirm message without changing the message if the Proxy bit is set "1" (true) to discoverer ALE2 2206 or aSLE3 2208.

It is understood that the entities performing the steps illustrated in FIG. 23 are logical entities that may be implemented in the form of software (i.e., computer-executable instructions) stored in a memory of, and executing on a processor of, a network node or computer system such as those illustrated in FIG. 32C or FIG. 32D. That is, the method(s) illustrated in FIG. 23 may be implemented in the form of software (i.e., computer-executable instructions) stored in a memory of a network node, such as the node or computer system illustrated in FIG. 32C or FIG. 32D, which computer executable instructions, when executed by a processor of the node, perform the steps illustrated in FIG. 23. It is also understood that any transmitting and receiving steps illustrated in FIG. 23 may be performed by communication circuitry of the node under control of the processor of the node and the computer-executable instructions (e.g., software) that it executes.

Reverse Proxy aSLE Discovery

Figure 24:
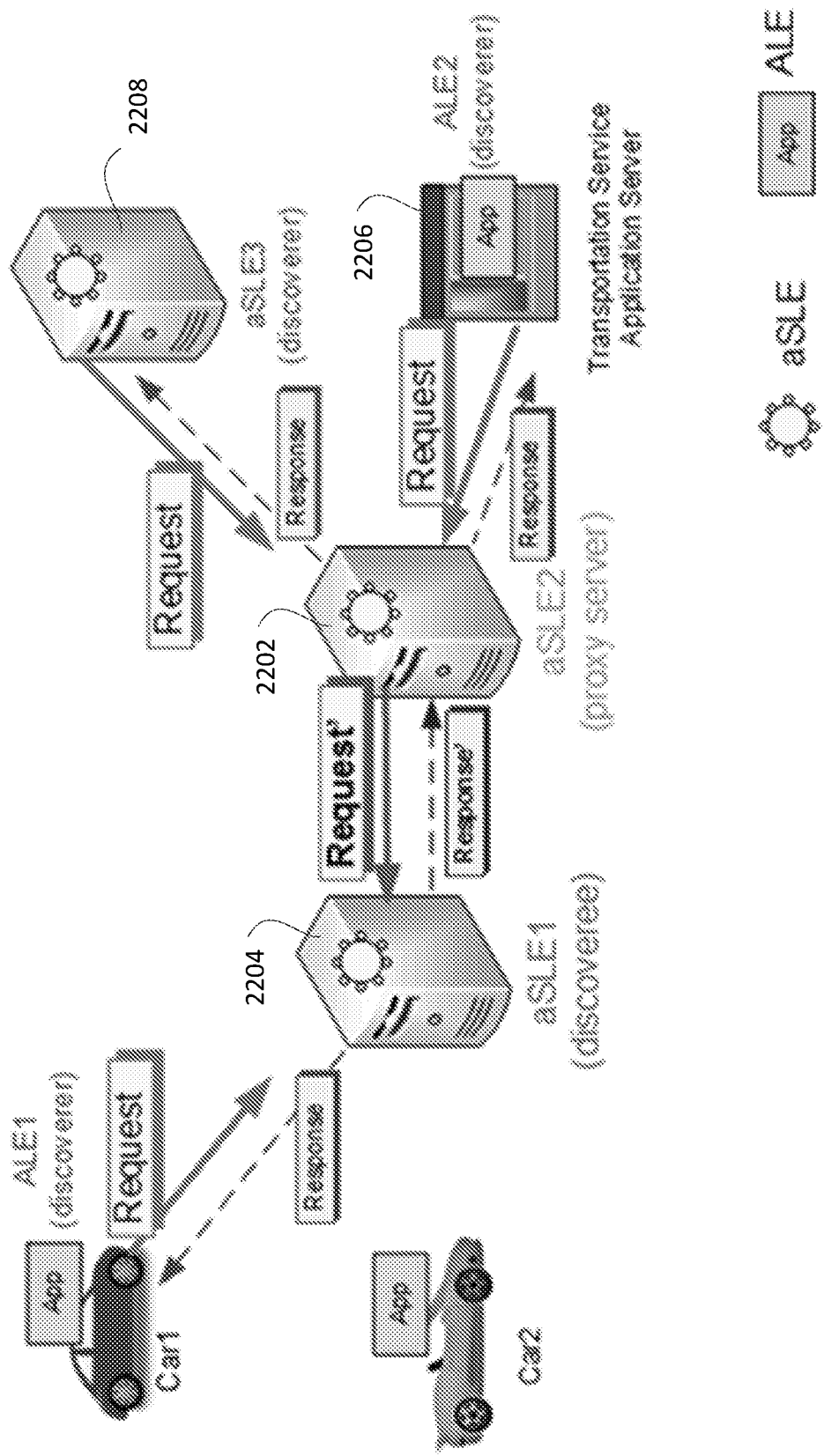
FIG. 24 is a diagram of reverse proxy aSLE discovery.

Also, illustrated in FIG. 24, ALE2 2206 or aSLE3 2208 broadcasts "To Discover" request, and aSLE2 2202 acts as a reverse proxy server to send the discovery request from the discoverer ALE2 2206 or aSLE3 2208 to the discoveree aSLE1 which is unknown to discoverer ALE2 2206 or aSLE3 2208 (i.e. the reverse proxy server aSLE2 acts as a "discoveree"), and then to send the discovery response from the discoveree aSLE1 2204 to the discoverer ALE2 2206 or aSLE3 2208 as if it came from the reverse proxy server aSLE2 2202 instead of discoveree aSLE1 2204. In reverse proxy operation, aSLE2 2202 acts as a security gate to exchange discover messages between discovers in public domain and discoverees in private or secured domain. The security is handled from a discoverer to a reverse proxy server and from the reverse proxy server to a discoveree.

It is understood that the functionality illustrated in FIG. 24, may be implemented in the form of software (i.e., computer-executable instructions) stored in a memory of, and executing on a processor of, a node of an M2M network (e.g., a server, gateway, device, or other computer system), such as one of those illustrated in FIG. 32C or 32D described below.

Figure 25:
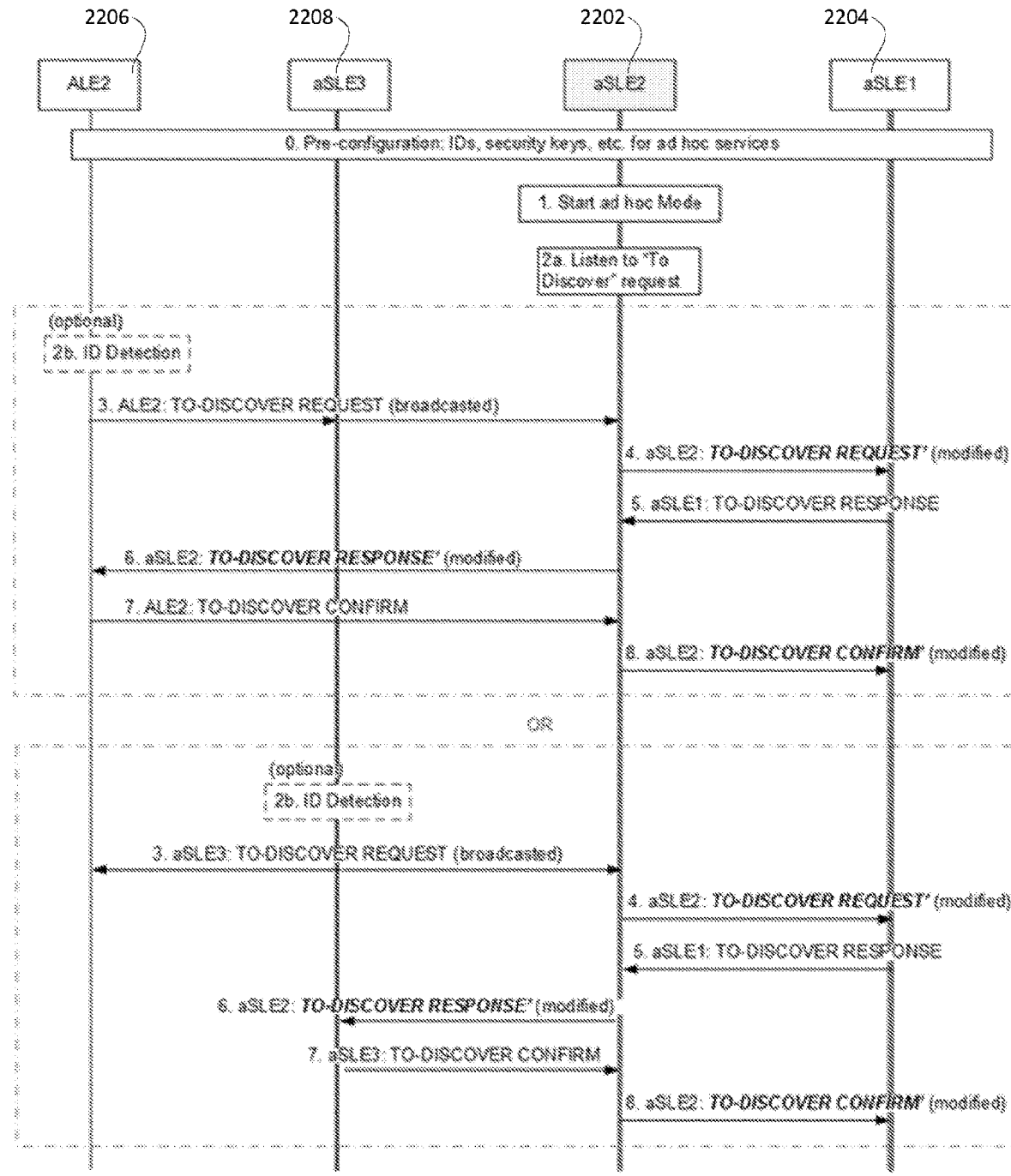
FIG. 25 is a diagram of a call flow of "to discover" reverse proxy discovery.

The detailed call flow is shown in FIG. 25, which may contain the following steps.

In step 0 of FIG. 25, all ALEs and aSLEs are preconfigured with the default values for ad hoc operations.

In step 1 of FIG. 25, reverse proxy server aSLE2 2202 enters ad hoc operation mode after receiving a trigger from underlying network or a command from the communication manager at the SL.

Step 2b of FIG. 25 is an optional ID detection step, Step 2a and 2b of FIG. 25 may be conducted simultaneously or at any order in time.

In Step 2a of FIG. 25 a reverse proxy server aSLE2 2202 listens to discovery request message as well as scans the IDs used in the discovery messages.

In step 2b of FIG. 25, discoverer ALE2 2206 or aSLE3 2208 scans the IDs that have been used already in discovery messages, and selects or generates the locally unique IDs for its discovery request message.

In step 3 of FIG. 25, discoverer ALE2 2206 or aSLE3 2208 broadcasts TO-DISCOVER REQUEST message to start a discovery cycle.

In step 4 of FIG. 25, the reverse proxy server aSLE2 2202, acting as a "discoveree" to discoverer ALE2 2206 or aSLE3 2208 and a "discoverer" to a discoveree aSLE1 2204, sends its own discovery request message TO-DISCOVER REQUEST' (i.e. the original request message TO-DISCOVER REQUEST is modified) to the discoveree aSLE1 2204, if the Proxy bit is set "1" (true). The security is handled from the discoverer ALE2 2206 or aSLE3 2208 to reverse proxy server aSLE2 2202 and from aSLE2 2202 to the discoveree aSLE1 2204.

In step 5 of FIG. 25, the discoveree aSLE1 2204 decides to respond the discovery request from reverse proxy server aSLE2 2202 and sends TO-DISCOVER RESPONSE back.

In step 6 of FIG. 25, aSLE2 2202, acting as a reverse proxy server, sends its discovery response message TO-DISCOVER RESPONSE' (i.e. the original response message TO-DISCOVER RESPONSE is modified) to the discoverer ALE2 2206 or aSLE3 2208, if the Proxy bit is set "1" (true).

In step 7 of FIG. 25, discoverer ALE2 2206 or aSLE3 2208 confirms the discovery response with TO-DISCOVER CONFIRM.

In step 8 of FIG. 25, aSLE2 2202, acting as a reverse proxy server, sends its discovery confirm message TO-DISCOVER CONFIRM' (i.e. the original response message TO-DISCOVER CONFIRM is modified) to the discoveree aSLE1 2204, if the Proxy bit is set "1" (true).

It is understood that the entities performing the steps illustrated in FIG. 25 are logical entities that may be implemented in the form of software (i.e., computer-executable instructions) stored in a memory of, and executing on a processor of, a network node or computer system such as those illustrated in FIG. 32C or FIG. 32D. That is, the method(s) illustrated in FIG. 25 may be implemented in the form of software (i.e., computer-executable instructions) stored in a memory of a network node, such as the node or computer system illustrated in FIG. 32C or FIG. 32D, which computer executable instructions, when executed by a processor of the node, perform the steps illustrated in FIG. 25. It is also understood that any transmitting and receiving steps illustrated in FIG. 25 may be performed by communication circuitry of the node under control of the processor of the node and the computer-executable instructions (e.g., software) that it executes.

Embodiments of the proposed mechanisms are exemplified in this section.

oneM2M Embodiments

Figure 4:
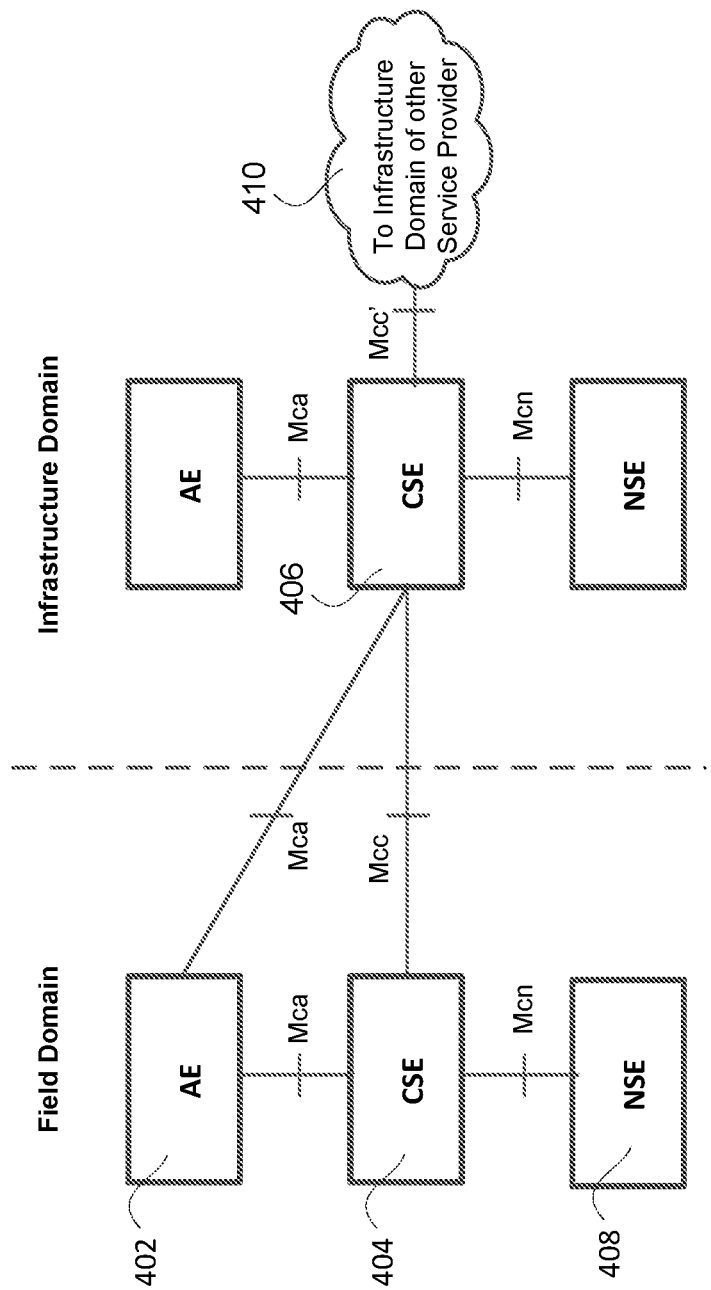
FIG. 4 is a diagram that illustrates a Resource Oriented Architecture (ROA) version of oneM2M service layer functional architecture.
Figure 26:
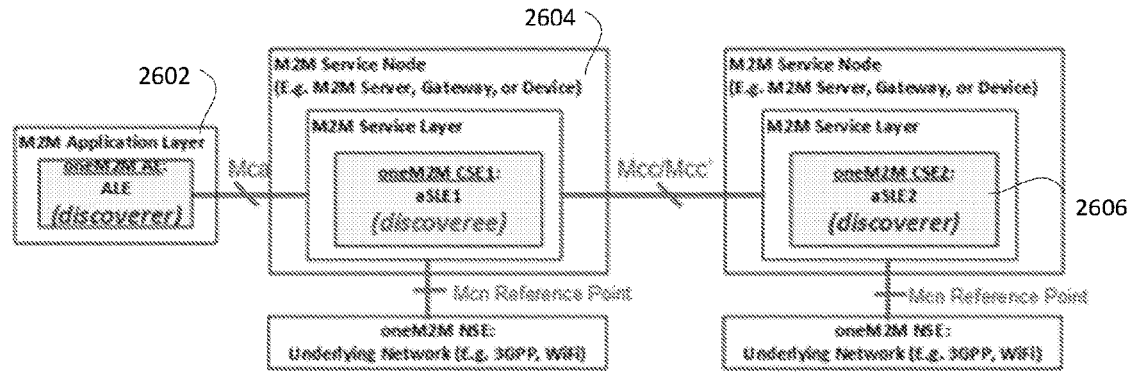
FIG. 26 is a diagram of an exemplary embodiment of ad hoc service discovery.
Figure 26:
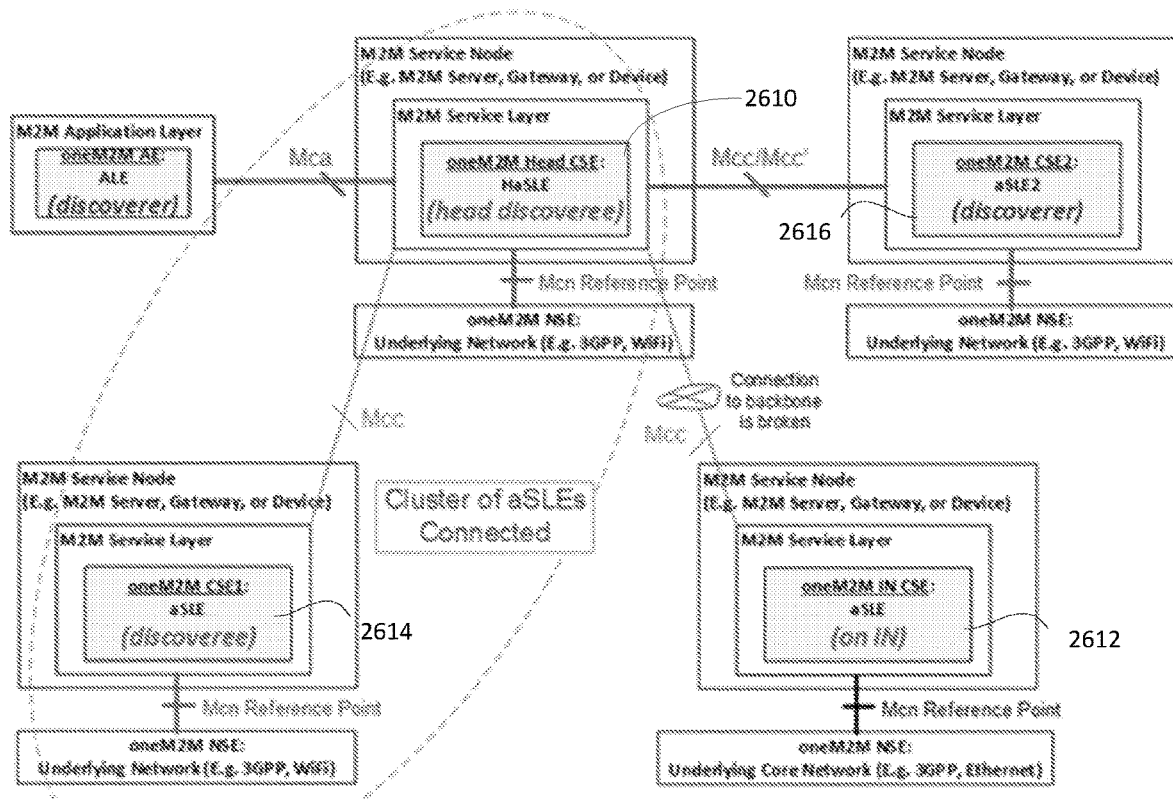

As illustrated in FIG. 26A, the communication entity aSLE and ALE described in this paper may be mapped into oneM2M's Service Layer entity CSE or oneM2M's Application Entity AE 2602 defined in oneM2M architecture shown in FIG. 4. The discovery messages may be conducted over Mca interface between a discover Application entity AE 2602 and a discoveree Service Layer entity CSE1 2604, and/or over Mcc/Mcc' interface between a discover Service Layer entity CSE2 2606 and a discoveree Service Layer entity CSE1 2604. Through the Mcn interface, the trigger for starting or switching into ad hoc operation mode is passed from the underlying network, as well as the transmitting and receiving parameters for control or managing the service layer broadcasting is sent to the underlying network.

Also shown in FIG. 26B, the CSE 2610 has lost connection with IN CSE 2612 at infrastructure node due to the broken connection to backbone, and it has become a head of isolated cluster of ad hoc CSE 2614.

Figure 1:
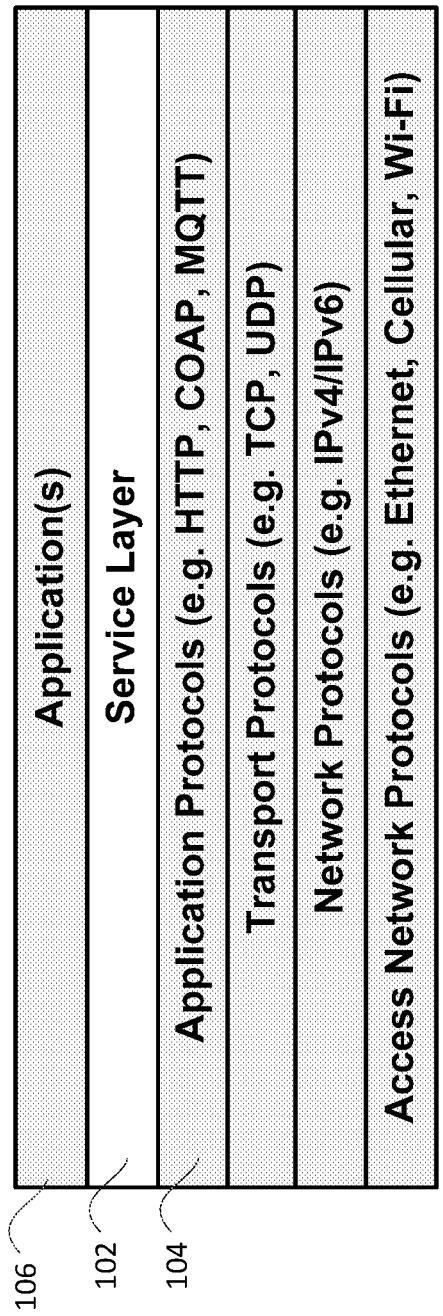
FIG. 1 is a diagram of an exemplary protocol stack including a service layer.
Figure 2:
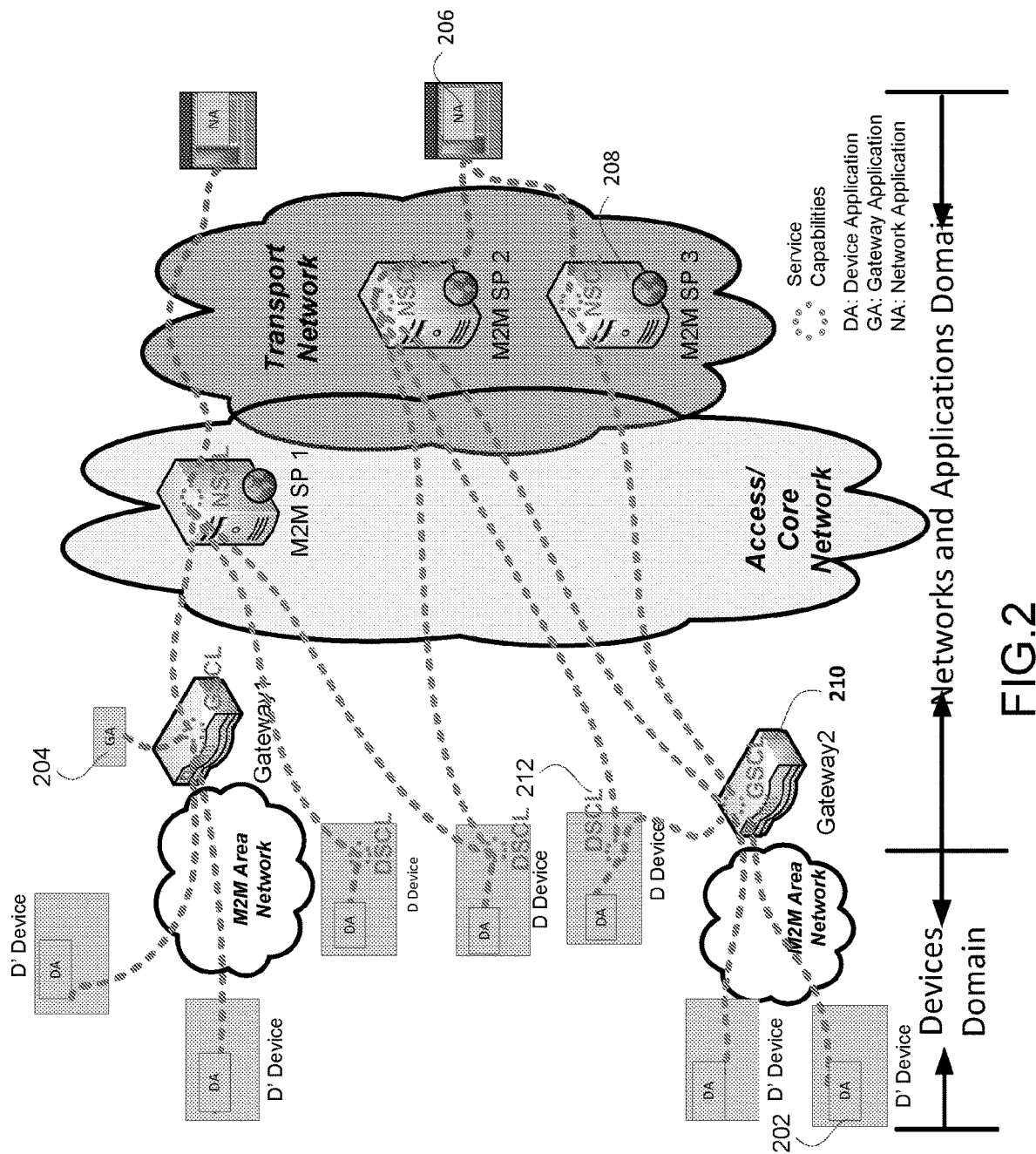
FIG. 2 is a diagram of a European Telecommunication Standards Institute (ETSI) Machine to Machine (M2M) service layer architecture.
Figure 3:
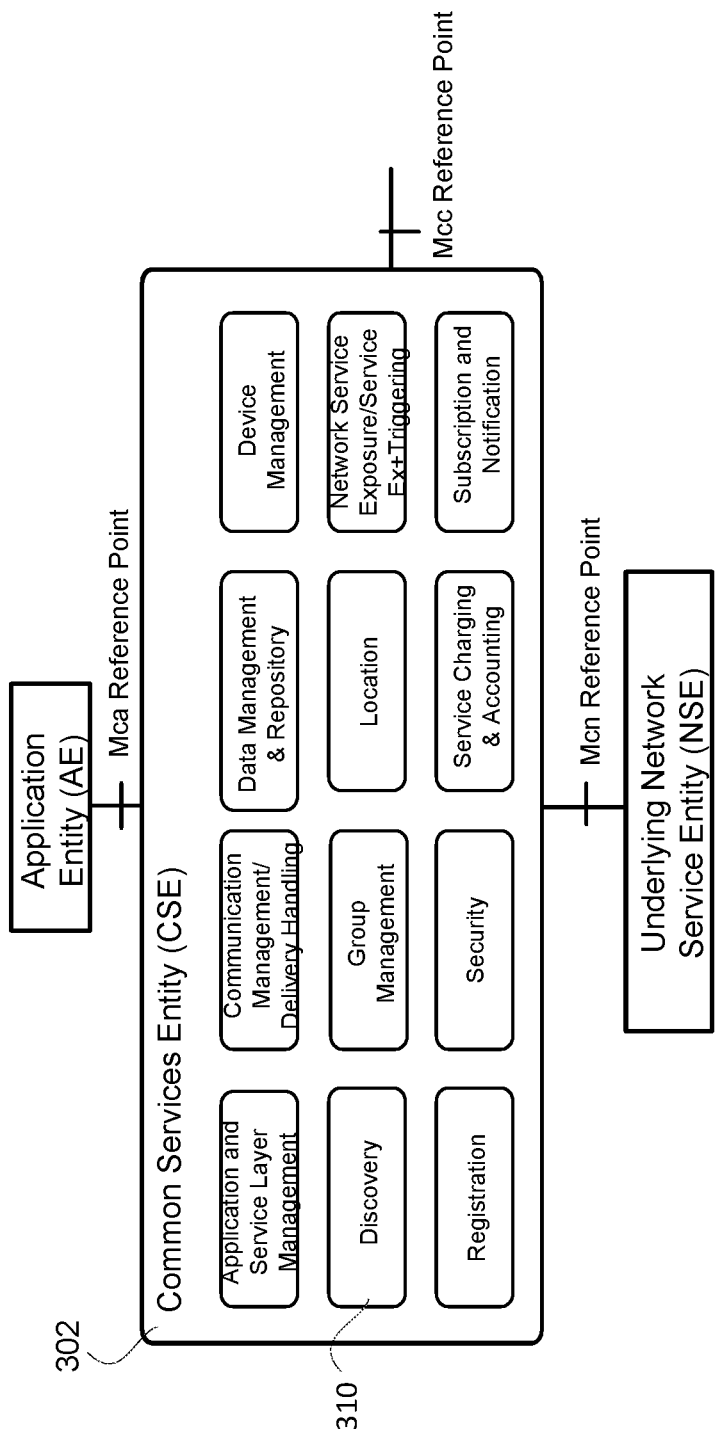
FIG. 3 is a diagram that illustrates a Common Service Entity (CSE) and Common Service Functions (CSF) oneM2M service layer.
Figure 5:
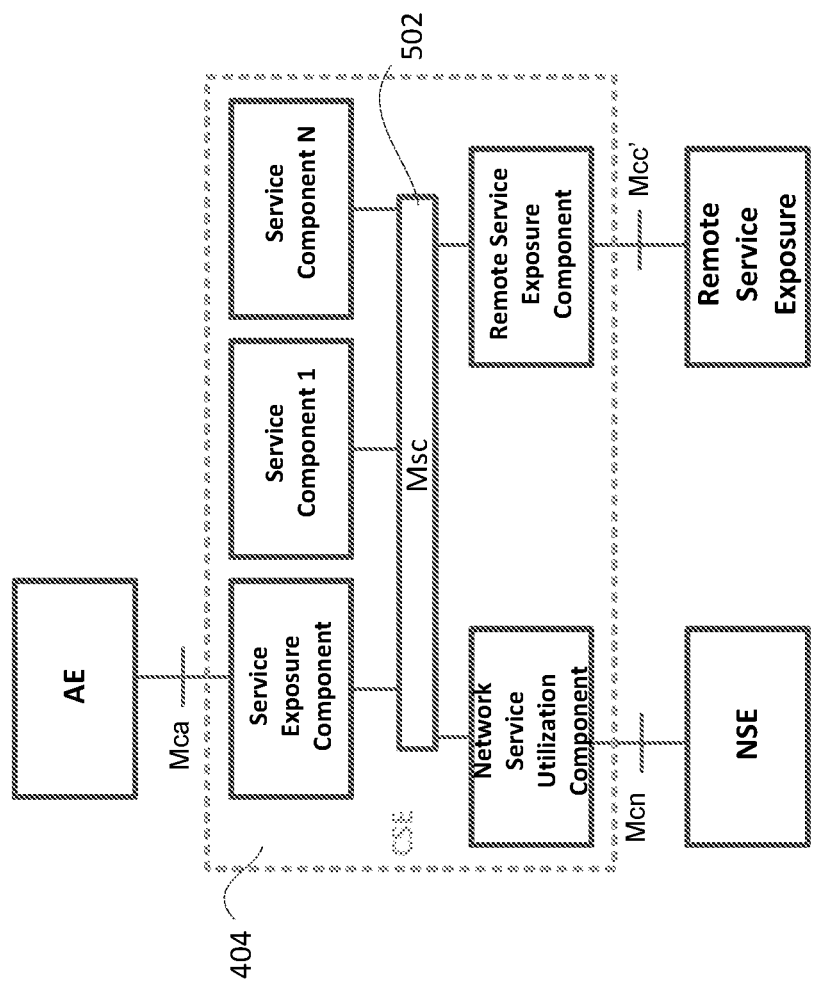
FIG. 5 is a diagram of a Service Oriented Architecture (SOA) version of oneM2M services component architecture.
Figure 6:
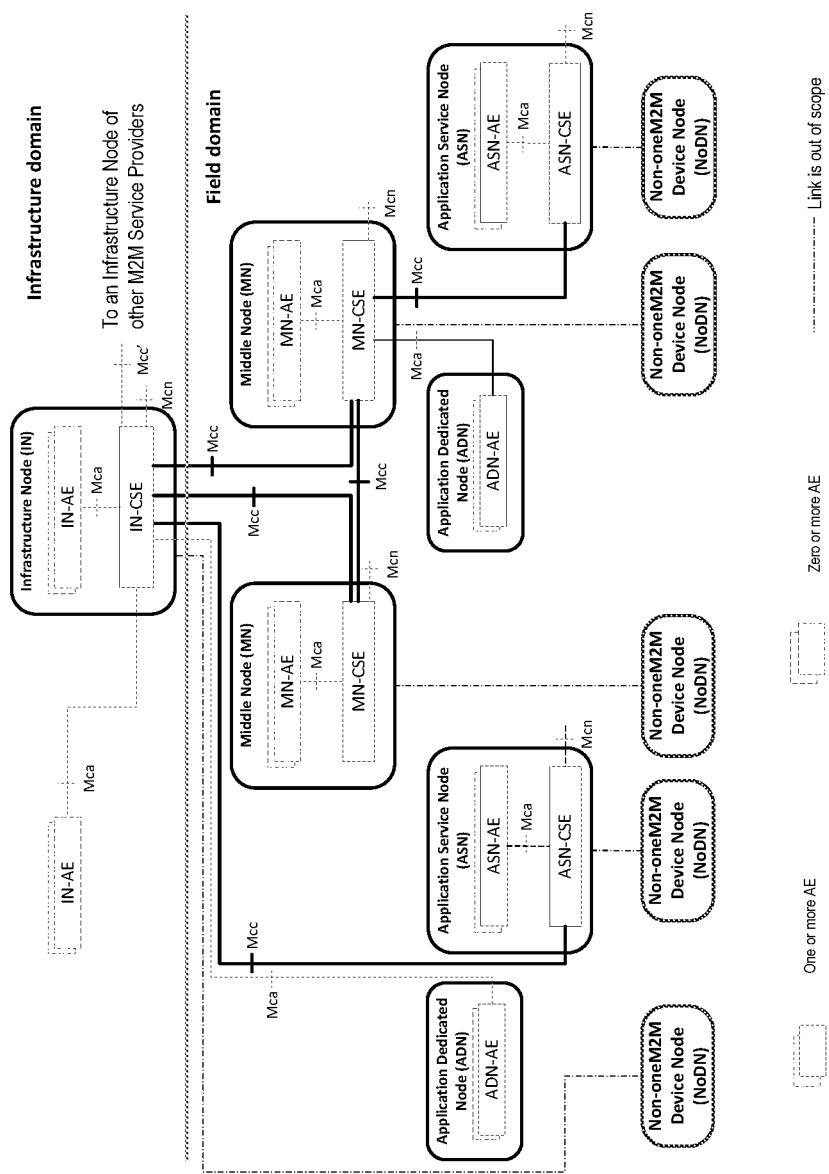
FIG. 6 is a diagram that illustrates configurations supported by a oneM2M architecture.
Figure 7:
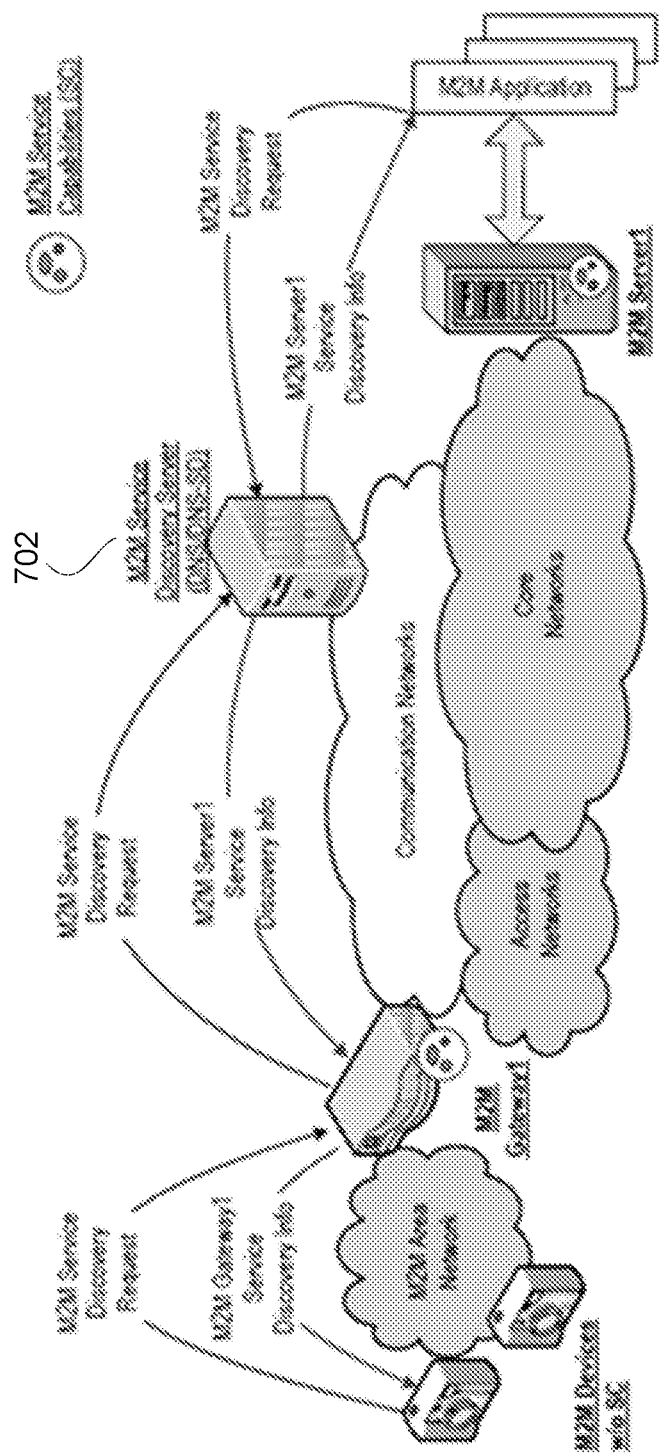
FIG. 7 is a diagram that illustrates Automatic Service Discovery.
Figure 27:
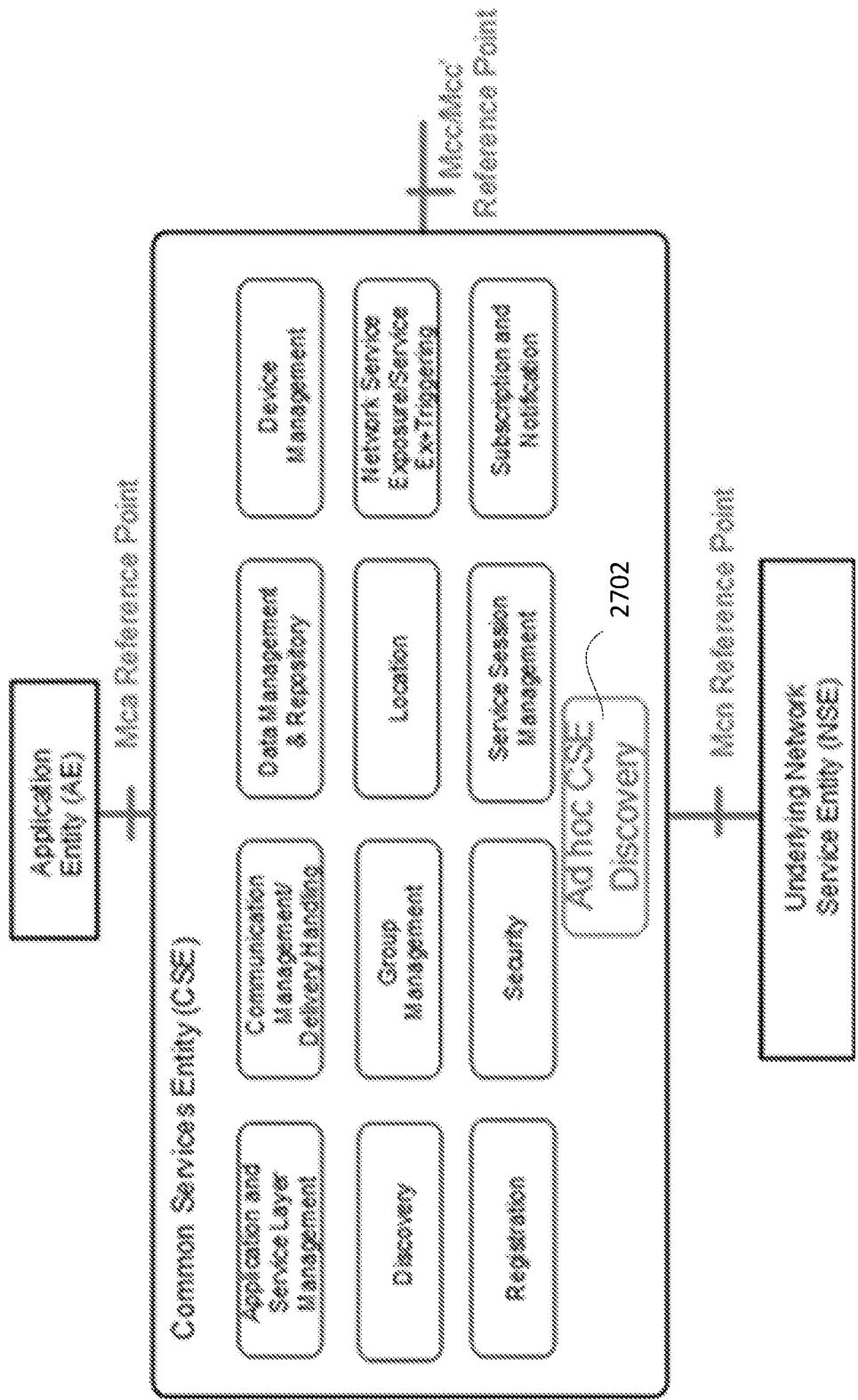
FIG. 27 is a diagram of an ad hoc service discovery function for ROA oneM2M.
Figure 28:
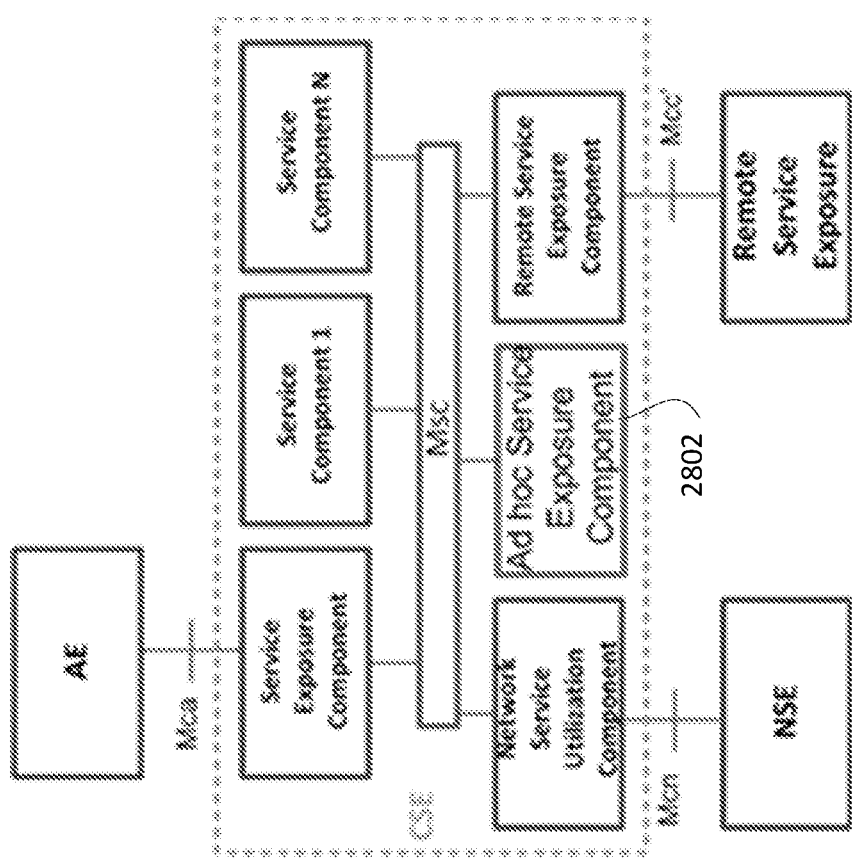
FIG. 28 is a diagram of an ad hoc service discovery function in SOA oneM2M.

As shown in FIG. 27 and FIG. 28, the discovery functions or procedures proposed in this paper may be implemented within oneM2M's CSE "Ad hoc CSE Discovery" 2702 and "Ad hoc Service Exposure Component 2802 in either ROA architecture as defined in FIG. 3 or SOA architecture defined in FIG. 5.

Figure 29A:
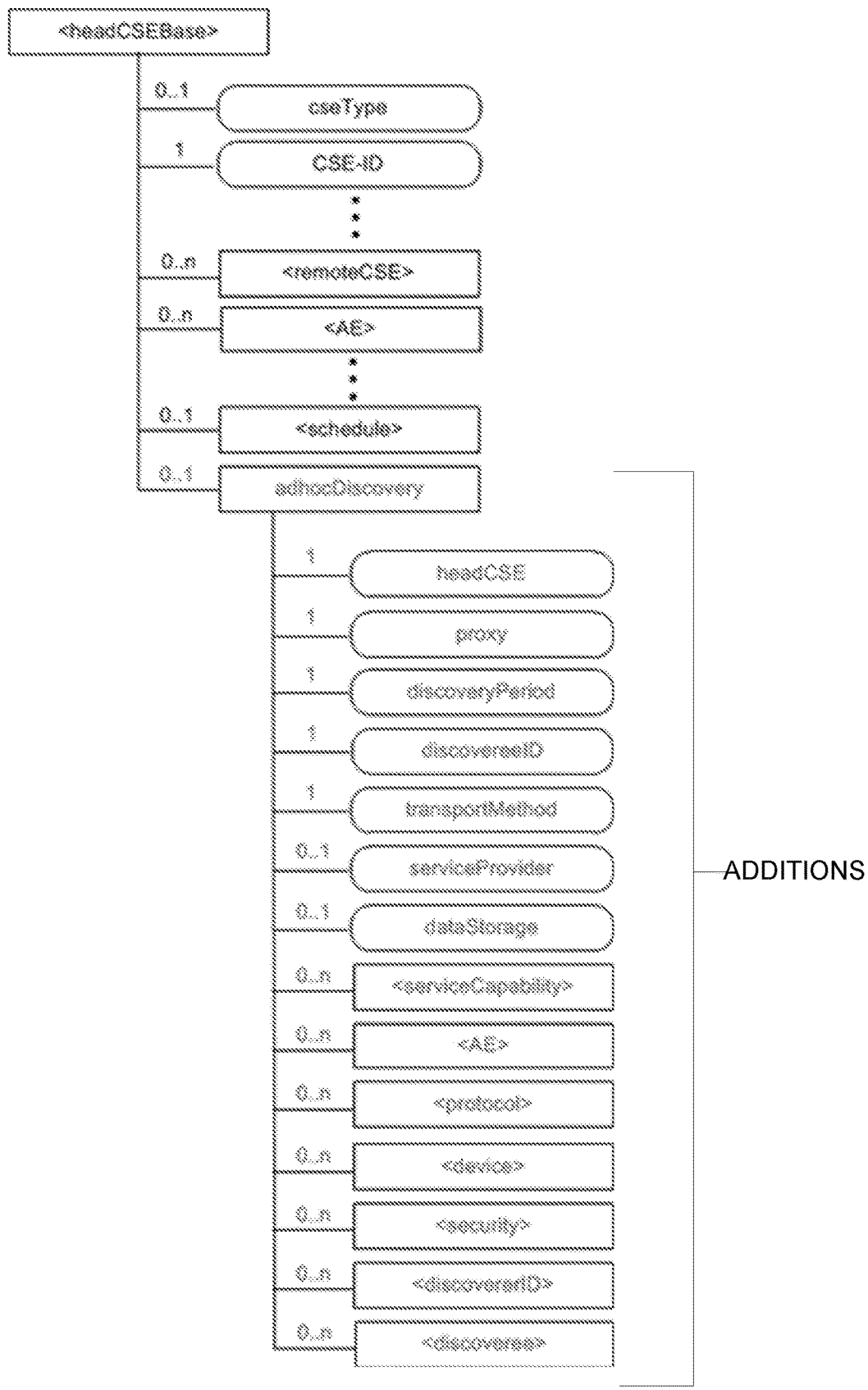
FIG. 29A is a diagram of an exemplary resource structure for Head ad hoc CSE.

As shown in FIG. 29A, a resource structure for a Head ad hoc CSE is exampled with the additions shown in brackets.

Figure 29B:
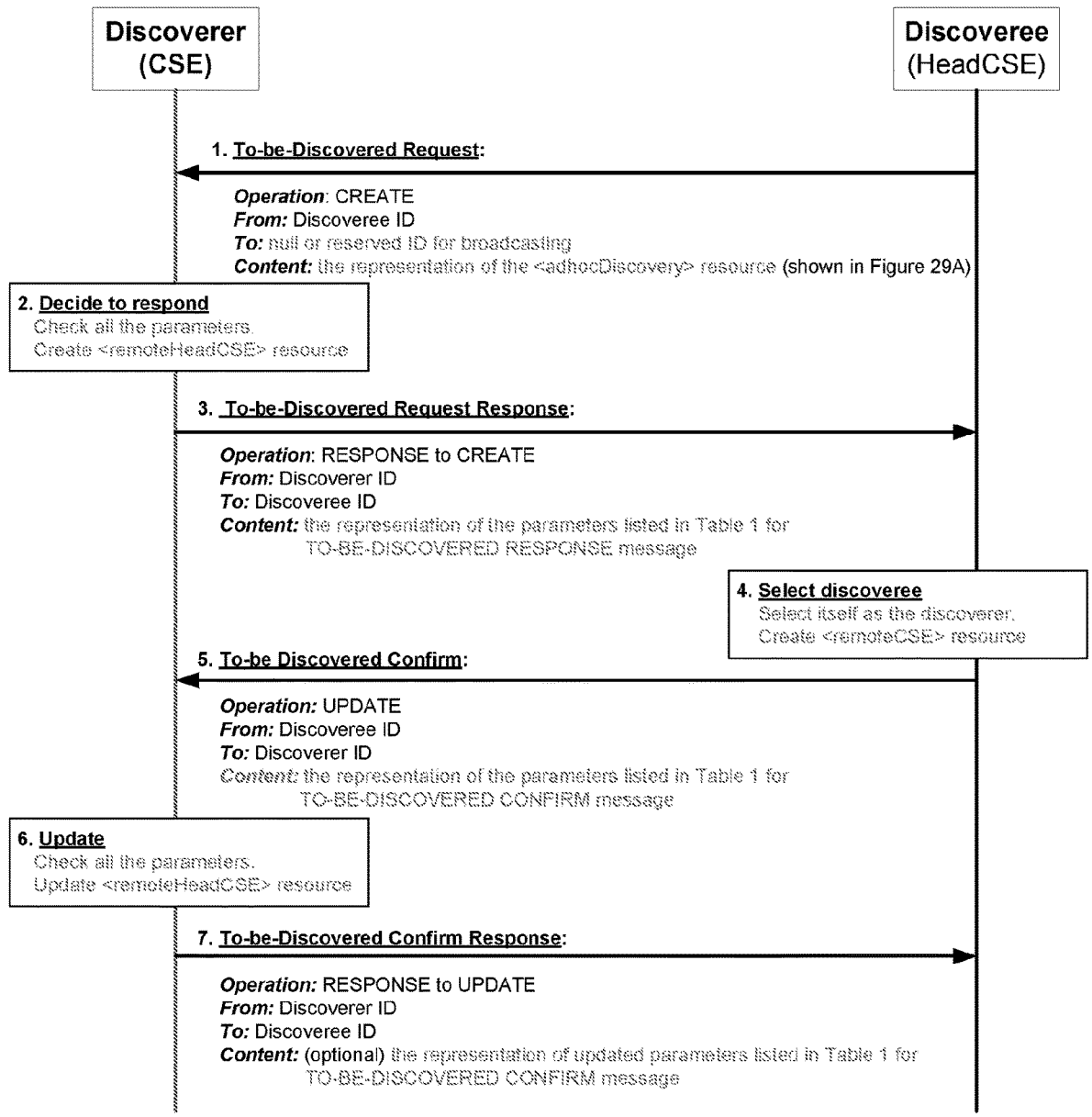
FIG. 29B is a diagram of exemplary ad hoc service discovery messages for "To be Discovered".

FIG. 29B shows exemplary oneM2M embodiment of ad hoc service discovery messages for "To be Discovered".

It is understood that the functionality illustrated in FIGS. 26-29B, may be implemented in the form of software (i.e., computer-executable instructions) stored in a memory of, and executing on a processor of, a node of an M2M network (e.g., a server, gateway, device, or other computer system), such as one of those illustrated in FIG. 32C or 32D described below.

Embodiment with AllJoyn

AllJoyn forms short distance local networks for proximity services. These clusters or proximal networks may need to access to IoT service network, e.g. via a cloud server. Currently, it's proposed that an AllJoyn Proximal Network finds the IoT/M2M service network via DNS servers for service discovery. However, it has not been addressed yet how an AllJoyn proximal network discovers services in ad hoc mode, i.e. ad hoc service discovery.

Figure 30:
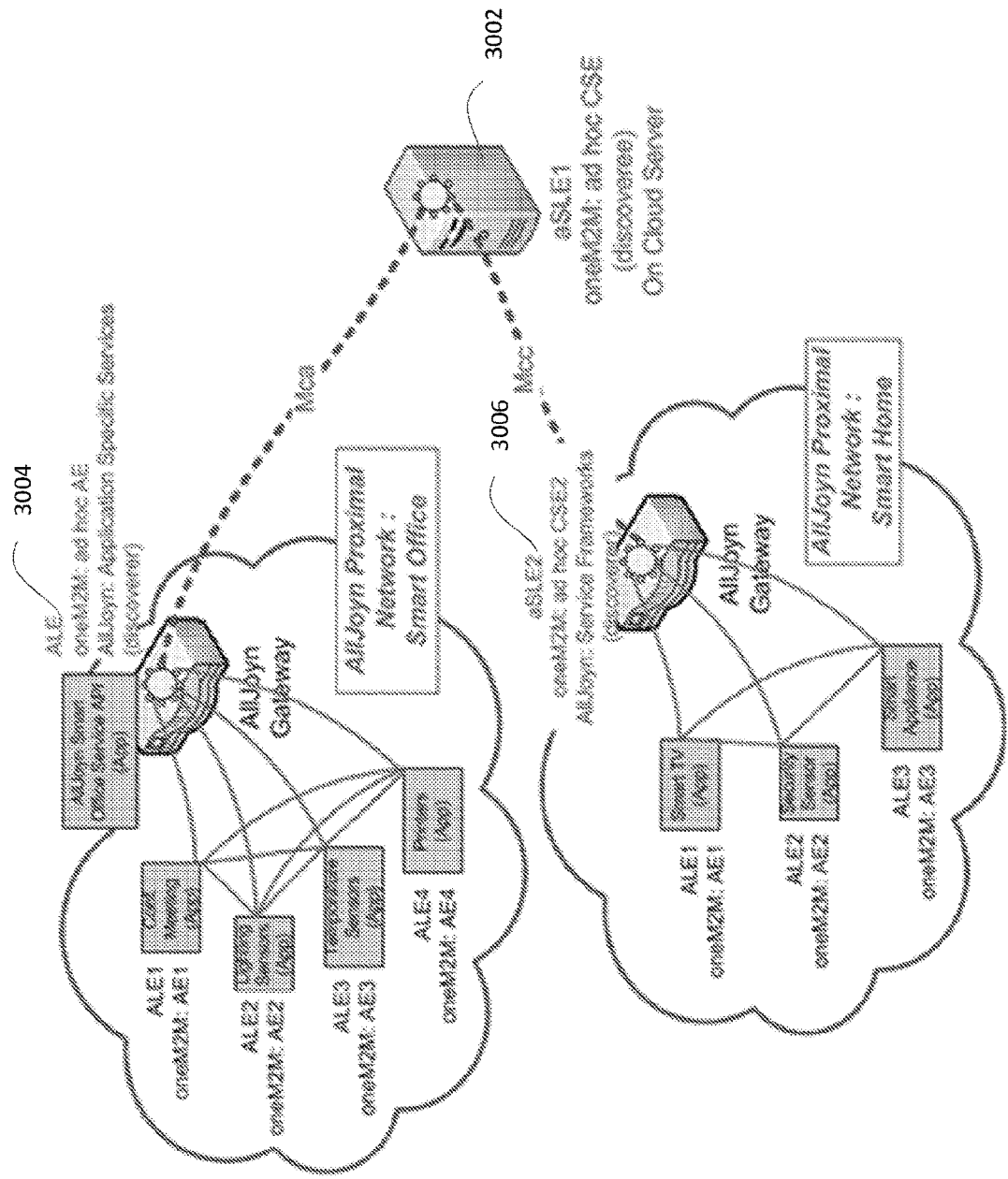
FIG. 30 is a diagram of ad hoc service discovery with AllJoyn proximal networks.

Two examples of ad hoc service discovery with AllJoyn proximal networks are shown in FIG. 30. An ad hoc service discovery may be conducted between the discoveree aSLE1 3002 (i.e. oneM2M ad hoc CSE) on a Cloud Server and the discoverer ALE 3004 (i.e. AllJoyn Smart Office API on the AllJoyn Gateway node of the AllJoyn Proximal Network for Smart Office) via the Mca interface, or between the discoveree aSLE1 3002 and the discoverer aSLE2 3006 (i.e. AllJoyn Service Frameworks on the AllJoyn Gateway node of the AllJoyn Proximal Network for Smart Home) via Mcc interface.

It is understood that the functionality illustrated in FIG. 30, may be implemented in the form of software (i.e., computer-executable instructions) stored in a memory of, and executing on a processor of, a node of an M2M network (e.g., a server, gateway, device, or other computer system), such as one of those illustrated in FIG. 32C or 32D described below.

User Interface

Figure 31:
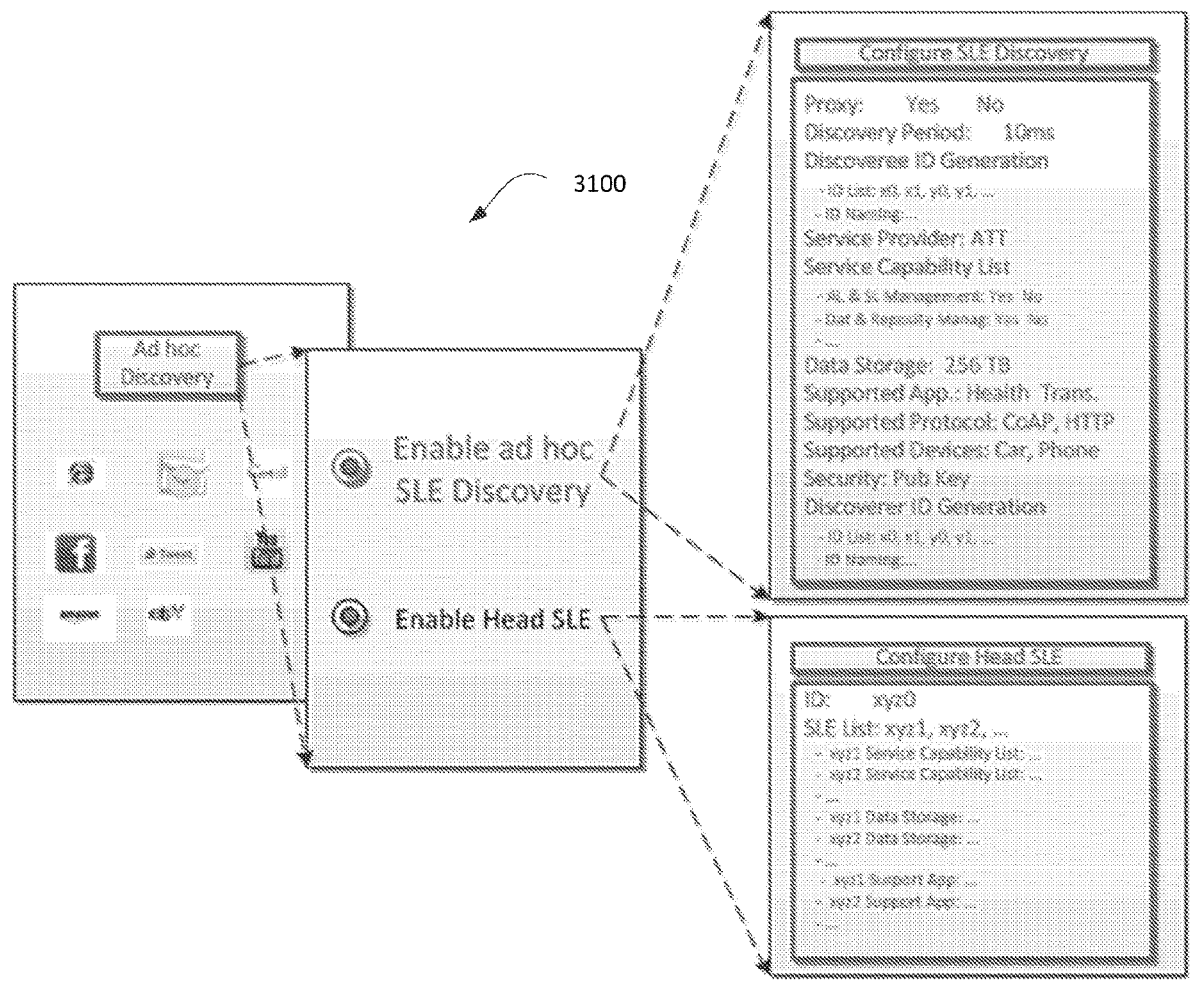
FIG. 31 is a user interface for pre-configuring ad hoc service discovery.

Interfaces, such as Graphical User Interfaces (GUIs), can be used to assist users to control and/or configure functionalities related to Ad hoc service discovery. FIG. 31 is a diagram that illustrates an exemplary user interface 3100. The parameters used in discovery messages may be pre-configured for supporting ad hoc service discovery. A user interface may be implemented for configuring or programming those parameters with default values, as well as control switches for enabling or disabling certain ad hoc Service discovery features or functions.

It is to be understood that interface 3100 can be produced using displays such as those shown in FIGS. 22C-D described below.

Example M2M/IoT/WoT Communication System

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a-service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

FIG. 22 is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Communication system 10 can be used to implement functionality of the disclosed embodiments and can include functionality and logical entities such as Service Layer 102, CSE 702, 404 and 406, AE 402, NSE 408, aSLE 802, 804, 806, 808, 1004, 1002, 1010, 1214, 1202, 1216, 1212, 2062, 2004, 2006, 2014, 2202, 2208, 2204, 2606, 2612, 2614, 3002, SLE 810, ALE 1006, 1008, 1208, 1206, 1210, 2012, 2206 and 3004, HaSLE 2610, M2M Service Node 2604, M2M Service Node 2604, ad hoc CSE discovery CSF 2702 and ad hoc Service Exposure Component 2802 as well as logical entities to produce user interface 3100 of FIG. 31.

As shown in FIG. 22, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 22, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network nodes (e.g., servers, gateways, device, and the like). For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M terminal devices 18 may collect data and send the data, via the communication network 12 or direct radio link, to an M2M application 20 or other M2M devices 18. The M2M terminal devices 18 may also receive data from the M2M application 20 or an M2M terminal device 18. Further, data and signals may be sent to and received from the M2M application 20 via an M2M service layer 22, as described below. M2M terminal devices 18 and gateways 14 may communicate via various networks including, cellular, WLAN, WPAN (e.g., Zigbee, 6LoWPAN, Bluetooth), direct radio link, and wireline for example.

Exemplary M2M terminal devices 18 include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 22, the illustrated M2M service layer 22 in the field domain provides services for the M2M application 20, M2M gateway devices 14, and M2M terminal devices 18 and the communication network 12. Communication network 12 can be used to implement functionality of the disclosed embodiments and can include functionality and logical entities such as Service Layer 102, CSE 702, 404 and 406, AE 402, NSE 408, aSLE 802, 804, 806, 808, 1004, 1002, 1010, 1214, 1202, 1216, 1212, 2062, 2004, 2006, 2014, 2202, 2208, 2204, 2606, 2612, 2614, 3002, SLE 810, ALE 1006, 1008, 1208, 1206, 1210, 2012, 2206 and 3004, HaSLE 2610, M2M Service Node 2604, M2M Service Node 2604, ad hoc CSE discovery CSF 2702 and ad hoc Service Exposure Component 2802 as well as logical entities to produce user interface 3100 of FIG. 31. The M2M service layer 22 may be implemented by one or more servers, computers, devices, virtual machines (e.g. cloud/storage farms, etc.) or the like, including for example the devices illustrated in FIGS. 22C and 22D described below. It will be understood that the M2M service layer 22 may communicate with any number of M2M applications, M2M gateways 14, M2M terminal devices 18, and communication networks 12 as desired. The M2M service layer 22 may be implemented by one or more nodes of the network, which may comprises servers, computers, devices, or the like. The M2M service layer 22 provides service capabilities that apply to M2M terminal devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12 in the infrastructure domain. M2M service layer 22' also provides services for the M2M gateways 14 and M2M terminal devices 18 in the field domain. It will be understood that the M2M service layer 22' may communicate with any number of M2M applications, M2M gateways and M2M devices. The M2M service layer 22' may interact with a service layer by a different service provider. The M2M service layer 22' by one or more nodes of the network, which may comprises servers, computers, devices, virtual machines (e.g., cloud computing/storage farms, etc.) or the like.

Referring also to FIG. 22, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through networks 12 in connection with the services that the service layers 22 and 22' provide.

The methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, connection methods of the present application can implemented as part of an M2M network that uses a Service Oriented Architecture (SOA) and/or a resource-oriented architecture (ROA) to access services such as the connection methods of the present application.

In some embodiments, M2M applications 20 and 20' may be used in conjunction with the disclosed systems and methods. The M2M applications 20 and 20' may include the applications that interact with the UE or gateway and may also be used in conjunction with other disclosed systems and methods.

In one embodiment, the logical entities such as Service Layer 102, CSE 702, 404 and 406, AE 402, NSE 408, aSLE 802, 804, 806, 808, 1004, 1002, 1010, 1214, 1202, 1216, 1212, 2062, 2004, 2006, 2014, 2202, 2208, 2204, 2606, 2612, 2614, 3002, SLE 810, ALE 1006, 1008, 1208, 1206, 1210, 2012, 2206 and 3004, HaSLE 2610, M2M Service Node 2604, M2M Service Node 2604, ad hoc CSE discovery CSF 2702 and ad hoc Service Exposure Component 2802 as well as logical entities to produce user interface 3100 of FIG. 31 may be hosted within a M2M service layer instance hosted by an M2M node, such as an M2M server, M2M gateway, or M2M device, as shown in FIG. 22. For example, the logical entities such as Service Layer 102, CSE 702, 404 and 406, AE 402, NSE 408, aSLE 802, 804, 806, 808, 1004, 1002, 1010, 1214, 1202, 1216, 1212, 2062, 2004, 2006, 2014, 2202, 2208, 2204, 2606, 2612, 2614, 3002, SLE 810, ALE 1006, 1008, 1208, 1206, 1210, 2012, 2206 and 3004, HaSLE 2610, M2M Service Node 2604, M2M Service Node 2604, ad hoc CSE discovery CSF 2702 and ad hoc Service Exposure Component 2802 as well as logical entities to produce user interface 3100 of FIG. 31 may comprise an individual service capability within the M2M service layer instance or as a sub-function within an existing service capability.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more standalone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 22.

Further, logical entities such as Service Layer 102, CSE 702, 404 and 406, AE 402, NSE 408, aSLE 802, 804, 806, 808, 1004, 1002, 1010, 1214, 1202, 1216, 1212, 2062, 2004, 2006, 2014, 2202, 2208, 2204, 2606, 2612, 2614, 3002, SLE 810, ALE 1006, 1008, 1208, 1206, 1210, 2012, 2206 and 3004, HaSLE 2610, M2M Service Node 2604, M2M Service Node 2604, ad hoc CSE discovery CSF 2702 and ad hoc Service Exposure Component 2802 as well as logical entities to produce user interface 3100 of FIG. 31 can implemented as part of an M2M network that uses a Service Oriented Architecture (SOA) and/or a Resource-Oriented Architecture (ROA) to access services of the present application.

FIG. 22 is a block diagram of an example hardware/software architecture of a M2M network node 30, such as an M2M device 18, an M2M gateway 14, an M2M server, or the like. The node 30 can execute or include logical entities such as Service Layer 102, CSE 702, 404 and 406, AE 402, NSE 408, aSLE 802, 804, 806, 808, 1004, 1002, 1010, 1214, 1202, 1216, 1212, 2062, 2004, 2006, 2014, 2202, 2208, 2204, 2606, 2612, 2614, 3002, SLE 810, ALE 1006, 1008, 1208, 1206, 1210, 2012, 2206 and 3004, HaSLE 2610, M2M Service Node 2604, M2M Service Node 2604, ad hoc CSE discovery CSF 2702 and ad hoc Service Exposure Component 2802 as well as logical entities to produce user interface 3100 of FIG. 31. The device 30 can be part of an M2M network as shown in FIG. 22A-B or part of a non-M2M network. As shown in FIG. 22C, the M2M node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the M2M node 30 may include any sub-combination of the foregoing elements while remaining consistent with an embodiment. This node may be a node that implements the SMSF functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the M2M node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 22, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein and in the claims. While FIG. 22 depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other M2M nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 22 as a single element, the M2M node 30 may include any number of transmit/receive elements 36. More specifically, the M2M node 30 may employ MIMO technology. Thus, in an embodiment, the M2M node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M node 30 may have multi-mode capabilities. Thus, the transceiver 34 may include multiple transceivers for enabling the M2M node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M node 30, such as on a server or a home computer. The processor 32 may be configured to control lighting patterns, images, or colors on the display or indicators 42 to reflect the status of an M2M service layer session migration or sharing or to obtain input from a user or display information to a user about the node's session migration or sharing capabilities or settings. In another example, the display may show information with regard to a session state. The current disclosure defines a RESTful user/application API in the oneM2M embodiment. A graphical user interface, which may be shown on the display, may be layered on top of the API to allow a user to interactively establish and manage an E2E session, or the migration or sharing thereof, via the underlying service layer session functionality described herein.

The processor 32 may receive power from the power source 48, and may be configured to distribute and/or control the power to the other components in the M2M node 30. The power source 48 may be any suitable device for powering the M2M node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M node 30. It will be appreciated that the M2M node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., fingerprint) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52. Alternately, the node 30 may comprise apparatuses or devices, such as a sensor, consumer electronics, a wearable device such as a smart watch or smart clothing, a medical or eHealth device, a robot, industrial equipment, a drone, a vehicle such as a car, truck, train, or airplane.

FIG. 22 is a block diagram of an exemplary computing system 90 which may also be used to implement one or more nodes of an M2M network, such as an M2M server, gateway, device, or other node. Computing system 90 may comprise a computer or server and may be controlled primarily by computer readable instructions, which may be in the form of software, wherever, or by whatever means such software is stored or accessed. Computing system 90 can execute or include logical entities such as Service Layer 102, CSE 702, 404 and 406, AE 402, NSE 408, aSLE 802, 804, 806, 808, 1004, 1002, 1010, 1214, 1202, 1216, 1212, 2062, 2004, 2006, 2014, 2202, 2208, 2204, 2606, 2612, 2614, 3002, SLE

810, ALE 1006, 1008, 1208, 1206, 1210, 2012, 2206 and 3004, HaSLE 2610, M2M Service Node 2604, M2M Service Node 2604, ad hoc CSE discovery CSF 2702 and ad hoc Service Exposure Component 2802 as well as logical entities to produce user interface 3100 of FIG. 31. Computing system 90 can be an M2M device, user equipment, gateway, UE/GW or any other nodes including nodes of the mobile care network, service layer network application provider, terminal device 18 or an M2M gateway device 14 for example. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 22, to enable the computing system 90 to communicate with other nodes of the network.

User equipment (UE) can be any device used by an end-user to communicate. It can be a hand-held telephone, a laptop computer equipped with a mobile broadband adapter, or any other device. For example, the UE can be implemented as the M2M terminal device 18 of FIG. 22.

It is understood that any or all of the systems, methods, and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above, including the operations of the gateway, UE, UE/GW, or any of the nodes of the mobile core network, service layer or network application provider, may be implemented in the form of such computer executable instructions. Logical entities such as Service Layer 102, CSE 702, 404 and 406, AE 402, NSE 408, aSLE 802, 804, 806, 808, 1004, 1002, 1010, 1214, 1202, 1216, 1212, 2062, 2004, 2006, 2014, 2202, 2208, 2204, 2606, 2612, 2614, 3002, SLE 810, ALE 1006, 1008, 1208, 1206, 1210, 2012, 2206 and 3004, HaSLE 2610, M2M Service Node 2604, M2M Service Node 2604, ad hoc CSE discovery CSF 2702 and ad hoc Service Exposure Component 2802 as well as logical entities to produce user interface 3100 of FIG. 31 may be embodied in the form of the computer executable instructions stored on a computer-readable storage medium. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. An apparatus comprising a processor, a memory, and communication circuitry, the apparatus being connected to a network via its communication circuitry, the apparatus further comprising computer-executable instructions stored in the memory of the apparatus which, when executed by the processor of the apparatus, cause the apparatus to perform operations comprising:
broadcast, by a service layer entity of the apparatus and to a plurality of service layer entities in a network, a discovery advertisement comprising information indicating at least:
available services, and
one or more supported applications,
wherein the information is applicable to a service layer entity of a second apparatus that the service layer of the apparatus proxies on behalf of; and
receive a response from a service layer entity of the plurality of service layer entities in the network.

2. The apparatus of claim 1, wherein the discovery advertisement includes status information of the apparatus that includes loading, a public key, data rate capability, data storage capability, communication delay, location, supported types of applications, or supported types of devices.

3. The apparatus of claim 1, wherein the apparatus regulates discovery message traffic.

4. The apparatus of claim 1, wherein the service layer entity of the apparatus regulates discovery message traffic.

5. The apparatus of claim 1, wherein the service layer entity of the apparatus is a forward proxy for another service layer entity.

6. The apparatus of claim 1, wherein the service layer entity of the apparatus is a reverse proxy for another service layer entity.

7. The apparatus of claim 1, wherein the apparatus does identity detection to avoid identity conflict.

8. The apparatus of claim 1, wherein the service layer entity of the apparatus advertises services for at least one associated service layer entity.

9. The apparatus of claim 1, wherein the broadcast is done when an ad hoc mode is enabled.

10. A method for use by an apparatus, wherein the apparatus comprises a processor, a memory, and communication circuitry, the UE being connected to a network via its communication circuitry, the UE further comprising computer-executable instructions stored in the memory of the UE which, when executed by the processor, perform functions of a method comprising:
broadcasting, by a service layer entity of the apparatus and to a plurality of service layer entities in a network, a discovery advertisement comprising information indicating at least:
available services, and
one or more supported applications,
wherein the information is applicable to a service layer entity of a second apparatus that the service layer of the apparatus proxies on behalf of; and
receiving a response from a service layer entity of the plurality of service layer entities in the network.

11. The method of claim 10, wherein the apparatus does identity detection to avoid conflict.

12. The method of claim 10, wherein the service layer entity of the apparatus advertises services for at least one associated service layer entity.

13. The method of claim 10, wherein the broadcasting is done when an ad hoc mode is entered.

14. The method of claim 13, wherein the ad hoc mode is enabled upon failure of a portion of a network.

15. The method of claim 10, wherein the discovery advertisement includes status information of the apparatus that includes loading, a public key, data rate capability, data storage capability, communication delay, location, supported types of applications, or supported types of devices.

16. A method for use by an apparatus, wherein the apparatus comprises a processor, a memory, and communication circuitry, the UE being connected to a network via its communication circuitry, the UE further comprising computer-executable instructions stored in the memory of the UE which, when executed by the processor, perform functions of a method comprising:
broadcasting a discovery request for service to a plurality of service layer entities without knowing if the plurality of service layer entities support the service, wherein the discovery request for service comprises at least information indicating one or more supported applications, wherein the information is applicable to a service layer entity of a second apparatus that the service layer of the apparatus proxies on behalf of; and
receiving a response from a service layer entity of the plurality of service layer entities.

17. The method of claim 16, wherein the apparatus does identity detection to avoid conflict.

18. The method of claim 16, wherein the discovery request is sent when an ad hoc mode is entered.

19. The method of claim 18, wherein ad hoc mode is entered upon network failure.

20. The method of claim 16, further comprising:
receiving a plurality of responses from the plurality of service layer entities; and
selecting one service layer entity to which to send a confirmation.

* * * * *